(12) United States Patent
Hu et al.

(10) Patent No.: US 9,593,042 B2
(45) Date of Patent: *Mar. 14, 2017

(54) GLASSES AND GLASS CERAMICS INCLUDING A METAL OXIDE CONCENTRATION GRADIENT

(71) Applicant: CORNING INCORPORATED, Corning, NY (US)

(72) Inventors: Guangli Hu, Horseheads, NY (US); Charlene Marie Smith, Corning, NY (US); Zhongzhi Tang, Painted Post, NY (US); Steven Alvin Tietje, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,597

(22) Filed: Oct. 8, 2015

(65) Prior Publication Data

US 2016/0102011 A1    Apr. 14, 2016

Related U.S. Application Data

(60) Provisional application No. 62/194,967, filed on Jul. 21, 2015, provisional application No. 62/171,110, (Continued)

(51) Int. Cl.
*C03C 10/00* (2006.01)
*C03C 3/093* (2006.01)
(Continued)

(52) U.S. Cl.
CPC ............ *C03C 21/002* (2013.01); *C03C 3/091* (2013.01); *C03C 3/093* (2013.01); *C03C 3/097* (2013.01);
(Continued)

(58) Field of Classification Search
CPC ...... C03C 21/002; C03C 3/091; C03C 23/007; C03C 3/093; C03C 10/0027; C03C 3/097; C03C 10/00
See application file for complete search history.

(56) References Cited

U.S. PATENT DOCUMENTS 3,404,015 A    4/1965    Dumbaugh, Jr.
3,357,876 A    12/1967   Rinehart
(Continued)

FOREIGN PATENT DOCUMENTS

CN    103058506    4/2013
EP    0132751      2/1985
(Continued)

OTHER PUBLICATIONS

Bouyne et al; "Fragmentation of thin chemically tempered glass plates"; Glass Technol., 2002, 43C, 300-2.
(Continued)

*Primary Examiner* — Laura Auer
(74) *Attorney, Agent, or Firm* — Payal A. Patel; Jeffrey A. Schmidt

(57) ABSTRACT

Embodiments of a glass-based article including a first surface and a second surface opposing the first surface defining a thickness (t) of about 3 millimeters or less (e.g., about 1 millimeter or less), and a stress profile, wherein all points of the stress profile between a thickness range from about 0·t up to 0.3·t and from greater than 0.7·t, comprise a tangent that is less than about −0.1 MPa/micrometers or greater than about 0.1 MPa/micrometers, are disclosed. In some embodiments, the glass-based article includes a non-zero metal oxide concentration that varies along at least a portion of the thickness (e.g., 0·t to about 0.3·t). In some embodiments, the concentration of metal oxide or alkali metal oxide decreases from the first surface to a point between the first surface and the second surface and increases from the point to the second
(Continued)

surface. The concentration of the metal oxide may be about 0.05 mol % or greater or about 0.5 mol % or greater throughout the thickness. Methods for forming such glass-based articles are also disclosed.

34 Claims, 40 Drawing Sheets

Related U.S. Application Data filed on Jun. 4, 2015, provisional application No. 62/117,585, filed on Feb. 18, 2015, provisional application No. 62/061,372, filed on Oct. 8, 2014.

(51) Int. Cl.
*C03C 3/097* (2006.01)
*C03C 21/00* (2006.01)
*C03C 3/091* (2006.01)
*C03C 23/00* (2006.01)

(52) U.S. Cl.
CPC .......... *C03C 10/00* (2013.01); *C03C 10/0027* (2013.01); *C03C 23/007* (2013.01)

(56) References Cited

U.S. PATENT DOCUMENTS

| | | |
|---|---|---|
| 3,380,818 A | 4/1968 | Smith |
| 3,433,611 A | 3/1969 | Saunders et al. |
| 3,464,880 A | 9/1969 | Rinehart |
| 3,490,984 A | 1/1970 | Petticrew et al. |
| 3,625,718 A | 12/1971 | Petticrew |
| 3,639,198 A | 2/1972 | Plumat et al. |
| 3,656,923 A | 4/1972 | Garfinkel et al. |
| 3,660,060 A | 5/1972 | Spanoudis |
| 3,798,013 A | 3/1974 | Inoue et al. |
| 3,811,855 A | 5/1974 | Carlson et al. |
| 3,879,183 A | 4/1975 | Carlson |
| 3,907,577 A | 9/1975 | Kiefer et al. |
| 3,959,000 A | 5/1976 | Nakagawa et al. |
| 4,042,405 A | 8/1977 | Krohn et al. |
| 4,053,679 A | 10/1977 | Rinehart |
| 4,055,703 A | 10/1977 | Rinehart |
| 4,156,755 A | 5/1979 | Rinehart |
| 4,468,534 A | 8/1984 | Boddicker |
| 4,471,024 A | 9/1984 | Pargamin et al. |
| 4,702,042 A | 10/1987 | Herrington et al. |
| 4,757,162 A | 7/1988 | Dumora et al. |
| 5,273,827 A | 12/1993 | Francis |
| 5,763,343 A | 6/1998 | Brix et al. |
| 5,895,768 A | 4/1999 | Speit |
| 5,972,460 A | 10/1999 | Tachiwana |
| 6,333,286 B1 | 12/2001 | Kurachi et al. |
| 6,413,892 B1 | 7/2002 | Koyama et al. |
| 6,516,634 B1 | 2/2003 | Green et al. |
| 6,537,938 B1 | 3/2003 | Miyazaki |
| 6,689,704 B2 | 2/2004 | Ota et al. |
| 6,846,760 B2 | 1/2005 | Siebers et al. |
| 7,007,512 B2 | 3/2006 | Kamada et al. |
| 7,091,141 B2 | 8/2006 | Horsfall et al. |
| 7,176,528 B2 | 2/2007 | Couillard et al. |
| 7,476,633 B2 | 1/2009 | Comte et al. |
| 7,619,283 B2 | 11/2009 | Gadkaree |
| 7,687,419 B2 | 3/2010 | Kawai |
| 7,838,136 B2 | 11/2010 | Nakashima et al. |
| 8,099,982 B2 | 1/2012 | Takagi et al. |
| 8,232,218 B2 | 7/2012 | Dejneka et al. |
| 8,312,739 B2 | 11/2012 | Lee et al. |
| 8,327,666 B2 | 12/2012 | Harvey et al. |
| 8,347,651 B2 | 1/2013 | Abramov et al. |
| 8,561,429 B2 | 10/2013 | Allan et al. |
| 8,580,411 B2 | 11/2013 | Endo et al. |
| 8,691,711 B2 | 4/2014 | Nakashima et al. |
| 8,932,510 B2 | 1/2015 | Li et al. |
| 8,943,855 B2 | 2/2015 | Gomez et al. |
| 9,007,878 B2 | 4/2015 | Matsumoto et al. |
| 9,139,469 B2 | 9/2015 | Comte et al. |
| 9,193,625 B2 | 11/2015 | Bookbinder et al. |
| 2005/0221044 A1 | 10/2005 | Gaume et al. |
| 2006/0279217 A1 | 12/2006 | Peuchert et al. |
| 2007/0060465 A1 | 3/2007 | Varshney et al. |
| 2008/0128953 A1 | 6/2008 | Nagai et al. |
| 2009/0197088 A1 | 8/2009 | Murata |
| 2010/0029460 A1 | 2/2010 | Shojiya et al. |
| 2010/0087307 A1 | 4/2010 | Murata et al. |
| 2011/0014475 A1 | 1/2011 | Murata |
| 2011/0067447 A1 | 3/2011 | Zadesky et al. |
| 2011/0092353 A1 | 4/2011 | Amin et al. |
| 2011/0294648 A1 | 12/2011 | Chapman et al. |
| 2012/0015150 A1 | 1/2012 | Suzuki |
| 2012/0052271 A1 | 3/2012 | Gomez et al. |
| 2012/0083401 A1 | 4/2012 | Koyama et al. |
| 2012/0135226 A1 | 5/2012 | Bookbinder et al. |
| 2012/0171497 A1 | 7/2012 | Koyama et al. |
| 2012/0216569 A1 | 8/2012 | Allan et al. |
| 2012/0236526 A1 | 9/2012 | Weber |
| 2012/0264585 A1 | 10/2012 | Ohara et al. |
| 2012/0297829 A1 | 11/2012 | Endo et al. |
| 2012/0321898 A1 | 12/2012 | Meinhardt et al. |
| 2013/0017380 A1 | 1/2013 | Murata et al. |
| 2013/0101596 A1* | 4/2013 | DeMartino ............... A61J 1/00 424/142.1 |
| 2013/0122260 A1 | 5/2013 | Liang |
| 2013/0122284 A1 | 5/2013 | Gross |
| 2013/0183512 A1 | 7/2013 | Gy et al. |
| 2013/0186139 A1* | 7/2013 | Tanii ........................ C03C 23/00 65/30.12 |
| 2013/0189486 A1 | 7/2013 | Wang et al. |
| 2013/0203583 A1 | 8/2013 | Zhang et al. |
| 2013/0224492 A1 | 8/2013 | Bookbinder et al. |
| 2013/0274085 A1 | 10/2013 | Beall et al. |
| 2013/0288001 A1 | 10/2013 | Murata et al. |
| 2013/0288010 A1 | 10/2013 | Akarapu et al. |
| 2013/0323444 A1 | 12/2013 | Ehemann et al. |
| 2014/0106141 A1 | 4/2014 | Bellman et al. |
| 2014/0141226 A1 | 5/2014 | Bookbinder et al. |
| 2014/0154661 A1 | 6/2014 | Bookbinder et al. |
| 2014/0170380 A1 | 6/2014 | Murata et al. |
| 2014/0220327 A1 | 8/2014 | Adib et al. |
| 2014/0308526 A1 | 10/2014 | Chapman et al. |
| 2014/0356605 A1 | 12/2014 | Adib et al. |
| 2014/0364298 A1 | 12/2014 | Ohara et al. |
| 2014/0370302 A1 | 12/2014 | Amin et al. |
| 2015/0004390 A1 | 1/2015 | Kawamoto et al. |
| 2015/0030834 A1 | 1/2015 | Morey et al. |
| 2015/0030838 A1 | 1/2015 | Sellier et al. |
| 2015/0037586 A1 | 2/2015 | Gross |
| 2015/0044473 A1 | 2/2015 | Murata et al. |
| 2015/0064472 A1 | 3/2015 | Gross et al. |
| 2015/0064474 A1 | 3/2015 | Dejneka et al. |
| 2015/0074974 A1 | 3/2015 | Pesansky et al. |
| 2015/0093581 A1 | 4/2015 | Murata et al. |
| 2015/0111030 A1 | 4/2015 | Miyasaka et al. |
| 2015/0140325 A1 | 5/2015 | Gross et al. |
| 2015/0147574 A1 | 5/2015 | Allan et al. |
| 2015/0147576 A1 | 5/2015 | Bookbinder et al. |
| 2015/0152003 A1 | 6/2015 | Kawamoto et al. |
| 2015/0157533 A1 | 6/2015 | DeMartino et al. |
| 2015/0175469 A1 | 6/2015 | Tabe |
| 2015/0239775 A1 | 8/2015 | Amin et al. |
| 2015/0274585 A1 | 10/2015 | Rogers et al. |
| 2015/0329418 A1 | 11/2015 | Murata et al. |

FOREIGN PATENT DOCUMENTS

| | | |
|---|---|---|
| EP | 163873 B1 | 8/1989 |
| EP | 1314704 | 5/2003 |
| EP | 2415724 | 2/2012 |
| EP | 2594536 | 5/2013 |
| EP | 2666756 | 11/2013 |
| EP | 2762459 | 8/2014 |
| GB | 1026770 | 4/1966 |
| JP | 2004099370 | 4/2004 |
| JP | 2005139031 | 6/2005 |
| JP | 2005206406 | 8/2005 |

(56) References Cited

FOREIGN PATENT DOCUMENTS

| | | |
|---|---|---|
| JP | 2005289683 A | 10/2005 |
| JP | 2005289685 A | 10/2005 |
| JP | 2008007384 | 1/2008 |
| JP | 2008094713 | 4/2008 |
| JP | 2009107878 | 5/2009 |
| JP | 2014073953 A | 4/2014 |
| KR | 1302664 B1 | 9/2013 |
| WO | 2011041484 | 4/2011 |
| WO | 2011069338 | 6/2011 |
| WO | 2011097314 | 8/2011 |
| WO | 2011103799 A1 | 9/2011 |
| WO | 2011104035 | 9/2011 |
| WO | 2011149740 | 12/2011 |
| WO | 2011149811 | 12/2011 |
| WO | 2012126394 | 9/2012 |
| WO | 2013082246 | 6/2013 |
| WO | 2013130665 | 9/2013 |
| WO | 2013130721 | 9/2013 |
| WO | 2013184205 | 12/2013 |
| WO | 2014175144 | 10/2014 |
| WO | 2014180679 | 11/2014 |
| WO | 2015057552 | 4/2015 |
| WO | 2015057555 | 4/2015 |
| WO | 2015175595 | 11/2015 |
| WO | 2016014937 | 1/2016 |
| WO | 2016028554 | 2/2016 |

OTHER PUBLICATIONS

Brunkov et al; "Submicron-Resolved Relief Formation in Poled Glasses and Glass-Metal Nanocomposites"; Technical Physics Letters, 2008, vol. 34, No. 12 pp. 1030-1033.

ChemCor Product Specification.

Donald "Review Methods for Improving the Mechanical Properties of Oxide Glasses"; Journal of Materials Science 24 (1989) 4177-4208.

Glover et al; "The interactive whiteboard: a literature survey"; Technology, Pedagogy and Education (14) 2: 155-170.

Kitaigorodskii et al, In: Sb.Nauchn.Rabot Belor.Politekhn.Inst. ,Khimiya, Tekhnologiya i Istoriya Stekla i Keramiki, 1960, No. 86, p. 38. (The Synthesis of Thermo-stable glasses) Abstract Only.

Poumellec et al; "Surface topography change induced by poling in Ge doped silica glass films"; 2003 OSA/BGPP 2003 MD 38.

Rusan et al; "A New Method for Recording Phase Optical Structures in Glasses"; Glass Physics and Chemistry, 2010, vol. 36, No. 4, pp. 513-516.

Takagi et al; "Electrostatic Imprint Process for Glass"; Applied Physics Express 1 (20008) 024003.

Zheng et al; "Effect of $Y_2O_3$ addition on viscosity and crystallizationof the lithium aluminosilicate glasses"; Thermochimica Acta 456 (2007) 69-74.

Zheng et al; "Structure and Properties of the Lithium Aluminosilicate Glasses with Yttria Addition"; vol. 22, No. 2 Wuhan University of Technology—(Abstract).

Patent Cooperation Treaty, Partial International Search Report for International Application No. PCT/US2015/054681, mailed Nov. 11, 2015, 7 pages.

Corning leads $62M Investment in 'smart' glass maker view, Jun. 19, 2013; http://optics.org/news/4/6/27.

Patent Cooperation Treaty International Notification of Invitation to pay additional fees; international application No. PCT/US2015/054681: mailing date Dec. 14, 2015, 7 pages.

\* cited by examiner

600

GLASSES AND GLASS CERAMICS INCLUDING A METAL OXIDE CONCENTRATION GRADIENT

CROSS-REFERENCE TO RELATED APPLICATIONS

This application claims the benefit of priority under 35 U.S.C. §119 of U.S. Provisional Application Ser. No. 62/194,967, filed on Jul. 21, 2015, U.S. Provisional Application Ser. No. 62/171,110, filed on Jun. 4, 2015, U.S. Provisional Application Ser. No. 62/117,585, filed on Feb. 18, 2015, U.S., Provisional Application Ser. No. 62/061,372, filed on Oct. 8, 2014, the contents of which are relied upon and incorporated herein by reference in its entirety.

BACKGROUND

The disclosure relates to glass-based articles exhibiting improved damage resistance, including improved fracture resistance, and more particularly to glass and glass ceramic articles exhibiting a non-zero metal oxide concentration gradient or concentration that varies along a substantial portion of the thickness.

Glass-based articles often experience severe impacts that can introduce large flaws into a surface of such articles. Such flaws may extend to depths of up to about 200 micrometers from the surface. Traditionally, thermally tempered glass has been used to prevent failures where such flaws may be introduced to the glass because thermally tempered glass often exhibits large compressive stress (CS) layers (e.g., approximately 21% of the total thickness of the glass), which can prevent flaws from propagating and thus, failure. An example of a stress profile generated by thermal tempering is shown in FIG. 1. In FIG. 1, the thermally treated glass-based article 100 includes a first surface 101, a thickness $t_1$, and a surface CS 110. The glass-based article 100 exhibits a CS that decreases from the first surface 101 to a depth of layer (DOL) 130, as defined herein, at which depth the stress changes from compressive to tensile stress and reaches a maximum central tension (CT) 120.

Thermal tempering is currently limited to thick glass-based articles (i.e., glass-based articles having a thickness $t_1$ of about 3 millimeters or greater) because, to achieve the thermal strengthening and the desired residual stresses, a sufficient thermal gradient must be formed between the core of such articles and the surface. Such thick articles are undesirable or not practical in many applications such as displays (e.g., consumer electronics, including mobile phones, tablets, computers, navigation systems, and the like), architecture (e.g., windows, shower panels, countertops etc.), transportation (e.g., automotive, trains, aircraft, sea craft, etc.), appliances, or any application that requires superior fracture resistance but thin and light-weight articles.

Known chemically strengthened glass-based articles do not exhibit the stress profile of thermally tempered glass-based articles, although chemical strengthening is not limited by the thickness of the glass-based article in the same manner as thermally tempering. An example of a stress profile generated by chemical strengthening (e.g., by ion exchange process), is shown in FIG. 2. In FIG. 2, the chemically strengthened glass-based article 200 includes a first surface 201, a thickness $t_2$ and a surface CS 210. The glass-based article 200 exhibits a CS that decreases from the first surface 201 to a DOC 230, as defined herein, at which depth the stress changes from compressive to tensile stress and reaches a maximum CT 220. As shown in FIG. 2, such profiles exhibit a flat CT region or CT region with a constant or near constant tensile stress and, often, a lower maximum CT value, as compared to the maximum central value shown in FIG. 1.

Accordingly, there is a need for thin glass-based articles that exhibit improved fracture resistance.

SUMMARY

A first aspect of this disclosure pertains to a glass-based article including a first surface and a second surface opposing the first surface defining a thickness (t) (e.g., about 3 millimeters or less, 1 millimeter or less or about 0.5 millimeters or less), and a stress profile extending along the thickness. In one or more embodiments, wherein all points of the stress profile between a thickness range from about 0·t up to about 0.3·t and greater than 0.7·t comprise a tangent that is less than about −0.1 MPa/micrometers or greater than about 0.1 MPa/micrometers.

In some embodiments, the glass-based article includes a non-zero metal oxide concentration that varies along a substantial portion of the thickness or the entire thickness. The variation in metal oxide concentration may be referred to herein as a gradient. In some embodiments, the concentration of a metal oxide is non-zero and varies, both along a thickness range from about 0·t to about 0.3·t. In some embodiments, the concentration of the metal oxide is non-zero and varies along a thickness range from about 0·t to about 0.35·t, from about 0t to about 0.4·t, from about 0·t to about 0.45·t or from about 0·t to about 0.48·t. The metal oxide may be described as generating a stress in the glass-based article. Variation in metal oxide concentration may include a change of about 0.2 mol % along a thickness segment of about 100 micrometers. The variation in concentration may be continuous along the above-referenced thickness ranges. In some embodiments, the variation in concentration may be continuous along thickness segments in the range from about 10 micrometers to about 30 micrometers.

In some embodiments, the concentration of the metal oxide decreases from the first surface to a point between the first surface and the second surface and increases from the point to the second surface.

As used herein, the metal oxide comprises strengthening ions or ions that generate CS in a glass-based article. In some embodiments, the metal oxide has the largest ionic diameter of all of the total metal oxides in the glass-based substrate. In one or more embodiments, metal oxide(s) may include alkali metal oxide(s), or combinations of different metal oxides or alkali metal oxides. Exemplary metal oxides include $Ag_2O$. Exemplary alkali metal oxides include any one or more of $Li_2O$, $Na_2O$, $K_2O$, $Rb_2O$, and $Cs_2O$. The metal oxide(s) may be present in a non-zero concentration of that particular metal oxide(s) that varies along a substantial portion or the entire thickness of the glass-based article. In some embodiments, the concentration of the metal oxide(s) decreases from the first surface to a point between the first surface and the second surface and increases from the point to the second surface. The concentration of the metal oxide (s) may be non-zero at the point.

The concentration of the metal oxide(s) may be about 0.05 mol % or greater or about 1 mol % or greater throughout the thickness. For example, the concentration of $Na_2O$ may be about 0.05 mol % or greater throughout the thickness of the glass-based article but such concentration of $Na_2O$ decreases from the first surface to a point between the first surface and the second surface and increases from the point to the second surface. In some examples, the total concentration of the metal oxide(s) along the entire thickness of the glass-based article is in the range from about 1 mol % to about 20 mol %. In some embodiments, the concentration of the metal oxide(s) near the surface may be more than 1 times or 1.5 times (e.g. 5 times, 10 times, 15 times or even 20 times), the concentration of that same metal oxide(s) at a depth in the range from about 0.4·t to about 0.6·t. The concentration of the metal oxide(s) may be determined from a baseline amount of that metal oxide(s) concentration in the glass-based article prior to being modified to exhibit the concentration profile (i.e., gradient or variation, as described herein).

In one or more embodiments, the glass-based article includes a first metal oxide concentration and a second metal oxide concentration, such that the first metal oxide concentration is in the range from about 0 mol % to about 15 mol % along a first thickness range from about 0t to about 0.5t, and the second metal oxide concentration is in the range from about 0 mol % to about 10 mol % from a second thickness range from about 0 micrometers to about 25 micrometers. The glass-based article may include an optional third metal oxide concentration. The first metal oxide may be $Na_2O$ and the second metal oxide may be $K_2O$.

In one or more embodiments, the glass-based article includes a surface CS of about 150 MPa or greater or about 200 MPa or greater. In one or more embodiments, the glass-based article may exhibit a surface CS of greater than about 300 MPa, greater than about 600 MPa or greater than about 700 MPa. The glass-based article may exhibit a chemical depth of about 0.4·t or greater.

In some embodiments, the glass-based article may include a CS layer extending from the first surface to a DOC of about 0.1·t or greater. In some instances, the glass-based article includes a layer of CT, which includes the non-zero metal oxide concentration that varies along a substantial portion of the thickness t. The layer of CT may exhibit a maximum CT such that the ratio of maximum CT to surface CS is in the range from about 0.01 to about 0.5. The maximum CT may be about 25 MPa or greater.

In one or more embodiments, the glass-based article may exhibit a fracture resistance such that, when the glass-based article is fractured, the glass-based article fractures into at least 2 fragments/inch$^2$. In some instances, the glass-based article may fracture into 3 fragments/inch$^2$ or more, 5 fragments/inch$^2$ or more, or 10 fragments/inch$^2$ or more.

In some instances, the glass-based article may exhibit a stored tensile energy of about greater than 0 J/m$^2$ to less than 20 J/m$^2$.

The CT region of one or more embodiments of the glass-based article may exhibit a stress profile defined by the equation:

$$Stress(x)=MaxCT-(((MaxCT\cdot(n+1))/0.5^n)\cdot|(x/t)-0.5|^n),$$

wherein MaxCT is a maximum CT value and provided as a positive value in units of MPa, x is position along the thickness (t) in micrometers, and $n$ is between 1.5 and 5 (or between 1.8 to about 2).

The glass-based article may include an amorphous structure, a crystalline structure or a combination thereof. The glass-based article may be transparent or opaque. In some embodiments, the glass-based article exhibits a substantially white color or a substantially black color. Additionally or alternatively, the glass-based article may include a colorant that provides a specific color.

A second aspect of this disclosure pertains to an amorphous glass substrate comprising a composition including, in mol %, $SiO_2$ in an amount in the range from about 68 to about 75, $Al_2O_3$ in an amount in the range from about 12 to about 15, $B_2O_3$ in an amount in the range from about 0.5 to about 5, $Li_2O$ in an amount in the range from about 2 to about 8, $Na_2O$ in an amount in the range from about 0 to about 6, MgO in an amount in the range from about 1 to about 4, ZnO in an amount in the range from about 0 to about 3, and CaO in an amount in the range from about 0 to about 5. In some embodiments, the glass substrate exhibits any one or more of a ratio of $Li_2O$ to $R_2O$ in the range from about 0.5 to about 1; a difference between a total amount of $R_2O$ to the amount of $Al_2O_3$ in the range from about −5 to about 0; a difference between a total amount of $R_xO$ (in mol %) and the amount of $Al_2O_3$ in the range from about 0 to about 3; and a ratio of the amount of MgO (in mol %) to a total amount of RO (in mol %) in the range from about 0 to about 2.

In one or more embodiments, the glass substrate is ion-exchangeable. In other embodiments, the glass substrate is strengthened by an ion exchange process.

A third aspect of this disclosure pertains to a method of forming a fracture resistant glass-based article as described herein. Embodiments of the method include providing a glass-based substrate having a first surface and a second surface defining a thickness of about 3 millimeter or less, generating a stress profile in the glass-based substrate comprising a CT layer and a CS layer, wherein the CS layer has a surface CS, a chemical depth of about 0.4t or greater and a DOC of about 0.1·t or greater, and wherein the CT layer comprises a maximum CT and the ratio of maximum CT to surface CS is from about 0.01 to about 0.5.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
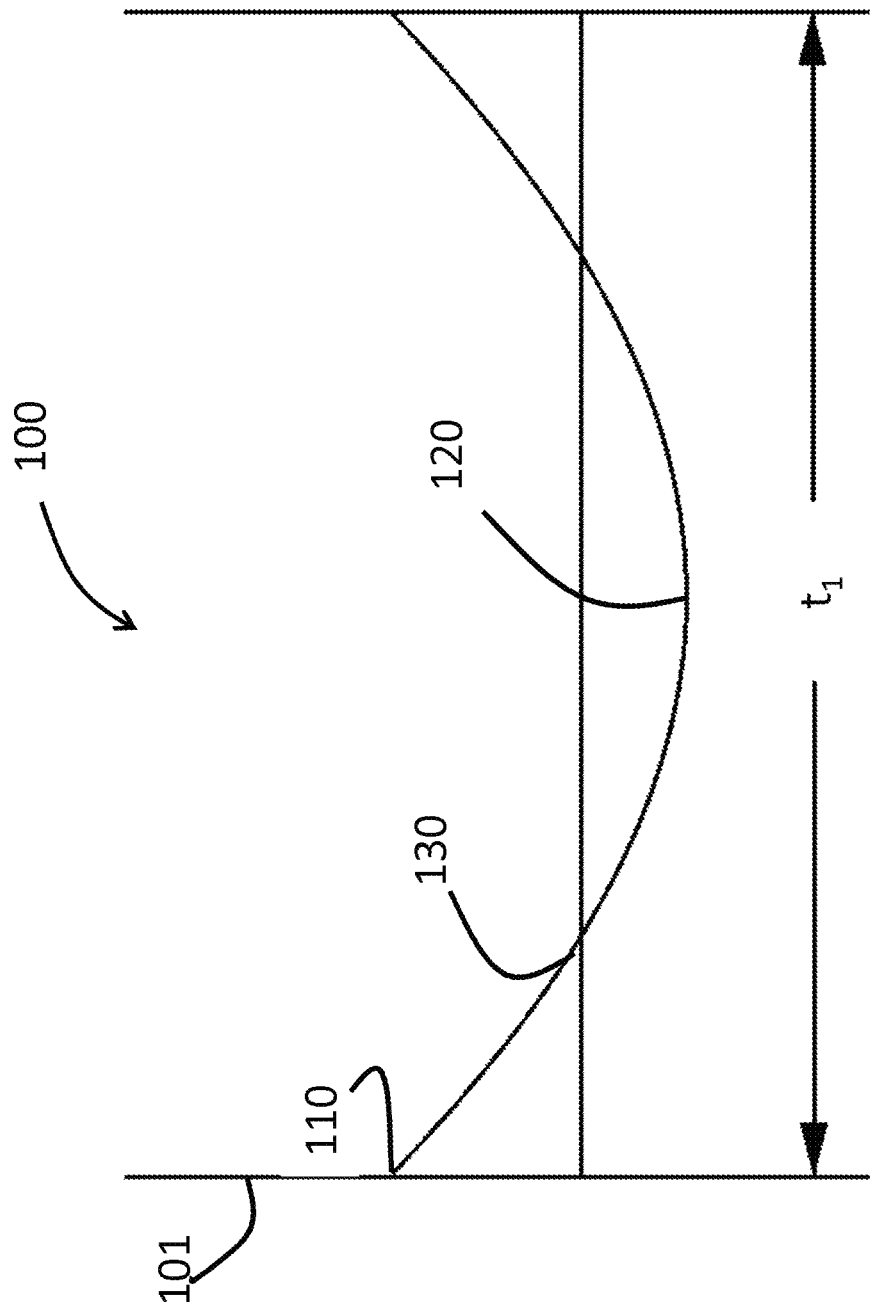
FIG. 1 is a cross-sectional view across a thickness of a known thermally tempered glass-based article.

Reference will now be made in detail to various embodiments, examples of which are illustrated in the accompanying examples and drawings.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass-based article" and "glass-based substrates" are used in their broadest sense to include any object made wholly or partly of glass. Glass-based articles include laminates of glass and non-glass materials, laminates of glass and crystalline materials, and glass-ceramics (including an amorphous phase and a crystalline phase). Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant.

Figure 2:
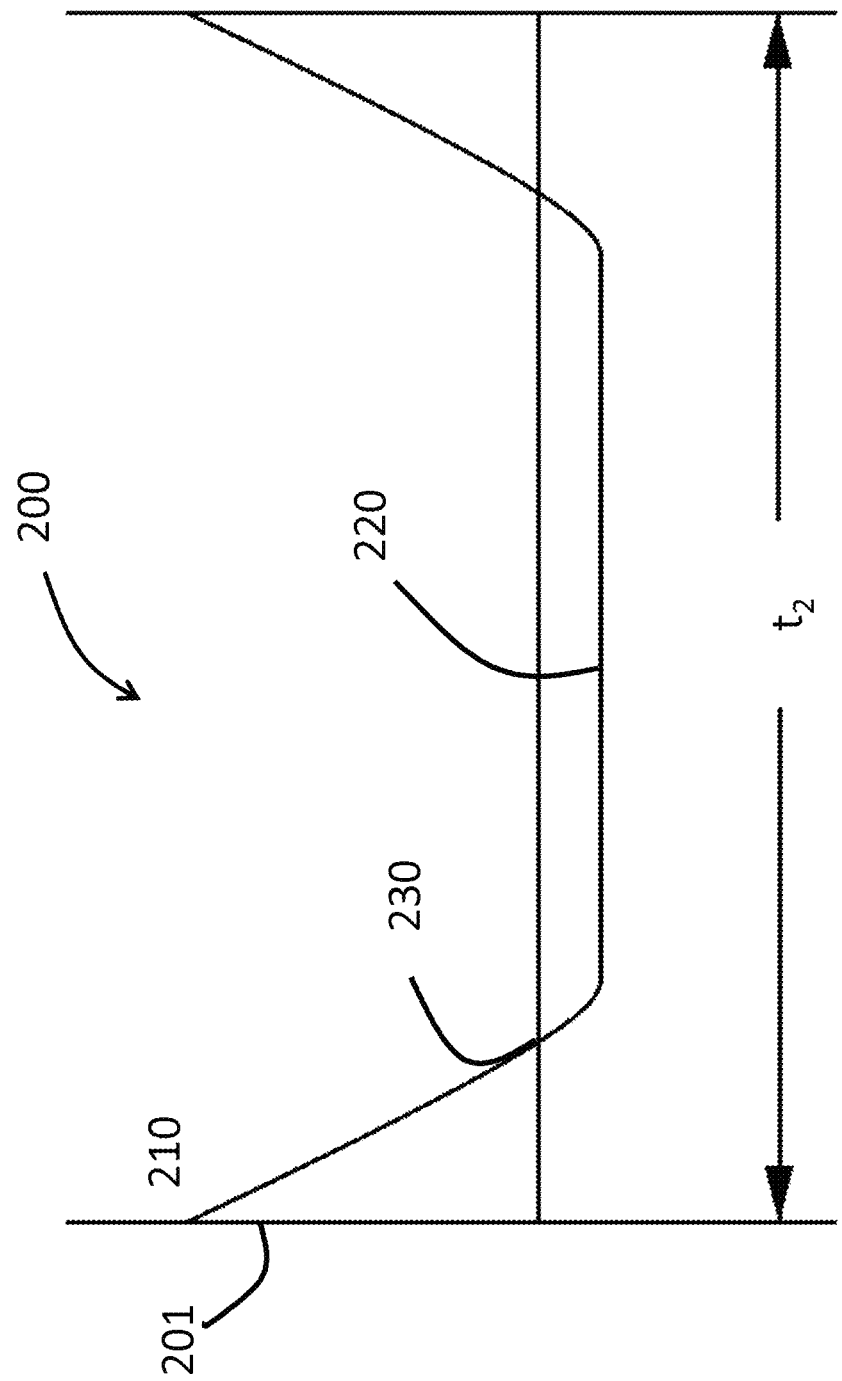
FIG. 2 is a cross-sectional view across a thickness of a known chemically strengthened glass-based article.
Figure 3:
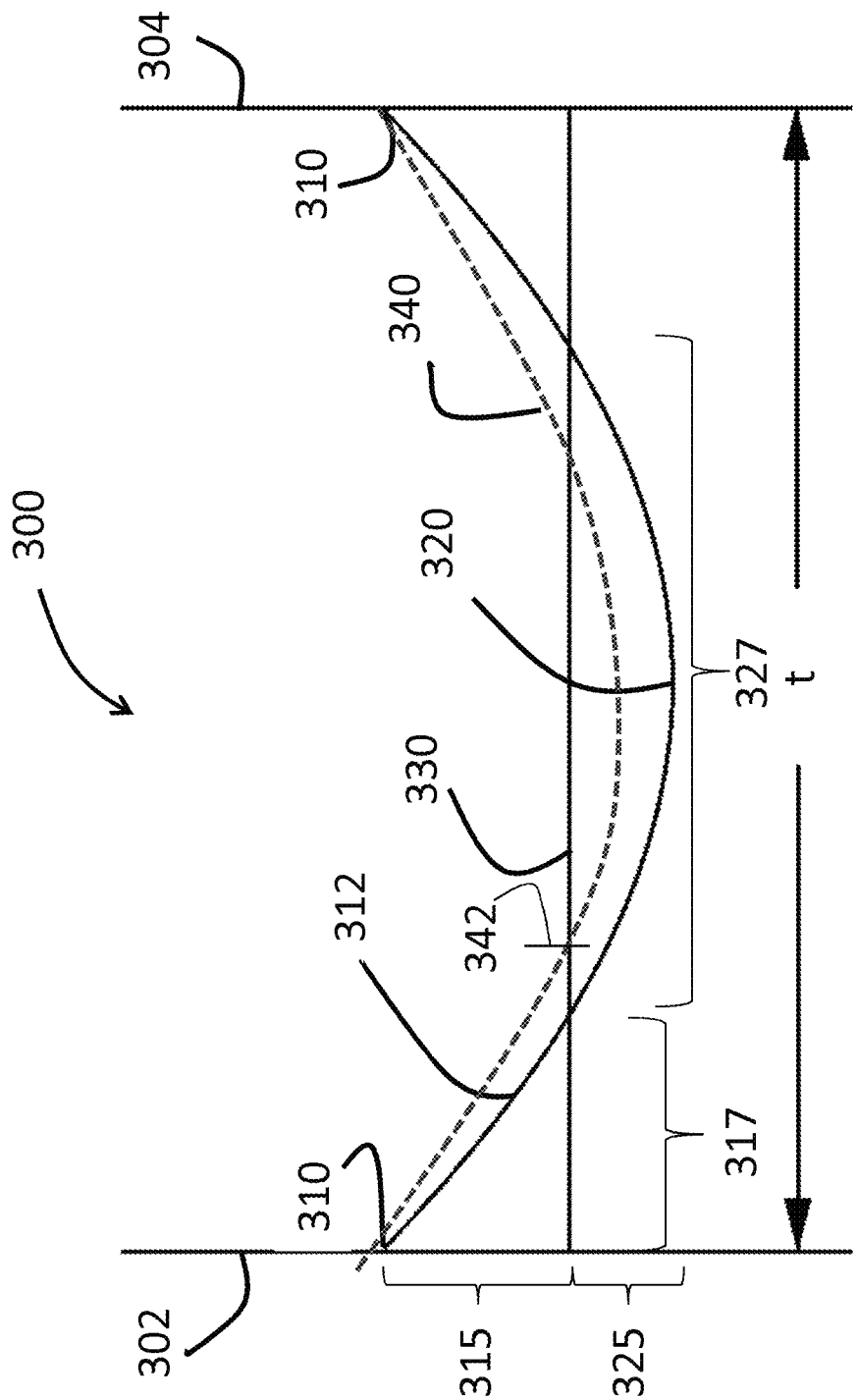
FIG. 3 is a cross-sectional view across a thickness of a chemically strengthened glass-based article according to one or more embodiments of this disclosure.

Referring to the drawings in general and to FIGS. 1-3 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, DOC refers to the depth at which the stress within the glass-based article changes compressive to tensile stress. At the DOC, the stress crosses from a positive (compressive) stress to a negative (tensile) stress (e.g., 130 in FIG. 1) and thus exhibits a stress value of zero.

As used herein, the terms "chemical depth", "chemical depth of layer" and "depth of chemical layer" may be used interchangeably and refer to the depth at which an ion of the metal oxide or alkali metal oxide (e.g., the metal ion or alkali metal ion) diffuses into the glass-based article and the depth at which the concentration of the ion reaches a minimum value, as determined by Electron Probe Micro-Analysis (EPMA) or Glow Discharge -Optival Emission Spectroscopy (GD-OES)). In particular, to assess the depth of $Na_2O$ diffusion or Na+ ion concentration may be determined using EPMA and FSM (described in more detail below).

According to the convention normally used in the art, compression is expressed as a negative (<0) stress and tension is expressed as a positive (>0) stress. Throughout this description, however, CS is expressed as a positive or absolute value—i.e., as recited herein, CS=|CS|.

Described herein are thin, chemically strengthened glass-based articles that include glasses, such as silicate glasses including alkali-containing glass, and glass-ceramics that may be used as a cover glass for mobile electronic devices and touch-enabled displays. The glass-based articles may also be used in displays (or as display articles) (e.g., billboards, point of sale systems, computers, navigation systems, and the like), architectural articles (walls, fixtures, panels, windows, etc.), transportation articles (e.g., in automotive applications, trains, aircraft, sea craft, etc.), appliances (e.g., washers, dryers, dishwashers, refrigerators and the like), or any article that requires some fracture resistance.

In particular, the glass-based articles described herein are thin and exhibit stress profiles that are typically only achievable through tempering thick glass articles (e.g., having a thickness of about 2 mm or 3 mm or greater). The glass-based articles exhibit unique stress profiles along the thickness thereof In some cases, the glass-based articles exhibit a greater surface CS than tempered glass articles. In one or more embodiments, the glass-based articles exhibit a larger depth of the compression layer (in which the CS decreases and increases more gradually than known chemically strengthened glass-based articles) such the glass-based article exhibits substantially improved fracture resistance, even when the glass-based article or a device including the same is dropped on a hard, rough surface. The glass-based articles of one or more embodiments exhibit a greater maximum CT value than some known chemically strengthened glass substrates.

CS and depth of compressive stress layer ("DOL") are measured using those means known in the art. DOL is distinguished from DOC by measurement technique in that DOL is determined by surface stress meter (FSM) using commercially available instruments such as the FSM-6000, manufactured by Luceo Co., Ltd. (Tokyo, Japan), or the like, and methods of measuring CS and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

For strengthened glass-based articles in which the CS layers extend to deeper depths within the glass-based article, the FSM technique may suffer from contrast issues which affect the observed DOL value. At deeper DOL values, there may be inadequate contrast between the TE and TM spectra, thus making the calculation of the difference between TE and TM spectra—and determining the DOL—more difficult. Moreover, the FSM technique is incapable of determining the stress profile (i.e., the variation of CS as a function of depth within the glass-based article). In addition, the FSM technique is incapable of determining the DOL resulting from the ion exchange of certain elements such as, for example, sodium for lithium.

The techniques described below have been developed to yield more accurately determine the DOC and stress profiles for strengthened glass-based articles.

In U.S. patent application Ser. No. 13/463,322, entitled "Systems And Methods for Measuring the Stress Profile of Ion-Exchanged Glass (hereinafter referred to as "Roussev I")," filed by Rostislav V. Roussev et al. on May 3, 2012, and claiming priority to U.S. Provisional Patent Application No. 61/489,800, having the same title and filed on May 25, 2011, two methods for extracting detailed and precise stress profiles (stress as a function of depth) of tempered or chemically strengthened glass are disclosed. The spectra of bound optical modes for TM and TE polarization are collected via prism coupling techniques, and used in their entirety to obtain detailed and precise TM and TE refractive index profiles $n_{TM}(z)$ and $n_{TE}(z)$. The contents of the above applications are incorporated herein by reference in their entirety.

In one embodiment, the detailed index profiles are obtained from the mode spectra by using the inverse Wentzel-Kramers-Brillouin (IWKB) method.

In another embodiment, the detailed index profiles are obtained by fitting the measured mode spectra to numerically calculated spectra of pre-defined functional forms that describe the shapes of the index profiles and obtaining the parameters of the functional forms from the best fit. The detailed stress profile S(z) is calculated from the difference of the recovered TM and TE index profiles by using a known value of the stress-optic coefficient (SOC):

$$S(z)=[n_{TM}(z)-n_{TE}(z)]/SOC \qquad (2).$$

Due to the small value of the SOC, the birefringence $n_{TM}(z)-n_{TE}(z)$ at any depth z is a small fraction (typically on the order of 1%) of either of the indices $n_{TM}(z)$ and $n_{TE}(z)$. Obtaining stress profiles that are not significantly distorted due to noise in the measured mode spectra requires determination of the mode effective indices with precision on the order of 0.00001 RIU. The methods disclosed in Roussev I further include techniques applied to the raw data to ensure such high precision for the measured mode indices, despite noise and/or poor contrast in the collected TE and TM mode spectra or images of the mode spectra. Such techniques include noise-averaging, filtering, and curve fitting to find the positions of the extremes corresponding to the modes with sub-pixel resolution.

Similarly, U.S. patent application Ser. No. 14/033,954, entitled "Systems and Methods for Measuring Birefringence in Glass and Glass-Ceramics (hereinafter "Roussev II")," filed by Rostislav V. Roussev et al. on Sep. 23, 2013, and claiming priority to U.S. Provisional Application Ser. No. 61/706,891, having the same title and filed on Sep. 28, 2012, discloses apparatus and methods for optically measuring birefringence on the surface of glass and glass ceramics, including opaque glass and glass ceramics. Unlike Roussev I, in which discrete spectra of modes are identified, the methods disclosed in Roussev II rely on careful analysis of the angular intensity distribution for TM and TE light reflected by a prism-sample interface in a prism-coupling configuration of measurements. The contents of the above applications are incorporated herein by reference in their entirety.

Hence, correct distribution of the reflected optical intensity vs. angle is much more important than in traditional prism-coupling stress-measurements, where only the locations of the discrete modes are sought. To this end, the methods disclosed in Roussev 1 and Roussev II comprise techniques for normalizing the intensity spectra, including normalizing to a reference image or signal, correction for nonlinearity of the detector, averaging multiple images to reduce image noise and speckle, and application of digital filtering to further smoothen the intensity angular spectra. In addition, one method includes formation of a contrast signal, which is additionally normalized to correct for fundamental differences in shape between TM and TE signals. The aforementioned method relies on achieving two signals that are nearly identical and determining their mutual displacement with sub-pixel resolution by comparing portions of the signals containing the steepest regions. The birefringence is proportional to the mutual displacement, with a coefficient determined by the apparatus design, including prism geometry and index, focal length of the lens, and pixel spacing on the sensor. The stress is determined by multiplying the measured birefringence by a known stress-optic coefficient.

In another disclosed method, derivatives of the TM and TE signals are determined after application of some combination of the aforementioned signal conditioning techniques. The locations of the maximum derivatives of the TM and TE signals are obtained with sub-pixel resolution, and the birefringence is proportional to the spacing of the above two maxima, with a coefficient determined as before by the apparatus parameters.

Associated with the requirement for correct intensity extraction, the apparatus comprises several enhancements, such as using a light-scattering surface (static diffuser) in close proximity to or on the prism entrance surface to improve the angular uniformity of illumination, a moving diffuser for speckle reduction when the light source is coherent or partially coherent, and light-absorbing coatings on portions of the input and output facets of the prism and on the side facets of the prism, to reduce parasitic background which tends to distort the intensity signal. In addition, the apparatus may include an infrared light source to enable measurement of opaque materials.

Furthermore, Roussev II discloses a range of wavelengths and attenuation coefficients of the studied sample, where measurements are enabled by the described methods and apparatus enhancements. The range is defined by $\alpha_s\lambda<250\pi\sigma_s$, where $\alpha_s$ is the optical attenuation coefficient at measurement wavelength $\lambda$, and $\sigma_s$ is the expected value of the stress to be measured with typically required precision for practical applications. This wide range allows measurements of practical importance to be obtained at wavelengths where the large optical attenuation renders previously existing measurement methods inapplicable. For example, Roussev II discloses successful measurements of stress-induced birefringence of opaque white glass-ceramic at a wavelength of 1550 nm, where the attenuation is greater than about 30 dB/mm.

While it is noted above that there are some issues with the FSM technique at deeper DOL values, FSM is still a beneficial conventional technique which may utilized with the understanding that an error range of up to +/−20% is possible at deeper DOL values. DOL as used herein refers to depths of the compressive stress layer values computed using the FSM technique, whereas DOC refer to depths of the compressive stress layer determined by the methods described in Roussev I & II.

As stated above, the glass-based articles described herein may be chemically strengthened by ion exchange and exhibit stress profiles that are distinguished from those exhibited by known strengthened glass. In this process, ions at or near the surface of the glass-based article are replaced by—or exchanged with—larger ions having the same valence or oxidation state. In those embodiments in which the glass-based article comprises an alkali aluminosilicate glass, ions in the surface layer of the glass and the larger ions are monovalent alkali metal cations, such as $Li^+$ (when present in the glass-based article), $Na^+$, $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing a glass-based article in a molten salt bath (or two or more molten salt baths) containing the larger ions to be exchanged with the smaller ions in the glass-based article. It should be noted that aqueous salt baths may also be utilized. In addition, the composition of the bath(s) may include more than one type of larger ion (e.g., $Na^+$ and $K^+$) or a single larger ion. It will be appreciated by those skilled in the art that parameters for the ion exchange process, including, but not limited to, bath composition and temperature, immersion time, the number of immersions of the glass-based article in a salt bath (or baths), use of multiple salt baths, additional steps such as annealing, washing, and the like, are generally determined by the composition of the glass-based article (including the structure of the article and any crystalline phases present) and the desired DOL or DOC and CS of the glass-based article that result from the strengthening operation. By way of example, ion exchange of glass-based articles may be achieved by immersion of the glass-based articles in at least one molten bath containing a salt such as, but not limited to, nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass thickness, bath temperature and glass diffusivity. However, temperatures and immersion times different from those described above may also be used.

In one or more embodiments, the glass-based articles may be immersed in a molten salt bath of 100% $NaNO_3$ having a temperature from about 370° C. to about 480° C. In some embodiments, the glass-based substrate may be immersed in a molten mixed salt bath including from about 5% to about 90% $KNO_3$ and from about 10% to about 95% $NaNO_3$. In some embodiments, the glass-based substrate may be immersed in a molten mixed salt bath including $Na_2SO_4$ and $NaNO_3$ and have a wider temperature range (e.g., up to about 500° C.). In one or more embodiments, the glass-based article may be immersed in a second bath, after immersion in a first bath Immersion in a second bath may include immersion in a molten salt bath including 100% $KNO_3$ for 15 minutes to 8 hours.

Ion exchange conditions can be tailored to provide a "spike" or to increase the slope of the stress profile at or near the surface. This spike can be achieved by single bath or multiple baths, with the bath(s) having a single composition or mixed composition, due to the unique properties of the glass compositions used in the glass-based articles described herein.

As illustrated in FIG. 3, the glass-based article 300 of one or more embodiments includes a first surface 302 and a second surface 304 opposing the first surface, defining a thickness t. In one or more embodiments, the thickness t may be about 3 millimeter or less (e.g., in the range from about 0.01 millimeter to about 3 millimeter, from about 0.1 millimeter to about 3 millimeter, from about 0.2 millimeter to about 3 millimeter, from about 0.3 millimeter to about 3 millimeter, from about 0.4 millimeter to about 3 millimeter, from about 0.01 millimeter to about 2.5 millimeter, from about 0.01 millimeter to about 2 millimeter, from about 0.01 millimeter to about 1.5 millimeter, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter.)

The glass-based article includes a stress profile that extends from the first surface 302 to the second surface 304 (or along the entire length of the thickness t). In the embodiment shown in FIG. 3, the stress profile 312 as measured by Roussev I & II as described herein is shown along with the stress profile 340 estimated by FSM measurement techniques as described herein. The x-axis represents the stress value and the y-axis represents the thickness or depth within the glass-based article.

As illustrated in FIG. 3, the stress profile 312 exhibits a CS layer 315 (with a surface CS 310), a CT layer 325 (with a maximum CT 320) and a DOC 317 at which the stress profile 312 turns from compressive to tensile at 330. The CT layer 325 also has an associated depth or length 327 (CT region or layer). The estimated stress profile 340 exhibits a DOL that is greater than the DOC. As used herein, reference to the DOC and DOL is with respect to each depth from one surface (either the first surface 302 or the second surface 304), with the understanding that such DOC or DOL may also be present from the other surface.

The surface CS 310 may be about 150 MPa or greater or about 200 MPa or greater (e.g., about 250 MPa or greater, about 300 MPa or greater, about 400 MPa or greater, about 450 MPa or greater, about 500 MPa or greater, or about 550 MPa or greater). The surface CS 310 may be up to about 900 MPa, up to about 1000 MPa, up to about 1100 MPa, or up to about 1200 MPa. The maximum CT 320 may be about 25 MPa or greater, about 50 MPa or greater or about 100 MPa or greater (e.g., about 150 MPa or greater, about 200 MPa or greater, 250 MPa or greater, or about 300 MPa or greater). In some embodiments, the maximum CT 320 may be in the range from about 50 MPa to about 250 MPa (e.g., from about 75 MPa to about 250 MPa, from about 100 MPa to about 250 MPa, from about 150 MPa to about 250 MPa, from about 50 MPa to about 175 MPa, from about 50 MPa to about 150 MPa, or from about 50 MPa to about 100 MP). The maximum CT 320 may be positioned at a range from about 0.3·t to about 0.7·t, from about 0.4·t to about 0.6·t or from about 0.45·t to about 0.55·t. It should be noted that any one or more of surface CS 310 and maximum CT 320 may be dependent on the thickness of the glass-based article. For example, glass-based articles having at thickness of about 0.8 mm may have a maximum CT of about 100 MPa or greater. When the thickness of the glass-based article decreases, the maximum CT may increase. In other words, the maximum CT increases with decreasing thickness (or as the glass-based article becomes thinner).

In some embodiments, the ratio of the maximum CT 320 to the surface CS 310 in the range from about 0.05 to about 1 (e.g., in the range from about 0.05 to about 0.5, from about 0.05 to about 0.3, from about 0.05 to about 0.2, from about 0.05 to about 0.1, from about 0.5 to about 0.8, from about 0.0.5 to about 1, from about 0.2 to about 0.5, from about 0.3 to about 0.5). In known chemically strengthened glass-based articles, the ratio of the maximum CT 320 to the surface CS 310 is 0.1 or less. In some embodiments, surface CS may be 1.5 times (or 2 times or 2.5 times) the maximum CT or greater. In some embodiments, the surface CS may be up to about 20 times the maximum CT.

In one or more embodiments, the stress profile 312 comprises a maximum CS, which is typically the surface CS 310, which can be found at one or both of the first surface 302 and the second surface 304. In one or more embodiments, the CS layer or region 315 extends along a portion of the thickness to the DOC 317 and a maximum CT 320. In one or more embodiments, the DOC 317 may be about 0.1·t or greater. For example, the DOC 317 may be about 0.12·t or greater, about 0.14·t or greater, about 0.15·t or greater, about 0.16·t or greater, 0.17·t or greater, 0.18·t or greater, 0.19·t or greater, 0.20·t or greater, about 0.21·t or greater, or up to about 0.25·t. In some embodiments, the DOC 317 is less than the chemical depth 342. The chemical depth 342 may be about 0.4·t or greater, 0.5·t or greater, about 55·t or greater, or about 0.6·t or greater. In one or more embodiments, the stress profile 312 may be described as parabolic-like in shape. In some embodiments, the stress profile along the region or depth of the glass-based article exhibiting tensile stress exhibits a parabolic-like shape. In one or more specific embodiments, the stress profile 312 is free of a flat stress (i.e., compressive or tensile) portion or a portion that exhibits a substantially constant stress (i.e., compressive or tensile). In some embodiments, the CT region exhibits a stress profile that is substantially free of a flat stress or free of a substantially constant stress. In one or more embodiments, all points of the stress profile 312 between a thickness range from about 0t up to about 0.2·t and greater than 0.8·t (or from about 0·t to about 0.3·t and greater than 0.7·t) comprise a tangent that is less than about −0.1 MPa/micrometers or greater than about 0.1 MPa/micrometers. In some embodiments, the tangent may be less than about −0.2 MPa/micrometers or greater than about 0.2 MPa/micrometers. In some more specific embodiments, the tangent may be less than about −0.3 MPa/micrometers or greater than about 0.3 MPa/micrometers. In an even more specific embodiment, the tangent may be less than about −0.5 MPa/micrometers or greater than about 0.5 MPa/micrometers. In other words, the stress profile of one or more embodiments along these thickness ranges (i.e., 0·t up to about 2·t and greater than 0.8t, or from about 0t to about 0.3·t and 0.7·t or greater) exclude points having a tangent, as described herein. Without being bound by theory, known error function or quasi-linear stress profiles have points along these thickness ranges (i.e., 0·t up to about 2·t and greater than 0.8·t, or from about 0·t to about 0.3·t and 0.7·t or greater) that have a tangent that is from about −0.1 MPa/micrometers to about 0.1 MPa/micrometers, from about −0.2 MPa/micrometers to about 0.2 MPa/micrometers, from about −0.3 MPa/micrometers to about 0.3 MPa/micrometers, or from about −0.5 MPa/micrometers to about 0.5 MPa/micrometers (indicating a flat or zero slope stress profile along such thickness ranges, as shown in FIG. 2, 220). The stress profiles of one or more embodiments of this disclosure do not exhibit such a stress profile having a flat or zero slope stress profile along these thickness ranges, as shown in FIG. 3.

In one or more embodiments, the glass-based article exhibits a stress profile a thickness range from about 0.1·t to 0.3·t and from about 0.7·t to 0.9·t that comprises a maximum tangent and a minimum tangent. In some instances, the difference between the maximum tangent and the minimum tangent is about 3.5 MPa/micrometers or less, about 3 MPa/micrometers or less, about 2.5 MPa/micrometers or less, or about 2 MPa/micrometers or less.

In one or more embodiments, the stress profile 312 is substantially free of any linear segments that extend in a depth direction or along at least a portion of the thickness t of the glass-based article. In other words, the stress profile 312 is substantially continuously increasing or decreasing along the thickness t. In some embodiments, the stress profile is substantially free of any linear segments in a depth direction having a length of about 10 micrometers or more, about 50 micrometers or more, or about 100 micrometers or more, or about 200 micrometers or more. As used herein, the term "linear" refers to a slope having a magnitude of less than about 5 MPa/micrometer, or less than about 2 MPa/micrometer along the linear segment. In some embodiments, one or more portions of the stress profile that are substantially free of any linear segments in a depth direction are present at depths within the glass-based article of about 5 micrometers or greater (e.g., 10 micrometers or greater, or 15 micrometers or greater) from either one or both the first surface or the second surface. For example, along a depth of about 0 micrometers to less than about 5 micrometers from the first surface, the stress profile may include linear segments, but from a depth of about 5 micrometers or greater from the first surface, the stress profile may be substantially free of linear segments.

In some embodiments, the stress profile may include linear segments at depths from about 0t up to about 0.1t and may be substantially free of linear segments at depths of about 0.1t to about 0.4t. In some embodiments, the stress profile from a thickness in the range from about 0t to about 0.1t may have a slope in the range from about 20 MPa/microns to about 200 MPa/microns. As will be described herein, such embodiments may be formed using a single ion-exchange process by which the bath includes two or more alkali salts or is a mixed alkali salt bath or multiple (e.g., 2 or more) ion exchange processes.

In one or more embodiments, the glass-based article may be described in terms of the shape of the stress profile along the CT region (327 in FIG. 3). For example, in some embodiments, the stress profile along the CT region (where stress is in tension) may be approximated by equation. In some embodiments, the stress profile along the CT region may be approximated by equation (1):

$$\text{Stress}(x) = \text{MaxCT} - (((\text{MaxCT} \cdot (n+1))/0.5^n) \cdot |(x/t) - 0.5|^n) \quad (1)$$

Figure 39:
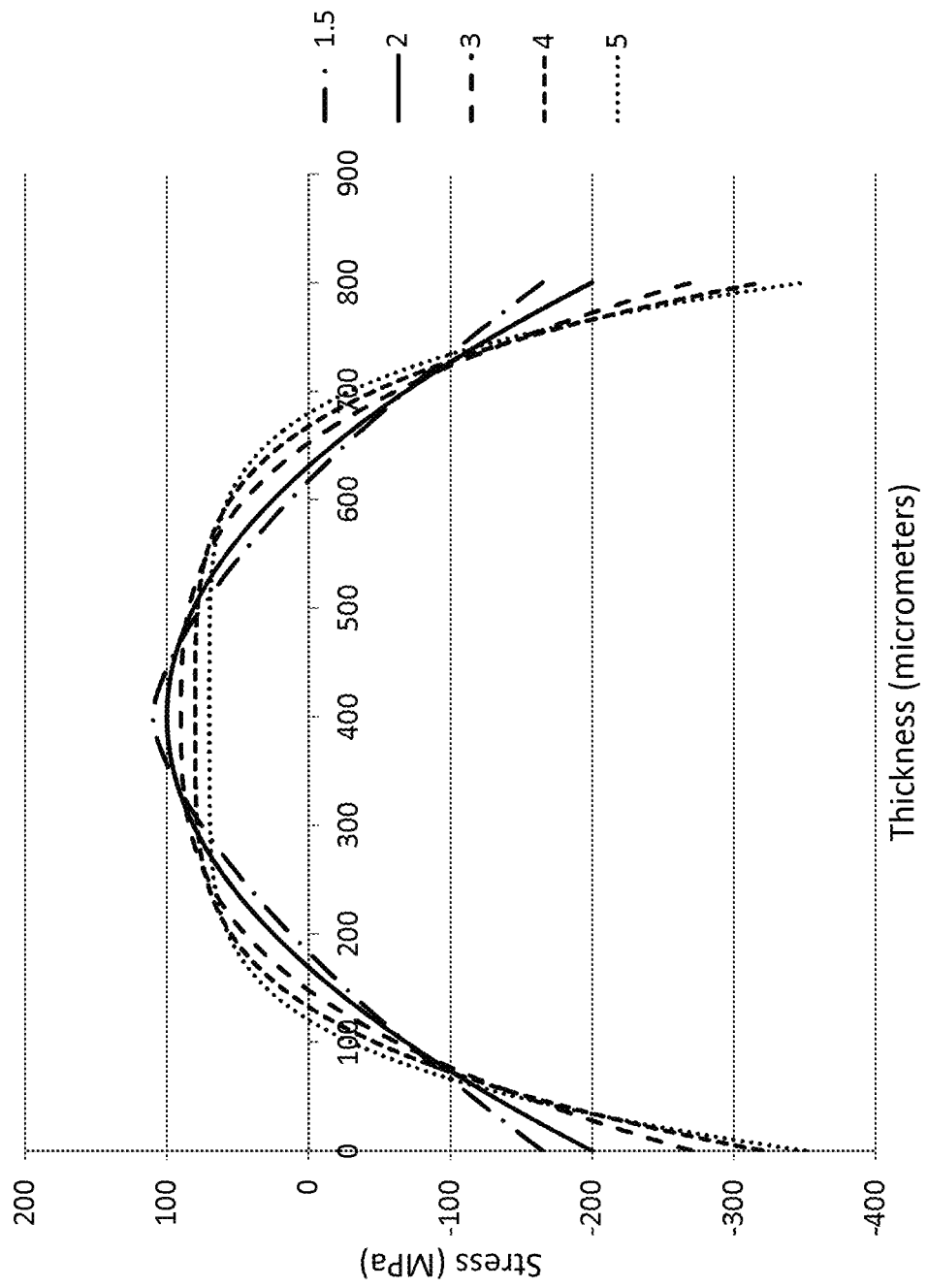
FIG. 39 is a graph illustrating various stress profiles according to one or more embodiments of this disclosure.

In equation (1), the stress (x) is the stress value at position x. Here the stress is positive (tension). MaxCT is the maximum central tension as a positive value in MPa. The value x is position along the thickness (t) in micrometers, with a range from 0 to t; x=0 is one surface (302, in FIG. 3), x=0.5t is the center of the glass-based article, stress(x)=MaxCT, and x=t is the opposite surface (304, in FIG. 3). MaxCT used in equation (1) may be in the range from about 50 MPa to about 350 MPa (e.g., 60 MPa to about 300 MPa, or from about 70 MPa to about 270 MPa), and n is a fitting parameter from 1.5 to 5 (e.g., 2 to 4, 2 to 3 or 1.8 to 2.2) whereby n=2 can provide a parabolic stress profile, exponents that deviate from n=2 provide stress profiles with near parabolic stress profiles. FIG. 39 shows illustrative stress profiles for different combinations of MaxCT and n (from 1.5 to 5 as indicated in the legend), for a glass-based article having a thickness of 0.8 mm.

In some embodiments, the stress profile may be modified by heat treatment. In such embodiments, the heat treatment may occur before any ion-exchange processes, between ion-exchange processes, or after all ion-exchange processes. In some embodiments, the heat treatment may result reduce the slope of the stress profile at or near the surface. In some embodiments, where a steeper or greater slope is desired at the surface, an ion-exchange process after the heat treatment may be utilized to provide a "spike" or to increase the slope of the stress profile at or near the surface.

In one or more embodiments, the stress profile 312 (and/or estimated stress profile 340) is generated due to a non-zero concentration of a metal oxide(s) that varies along a portion of the thickness. The variation in concentration may be referred to herein as a gradient. In some embodiments, the concentration of a metal oxide is non-zero and varies, both along a thickness range from about 0·t to about 0.3·t. In some embodiments, the concentration of the metal oxide is non-zero and varies along a thickness range from about 0·t to about 0.35·t, from about 0·t to about 0.4·t, from about 0·t to about 0.45·t or from about 0·t to about 0.48·t. The metal oxide may be described as generating a stress in the glass-based article. The variation in concentration may be continuous along the above-referenced thickness ranges. Variation in concentration may include a change in metal oxide concentration of about 0.2 mol % along a thickness segment of about 100 micrometers. This change may be measured by known methods in the art including microprobe, as shown in Example 1. The metal oxide that is non-zero in concentration and varies along a portion of the thickness may be described as generating a stress in the glass-based article.

The variation in concentration may be continuous along the above-referenced thickness ranges. In some embodiments, the variation in concentration may be continuous along thickness segments in the range from about 10 micrometers to about 30 micrometers. In some embodiments, the concentration of the metal oxide decreases from the first surface to a point between the first surface and the second surface and increases from the point to the second surface.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while the at deeper depths, the concentration of ions having a smaller radius is greater than the concentration of ions having larger radius. For example, where a single Na- and K- containing bath is used in the ion exchange process, the concentration of K+ ions in the glass-based article is greater than the concentration of Na+ ions at shallower depths, while the concentration of Na+ is greater than the concentration of K+ ions at deeper depths. This is due, in part, due to the size of the ions. In such glass-based articles, the area at or near the surface comprises a greater CS due to the greater amount of larger ions at or near the surface. This greater CS may be exhibited by a stress profile having a steeper slope at or near the surface (i.e., a spike in the stress profile at the surface).

The concentration gradient or variation of one or more metal oxides is created by chemically strengthening the glass-based article, for example, by the ion exchange processes previously described herein, in which a plurality of first metal ions in the glass-based article is exchanged with a plurality of second metal ions. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion. The second metal ion is present in the glass-based substrate as an oxide thereof (e.g., $Na_2O$, $K_2O$, $Rb_2O$, $Cs_2O$ or a combination thereof).

In one or more embodiments, the metal oxide concentration gradient extends through a substantial portion of the thickness t or the entire thickness t of the glass-based article, including the CT layer 325. In one or more embodiments, the concentration of the metal oxide is about 0.5 mol % or greater in the CT layer 325. In some embodiments, the concentration of the metal oxide may be about 0.5 mol % or greater (e.g., about 1 mol % or greater) along the entire thickness of the glass-based article, and is greatest at the first surface 302 and/or the second surface 304 and decreases substantially constantly to a point between the first surface 302 and the second surface 304. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. In some embodiments, the lowest concentration in the particular metal oxide is in the CT layer 327. The total concentration of the particular metal oxide in the glass-based article may be is in the range from about 1 mol % to about 20 mol %.

In one or more embodiments, the glass-based article includes a first metal oxide concentration and a second metal oxide concentration, such that the first metal oxide concentration is in the range from about 0 mol % to about 15 mol % along a first thickness range from about 0t to about 0.5t, and the second metal oxide concentration is in the range from about 0 mol % to about 10 mol % from a second thickness range from about 0 micrometers to about 25 micrometers (or from about 0 micrometers to about 12 micrometers). The glass-based article may include an optional third metal oxide concentration. The first metal oxide may include $Na_2O$ while the second metal oxide may include K2O.

The concentration of the metal oxide may be determined from a baseline amount of the metal oxide in the glass-based article prior to being modified to include the concentration gradient of such metal oxide.

In one or more embodiments, the glass-based articles may be described in terms of how they fracture and the fragments that result from such fracture. In one or more embodiments, when fractured, the glass-based articles fracture into 2 or more fragments per square inch (or per 6.4516 square centimeters) of the glass-based article (prior to fracture). In some cases, the glass-based articles fracture into 3 or more, 4 or more, 5 or more, or 10 or more fragments per square inch (or per 6.4516 square centimeters) of the glass-based article (prior to fracture). In some instances, when fractured, the glass-based articles fracture in to fragments such that 50% or more of the fragments have a surface area that is less than 5%, less than 2%, or less than 1% of the surface area of the glass-based article (prior to fracture). In some embodiments, when fractured, the glass-based articles fracture in to fragments such that 90% or more or even 100% of the fragments have a surface area that is less than 5%, less than 2%, or less than 1% of the surface area of the glass-based article (prior to fracture).

In one or more embodiments, after chemically strengthening the glass-based article, the resulting stress profile 317 (and estimated stress profile 340) of the glass-based article provides improved fracture resistance. For example, in some embodiments, upon fracture, the glass-based article comprises fragments having an average longest cross-sectional dimension of less than or equal to about 2·t (e.g., 1.8·t, 1.6·t, 1.5·t, 1.4·t, 1.2·t or 1.·t or less).

In one or more embodiments, the glass-based articles may exhibit a fracture toughness ($K_{1C}$) of about 0.7 MPa·m$^{1/2}$ or greater. In some cases, the fracture toughness may be about 0.8 MPa·m$^{1/2}$ or greater, or about 0.9 MPa·m$^{1/2}$ or greater. In some embodiments the fracture toughness may be in the range from about 0.7 MPa·m$^{1/2}$ to about 1 MPa·m$^{1/2}$.

In some embodiments, the substrate may also be characterized as having a hardness from about 500 HVN to about 800 HVN, as measured by Vickers hardness test at a load of 200 g.

The glass-based articles described herein may exhibit a stored tensile energy in the range from greater than 0 J/m$^2$ to about 20 J/m$^2$. In some instances, the stored tensile energy may be in the range from about 1 J/m$^2$ to about 20 J/m$^2$, from about 2 J/m$^2$ to about 20 J/m$^2$, from about 3 J/m$^2$ to about 20 J/m$^2$, from about 4 J/m$^2$ to about 20 J/m$^2$, from about 1 J/m$^2$ to about 19 J/m$^2$, from about 1 J/m$^2$ to about 18 J/m$^2$, from about 1 J/m$^2$ to about 16 J/m$^2$, from about 4 J/m$^2$ to about 20 J/m$^2$, or from about 4 J/m$^2$ to about 18 J/m$^2$. The stored tensile energy is calculated by integrating in the tensile region the stored elastic energy Σ per unit area of specimen of thickness t using Equation (2):

$$\Sigma = 0.5\sigma^2 t/E \qquad (2)$$

in which σ is stress and E is young's modulus.

More specifically, stored tensile energy is calculated using the following Equation (3):

$$\text{stored tensile energy (J/m}^2\text{)} = 1 - \nu/2E \int \sigma^2 dt \qquad (3)$$

where n is Poisson's ratio, E is the elastic modulus and the integration is computed for the tensile region only.

In one or more embodiments, the glass-based articles exhibit improved surface strength when subjected to abraded ring-on-ring (AROR) testing. The strength of a material is defined as the stress at which fracture occurs. The A-ROR test is a surface strength measurement for testing flat glass specimens, and ASTM C1499-09 (2013), entitled "Standard Test Method for Monotonic Equibiaxial Flexural Strength of Advanced Ceramics at Ambient Temperature," serves as the basis for the ring-on-ring abraded ROR test methodology described herein. The contents of ASTM C1499-09 are incorporated herein by reference in their entirety. In one embodiment, the glass specimen is abraded prior to ring-on-ring testing with 90 grit silicon carbide (SiC) particles that are delivered to the glass sample using the method and apparatus described in Annex A2, entitled "abrasion Procedures," of ASTM C158-02 (2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass-based article is abraded as described in ASTM C158-02, Annex 2, to normalize and/or control the surface defect condition of the sample using the apparatus shown in Figure. A2.1 of ASTM C158-02. The abrasive material is typically sandblasted onto the surface 110 of the glass-based article at a load of 15 psi using an air pressure of 304 kPa (44 psi); although in the Examples below, the abrasive material was sandblasted onto the surface 110 at a load of 25 psi and 45 psi. After air flow is established, 5 cm$^3$ of abrasive material is dumped into a funnel and the sample is sandblasted for 5 seconds after introduction of the abrasive material.

Figure 4:
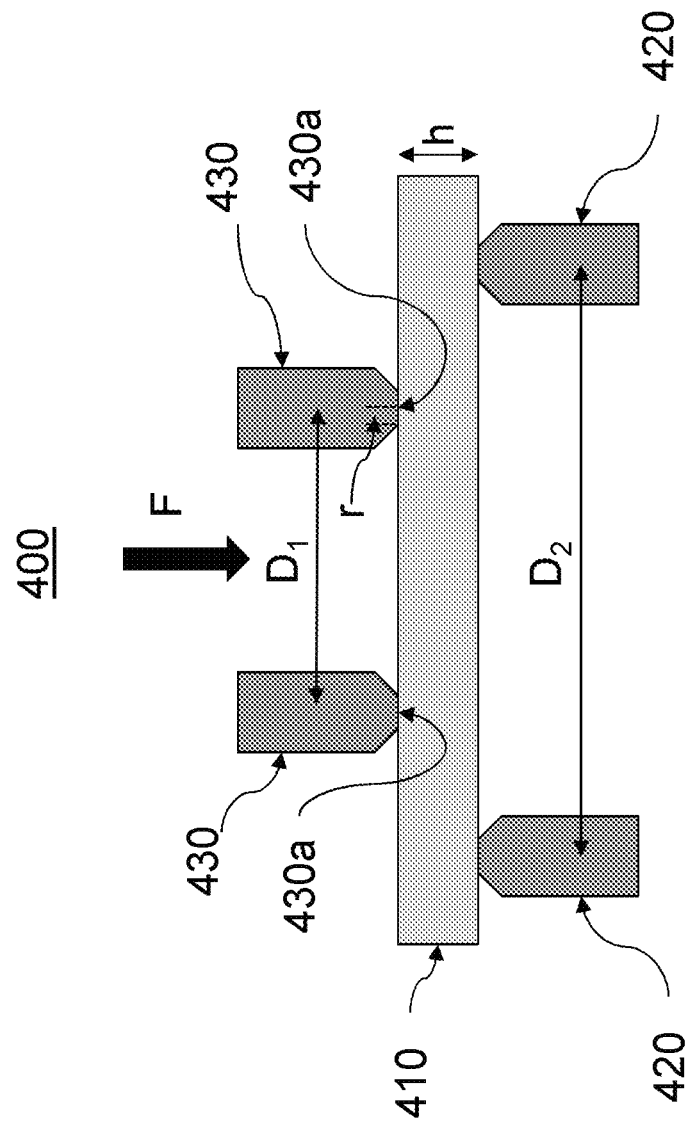
FIG. 4 is a is a schematic cross-sectional view of a ring-on-ring apparatus.

For the ring-on-ring test, a glass-based article having at least one abraded surface 410 as shown in FIG. 4 is placed between two concentric rings of differing size to determine equibiaxial flexural strength (i.e., the maximum stress that a material is capable of sustaining when subjected to flexure between two concentric rings), as also shown in FIG. 4. In the abraded ring-on-ring configuration 400, the abraded glass-based article 410 is supported by a support ring 420 having a diameter D2. A force F is applied by a load cell (not shown) to the surface of the glass-based article by a loading ring 430 having a diameter D1.

The ratio of diameters of the loading ring and support ring D1/D2 may be in a range from about 0.2 to about 0.5. In some embodiments, D1/D2 is about 0.5. Loading and support rings 130, 120 should be aligned concentrically to within 0.5% of support ring diameter D2. The load cell used for testing should be accurate to within ±1% at any load within a selected range. In some embodiments, testing is carried out at a temperature of 23±2° C. and a relative humidity of 40±10%.

For fixture design, the radius r of the protruding surface of the loading ring 430, $h/2 \leq r \leq 3h/2$, where h is the thickness of glass-based article 410. Loading and support rings 430, 420 are typically made of hardened steel with hardness HRc>40. ROR fixtures are commercially available.

The intended failure mechanism for the ROR test is to observe fracture of the glass-based article 410 originating from the surface 430a within the loading ring 430. Failures that occur outside of this region—i.e., between the loading rings 430 and support rings 420—are omitted from data analysis. Due to the thinness and high strength of the glass glass-based article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

The strength of glass-based article depends on the presence of surface flaws. However, the likelihood of a flaw of a given size being present cannot be precisely predicted, as the strength of glass is statistical in nature. A probability distribution can therefore generally be used as a statistical representation of the data obtained.

In some embodiments, the strengthened glass-based articles described herein has a surface or equibiaxial flexural strength of at least 20 kgf and up to about 30 kgf as determined by abraded ring-on-ring testing using a load of 25 psi or even 45 psi to abrade the surface. In other embodiments, the surface strength is at least 25 kgf, and in still other embodiments, at least 30 kgf.

Figure 36:
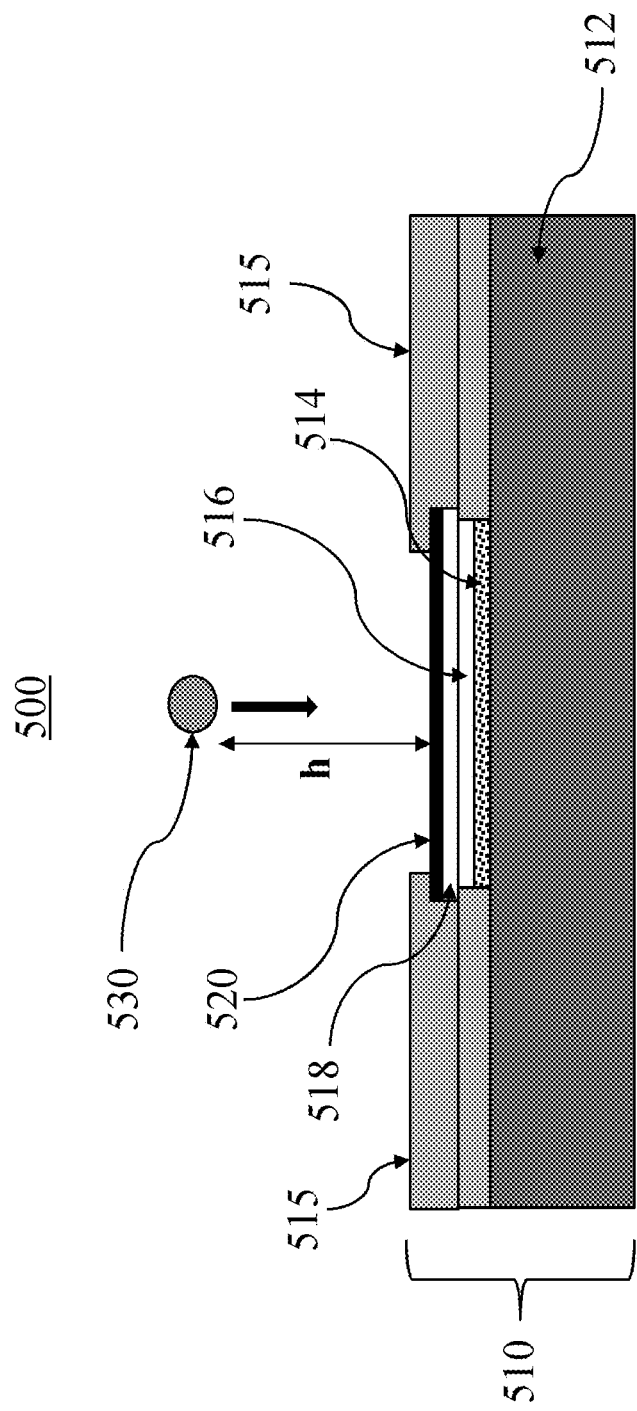
FIG. 36 is a schematic cross-sectional view of an embodiment of the apparatus that is used to perform the inverted ball on sandpaper (IBoS) test described in the present disclosure.
Figure 37:
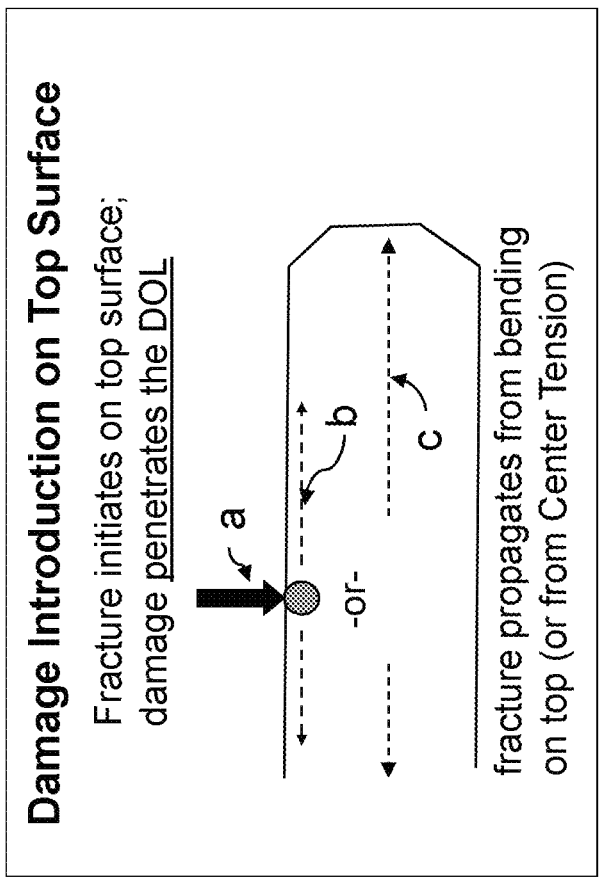
FIG. 37 is a schematic cross-sectional representation of the dominant mechanism for failure due to damage introduction plus bending that typically occurs in glass-based articles that are used in mobile or hand held electronic devices.

In some embodiments, the strengthened glass-based articles described herein may be described in terms of performance in an inverted ball on sandpaper (IBoS) test. The IBoS test is a dynamic component level test that mimics the dominant mechanism for failure due to damage introduction plus bending that typically occurs in glass-based articles that are used in mobile or hand held electronic devices, as schematically shown in FIG. 36. In the field, damage introduction (a in FIG. 37) occurs on the top surface of the glass-based article. Fracture initiates on the top surface of the glass-based article and damage either penetrates the glass-based article (b in FIG. 37) or the fracture propagates from bending on the top surface or from the interior portions of the glass-based article (c in FIG. 37). The IBoS test is designed to simultaneously introduce damage to the surface of the glass and apply bending under dynamic load. In some instances, the glass-based article exhibits improved drop performance when it includes a compressive stress than if the same glass-based article does not include a compressive stress.

An IBoS test apparatus is schematically shown in FIG. 36. Apparatus 500 includes a test stand 510 and a ball 530. Ball 530 is a rigid or solid ball such as, for example, a stainless steel ball, or the like. In one embodiment, ball 530 is a 4.2 gram stainless steel ball having diameter of 10 mm. The ball 530 is dropped directly onto the glass-based article sample 518 from a predetermined height h. Test stand 510 includes a solid base 512 comprising a hard, rigid material such as granite or the like. A sheet 514 having an abrasive material disposed on a surface is placed on the upper surface of the solid base 512 such that surface with the abrasive material faces upward. In some embodiments, sheet 514 is sandpaper having a 30 grit surface and, in other embodiments, a 180 grit surface. The glass-based article sample 518 is held in place above sheet 514 by sample holder 515 such that an air gap 516 exists between glass-based article sample 518 and sheet 514. The air gap 516 between sheet 514 and glass-based article sample 518 allows the glass-based article sample 518 to bend upon impact by ball 530 and onto the abrasive surface of sheet 514. In one embodiment, the glass-based article sample 218 is clamped across all corners to keep bending contained only to the point of ball impact and to ensure repeatability. In some embodiments, sample holder 514 and test stand 510 are adapted to accommodate sample thicknesses of up to about 2 mm. The air gap 516 is in a range from about 50 µm to about 100 µm. Air gap 516 is adapted to adjust for difference of material stiffness (Young's modulus, Emod), but also includes the elastic modulus and thickness of the sample. An adhesive tape 520 may be used to cover the upper surface of the glass-based article sample to collect fragments in the event of fracture of the glass-based article sample 518 upon impact of ball 530.

Various materials may be used as the abrasive surface. In a one particular embodiment, the abrasive surface is sandpaper, such as silicon carbide or alumina sandpaper, engineered sandpaper, or any abrasive material known to those skilled in the art for having comparable hardness and/or sharpness. In some embodiments, sandpaper having 30 grit may be used, as it has a surface topography that is more consistent than either concrete or asphalt, and a particle size and sharpness that produces the desired level of specimen surface damage.

Figure 38:
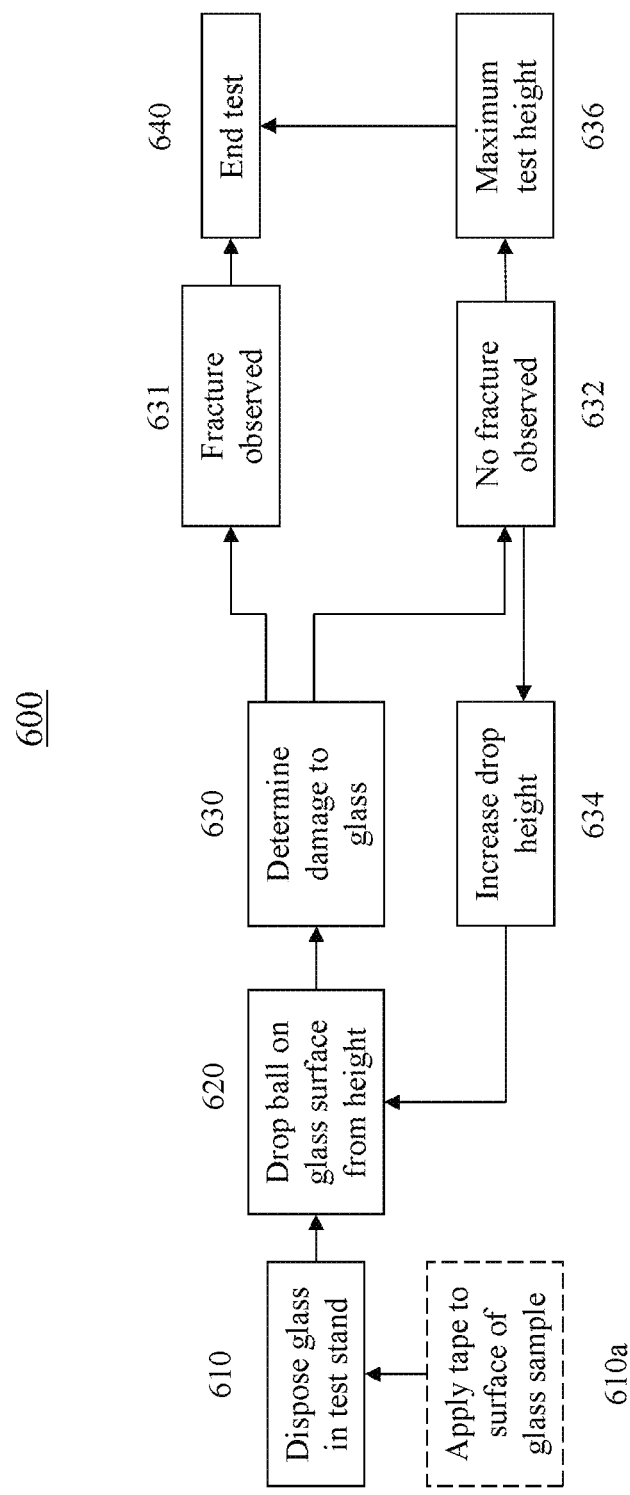
FIG. 38 is a flow chart for a method of conducting the IBoS test in the apparatus described herein.

In one aspect, a method 600 of conducting the IBoS test using the apparatus 500 described hereinabove is shown in FIG. 38. In Step 610, a glass-based article sample (218 in FIG. 36) is placed in the test stand 510, described previously and secured in sample holder 515 such that an air gap 516 is formed between the glass-based article sample 518 and sheet 514 with an abrasive surface. Method 600 presumes that the sheet 514 with an abrasive surface has already been placed in test stand 510. In some embodiments, however, the method may include placing sheet 514 in test stand 510 such that the surface with abrasive material faces upward. In some embodiments (Step 610a), an adhesive tape 520 is applied to the upper surface of the glass-based article sample 518 prior to securing the glass-based article sample 518 in the sample holder 510.

In Step 620, a solid ball 530 of predetermined mass and size is dropped from a predetermined height h onto the upper surface of the glass-based article sample 518, such that the ball 530 impacts the upper surface (or adhesive tape 520 affixed to the upper surface) at approximately the center (i.e., within 1 mm, or within 3 mm, or within 5 mm, or within 10 mm of the center) of the upper surface. Following impact in Step 620, the extent of damage to the glass-based article sample 518 is determined (Step 630). As previously described hereinabove, herein, the term "fracture" means that a crack propagates across the entire thickness and/or entire surface of a substrate when the substrate is dropped or impacted by an object.

In method 600, the sheet 518 with the abrasive surface may be replaced after each drop to avoid "aging" effects that have been observed in repeated use of other types (e.g., concrete or asphalt) of drop test surfaces.

Various predetermined drop heights h and increments are typically used in method 600. The test may, for example, utilize a minimum drop height to start (e.g., about 10-20 cm). The height may then be increased for successive drops by either a set increment or variable increments. The test described in method 600 is stopped once the glass-based article sample 518 breaks or fractures (Step 631). Alternatively, if the drop height h reaches the maximum drop height (e.g., about 100 cm) without fracture, the drop test of method 300 may also be stopped, or Step 520 may be repeated at the maximum height until fracture occurs.

In some embodiments, IBoS test of method 600 is performed only once on each glass-based article sample 518 at each predetermined height h. In other embodiments, however, each sample may be subjected to multiple tests at each height.

If fracture of the glass-based article sample 518 has occurred (Step 631 in FIG. 38), the IBoS test according to method 600 is ended (Step 640). If no fracture resulting from the ball drop at the predetermined drop height is observed (Step 632), the drop height is increased by a predetermined increment (Step 634)—such as, for example 5, 10, or 20 cm—and Steps 620 and 630 are repeated until either sample fracture is observed (631) or the maximum test height is reached (636) without sample fracture. When either Step 631 or 636 is reached, the test according to method 600 is ended.

When subjected to the inverted ball on sandpaper (IBoS) test described above, embodiments of the glass-based article described herein have at least about a 60% survival rate when the ball is dropped onto the surface of the glass from a height of 100 cm. For example, a glass-based article is described as having a 60% survival rate when dropped from a given height when three of five identical (or nearly identical) samples (i.e., having approximately the same composition and, when strengthened, approximately the same compressive stress and depth of compression or compressive stress layer, as described herein) survive the IBoS drop test without fracture when dropped from the prescribed height (here 100 cm). In other embodiments, the survival rate in the 100 cm IBoS test of the glass-based articles that are strengthened is at least about 70%, in other embodiments, at least about 80%, and, in still other embodiments, at least about 90%. In other embodiments, the survival rate of the strengthened glass-based articles dropped from a height of 100 cm in the IBoS test is at least about 60%, in other embodiments, at least about 70%, in still other embodiments, at least about 80%, and, in other embodiments, at least about 90%. In one or more embodiments, the survival rate of the strengthened glass-based articles dropped from a height of 150 cm in the IBoS test is at least about 60%, in other embodiments, at least about 70%, in still other embodiments, at least about 80%, and, in other embodiments, at least about 90%.

To determine the survivability rate of the glass-based articles when dropped from a predetermined height using the IBoS test method and apparatus described hereinabove, at least five identical (or nearly identical) samples (i.e., having approximately the same composition and, if strengthened, approximately the same compressive stress and depth of compression or layer) of the glass-based articles are tested, although larger numbers (e.g., 10, 20, 30, etc.) of samples may be subjected to testing to raise the confidence level of the test results. Each sample is dropped a single time from the predetermined height (e.g., 100 cm or 150 cm) or, alternatively, dropped from progressively higher heights without fracture until the predetermined height is reached, and visually (i.e., with the naked eye) examined for evidence of fracture (crack formation and propagation across the entire thickness and/or entire surface of a sample). A sample is deemed to have "survived" the drop test if no fracture is observed after being dropped from the predetermined height, and a sample is deemed to have "failed (or "not survived") if fracture is observed when the sample is dropped from a height that is less than or equal to the predetermined height. The survivability rate is determined to be the percentage of the sample population that survived the drop test. For example, if 7 samples out of a group of 10 did not fracture when dropped from the predetermined height, the survivability rate of the glass would be 70%.

The glass-based articles described herein may be transparent or opaque. In one or more the glass-based article may have a thickness of about 1 millimeter or less and exhibit a transmittance of about 88% or greater over a wavelength in the range from about 380 nm to about 780 nm. In another embodiment, the glass-based article may have a thickness of about 1 millimeter or less and exhibit a transmittance of about 10% or less over a wavelength in the range from about 380 nm to about 780 nm.

The glass-based article may also exhibit a substantially white color. For example, the glass-based article may exhibit CIELAB color space coordinates, under a CIE illuminant F02, of L* values of about 88 and greater, a* values in the range from about −3 to about +3, and b* values in the range from about −6 to about +6. Alternatively, the glass-based article may exhibit CIELAB color space coordinates, under a CIE illuminant F02, of L* values of about 40 and less, a* values in the range from about −3 to about +3, and b* values in the range from about −6 to about +6. Such color space coordinates may be present under other CIE illuminants (e.g., D65).

Choice of substrates not particularly limited. In some examples, the glass-based article may be described as having a high cation diffusivity for ion exchange. In one or more embodiments, the glass or glass-ceramic has fast ion-exchange capability, i.e., where diffusivity is greater than 500 μm²/hr or may be characterized as greater than 450 μm²/hour at 460° C.

At a certain temperature the diffusivity is calculated using the equation (4):

$$\text{Diffusivity} = DOL^2/5.6*T \qquad (4)$$

in which DOL is depth of ion-exchange layer and T is the IOX time it takes to reach that DOL.

The glass-based article may include an amorphous substrate, a crystalline substrate or a combination thereof (e.g., a glass-ceramic substrate). In one or more embodiments, the glass-based article substrate (prior to being chemically strengthened as described herein) may include a glass having a composition, in mole percent (mole %), including: $SiO_2$ in the range from about 40 to about 80, $Al_2O_3$ in the range from about 10 to about 30, $B_2O_3$ in the range from about 0 to about 10, $R_2O$ in the range from about 0 to about 20, and RO in the range from about 0 to about 15. In some instances, the composition may include either one or both of $ZrO_2$ in the range from about 0 mol % to about 5 mol % and $P_2O_5$ in the range from about 0 to about 15 mol %. TiO2 can be present from about 0 mol % to about 2 mol %.

In some embodiments, the glass composition may include $SiO_2$ in an amount, in mol %, in the range from about 45 to about 80, from about 45 to about 75, from about 45 to about 70, from about 45 to about 65, from about 45 to about 60, from about 45 to about 65, from about 45 to about 65, from about 50 to about 70, from about 55 to about 70, from about 60 to about 70, from about 70 to about 75, from about 70 to about 72, or from about 50 to about 65.

In some embodiments, the glass composition may include $Al_2O_3$ in an amount, in mol %, in the range from about 5 to about 28, from about 5 to about 26, from about 5 to about 25, from about 5 to about 24, from about 5 to about 22, from about 5 to about 20, from about 6 to about 30, from about 8 to about 30, from about 10 to about 30, from about 12 to about 30, from about 14 to about 30, from about 16 to about 30, from about 18 to about 30, from about 18 to about 28, or from about 12 to about 15.

In one or more embodiments, the glass composition may include $B_2O_3$ in an amount, in mol %, in the range from about 0 to about 8, from about 0 to about 6, from about 0 to about 4, from about 0.1 to about 8, from about 0.1 to about 6, from about 0.1 to about 4, from about 1 to about 10, from about 2 to about 10, from about 4 to about 10, from about 2 to about 8, from about 0.1 to about 5, or from about 1 to about 3. In some instances, the glass composition may be substantially free of $B_2O_3$. As used herein, the phrase "substantially free" with respect to the components of the glass composition means that the component is not actively or intentionally added to the glass compositions during initial batching or subsequent ion exchange, but may be present as an impurity. For example, a glass may be describe as being substantially free of a component, when the component is present in an amount of less than about 0.1001 mol %.

In some embodiments, the glass composition may include one or more alkali earth metal oxides, such as MgO, CaO and ZnO. In some embodiments, the total amount of the one or more alkali earth metal oxides may be a non-zero amount up to about 15 mol %. In one or more specific embodiments, the total amount of any of the alkali earth metal oxides may be a non-zero amount up to about 14 mol %, up to about 12 mol %, up to about 10 mol %, up to about 8 mol %, up to about 6 mol %, up to about 4 mol %, up to about 2 mol %, or up about 1.5 mol %. In some embodiments, the total amount, in mol %, of the one or more alkali earth metal oxides may be in the range from about 0.1 to 10, from about 0.1 to 8, from about 0.1 to 6, from about 0.1 to 5, from about 1 to 10, from about 2 to 10, or from about 2.5 to 8. The amount of MgO may be in the range from about 0 mol % to about 5 mol % (e.g., from about 2 mol % to about 4 mol %). The amount of ZnO may be in the range from about 0 to about 2 mol %. The amount of CaO may be from about 0 mol % to about 2 mol %. In one or more embodiments, the glass composition may include MgO and may be substantially free of CaO and ZnO. In one variant, the glass composition may include any one of CaO or ZnO and may be substantially free of the others of MgO, CaO and ZnO. In one or more specific embodiments, the glass composition may include only two of the alkali earth metal oxides of MgO, CaO and ZnO and may be substantially free of the third of the earth metal oxides.

The total amount, in mol %, of alkali metal oxides $R_2O$ in the glass composition may be in the range from about 5 to about 20, from about 5 to about 18, from about 5 to about 16, from about 5 to about 15, from about 5 to about 14, from about 5 to about 12, from about 5 to about 10, from about 5 to about 8, from about 5 to about 20, from about 6 to about 20, from about 7 to about 20, from about 8 to about 20, from about 9 to about 20, from about 10 to about 20, from about 6 to about 13, or from about 8 to about 12.

In one or more embodiments, the glass composition includes $Na_2O$ in an amount in the range from about 0 mol % to about 18 mol %, from about 0 mol % to about 16 mol % or from about 0 mol % to about 14 mol %, from about 0 mol % to about 10 mol %, from about 0 mol % to about 5 mol %, from about 0 mol % to about 2 mol %, from about 0.1 mol % to about 6 mol %, from about 0.1 mol % to about 5 mol %, from about 1 mol % to about 5 mol %, from about 2 mol % to about 5 mol %, or from about 10 mol % to about 20 mol %.

In some embodiments, the amount of $Li_2O$ and $Na_2O$ is controlled to a specific amount or ratio to balance formability and ion exchangeability. For example, as the amount of $Li_2O$ increases, the liquidus viscosity may be reduced, thus preventing some forming methods from being used; however, such glass compositions are ion exchanged to deeper DOC levels, as described herein. The amount of $Na_2O$ can modify liquidus viscosity but can inhibit ion exchange to deeper DOC levels.

In one or more embodiments, the glass composition may include $K_2O$ in an amount less than about 5 mol %, less than about 4 mol %, less than about 3 mol %, less than about 2 mol %, or less than about 1 mol %. In one or more alternative embodiments, the glass composition may be substantially free, as defined herein, of $K_2O$.

In one or more embodiments, the glass composition may include $Li_2O$ in an amount about 0 mol % to about 18 mol %, from about 0 mol % to about 15 mol % or from about 0 mol % to about 10 mol %, from about 0 mol % to about 8 mol %, from about 0 mol % to about 6 mol %, from about 0 mol % to about 4 mol % or from about 0 mol % to about 2 mol %. In some embodiments, the glass composition may include $Li_2O$ in an amount about 2 mol % to about 10 mol %, from about 4 mol % to about 10 mol %, from about 6 mol % to about 10 mol, or from about 5 mol % to about 8 mol %. In one or more alternative embodiments, the glass composition may be substantially free, as defined herein, of $Li_2O$.

In one or more embodiments, the glass composition may include $Fe_2O_3$. In such embodiments, $Fe_2O_3$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of $Fe_2O_3$.

In one or more embodiments, the glass composition may include $ZrO_2$. In such embodiments, $ZrO_2$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free, as defined herein, of $ZrO_2$.

In one or more embodiments, the glass composition may include $P_2O_5$ in a range from about 0 mol % to about 10 mol %, from about 0 mol % to about 8 mol %, from about 0 mol % to about 6mol %, from about 0 mol % to about 4 mol %, from about 0.1 mol % to about 10 mol %, from about 0.1 mol % to about 8 mol %, from about 4 mol % to about 8 mol %, or from about 5 mol % to about 8 mol %. In some instances, the glass composition may be substantially free of $P_2O_5$.

In one or more embodiments, the glass composition may include $TiO_2$. In such embodiments, $TiO_2$ may be present in an amount less than about 6 mol %, less than about 4 mol %, less than about 2 mol %, or less than about 1 mol %. In one or more alternative embodiments, the glass composition may be substantially free, as defined herein, of $TiO_2$. In some embodiments, $TiO_2$ is present in an amount in the range from about 0.1 mol % to about 6 mol %, or from about 0.1 mol % to about 4 mol %.

In some embodiments, the glass composition may include various compositional relationships. For example, the glass composition may include a ratio of the amount of $Li_2O$ (in mol %) to the total amount of $R_2O$ (in mol %) in the range from about 0.5 to about 1. In some embodiments, the glass composition may include a difference between the total amount of $R_2O$ (in mol %) to the amount of $Al_2O_3$ (in mol %) in the range from about −5 to about 0. In some instances the glass composition may include a difference between the total amount of $R_xO$ (in mol %) and the amount of $Al_2O_3$ in the range from about 0 to about 3. The glass composition of one or more embodiments may exhibit a ratio of the amount of MgO (in mol %) to the total amount of RO (in mol %) in the range from about 0 to about 2.

In some embodiments, glass composition may be substantially free of nucleating agents. Examples of typical nucleating agents are $TiO_2$, $ZrO_2$ and the like. Nucleating agents may be described in terms of function in that nucleating agents are constituents in the glass can initiate the formation of crystallites in the glass.

In some embodiments, the compositions used for the glass substrate may be batched with 0-2 mol % of at least one fining agent selected from a group that includes $Na_2SO_4$, NaCl, NaF, NaBr, $K_2SO_4$, KCl, KF, KBr, and $SnO_2$. The glass composition according to one or more embodiments may further include $SnO_2$ in the range from about 0 to about 2, from about 0 to about 1, from about 0.1 to about 2, from about 0.1 to about 1, or from about 1 to about 2. The glass compositions disclosed herein may be substantially free of $As_2O_3$ and/or $Sb_2O_3$.

In one or more embodiments, the composition may specifically include 62 mol % to 75 mol % $SiO_2$; 10.5 mol % to about 17 mol % $Al_2O_3$; 5 mol % to about 13 mol % $Li_2O$; 0 mol % to about 4 mol % ZnO; 0 mol % to about 8 mol % MgO; 2 mol % to about 5 mol % $TiO_2$; 0 mol % to about 4 mol % $B_2O_3$; 0 mol % to about 5 mol % $Na_2O$; 0 mol % to about 4 mol % $K_2O$; 0 mol % to about 2 mol % $ZrO_2$; 0 mol % to about 7 mol % $P_2O_5$; 0 mol % to about 0.3 mol % $Fe_2O_3$; 0 mol % to about 2 mol % MnOx; and 0.05 mol % to about 0.2 mol % $SnO_2$. In one or more embodiments, the composition may include 67 mol % to about 74 mol % $SiO_2$; 11 mol % to about 15 mol % $Al_2O_3$; 5.5 mol % to about 9 mol % $Li_2O$; 0.5 mol % to about 2 mol % ZnO; 2 mol % to about 4.5 mol % MgO; 3 mol % to about 4.5 mol % $TiO_2$; 0 mol % to about 2.2 mol % $B_2O_3$; 0 mol % to about 1 mol % $Na_2O$; 0 mol % to about 1 mol % $K_2O$; 0 mol % to about 1 mol % $ZrO_2$; 0 mol % to about 4 mol % $P_2O_5$; 0 mol % to about 0.1 mol % $Fe_2O_3$; 0 mol % to about 1.5 mol % MnOx; and 0.08 mol % to about 0.16 mol % $SnO_2$. In one or more embodiments, the composition may include 70 mol % to 75 mol % $SiO_2$; 10 mol % to about 15 mol % $Al_2O_3$; 5 mol % to about 13 mol % $Li_2O$; 0 mol % to about 4 mol % ZnO; 0.1 mol % to about 8 mol % MgO; 0 mol % to about 5 mol % $TiO_2$; 0.1 mol % to about 4 mol % $B_2O_3$; 0.1 mol % to about 5 mol % $Na_2O$; 0 mol % to about 4 mol % $K_2O$; 0 mol % to about 2 mol % $ZrO_2$; 0 mol % to about 7 mol % $P_2O_5$; 0 mol % to about 0.3 mol % $Fe_2O_3$; 0 mol % to about 2 mol % MnOx; and 0.05 mol % to about 0.2 mol % $SnO_2$.

In one or more embodiments, the composition may include 52 mol % to about 63 mol % $SiO_2$; 11 mol % to about 15 mol % $Al_2O_3$; 5.5 mol % to about 9 mol % $Li_2O$; 0.5 mol % to about 2 mol % ZnO; 2 mol % to about 4.5 mol % MgO; 3 mol % to about 4.5 mol % $TiO_2$; 0 mol % to about 2.2 mol % $B_2O_3$; 0 mol % to about 1 mol % $Na_2O$; 0 mol % to about 1 mol % $K_2O$; 0 mol % to about 1 mol % $ZrO_2$; 0 mol % to about 4 mol % $P_2O_5$; 0 mol % to about 0.1 mol % $Fe_2O_3$; 0 mol % to about 1.5 mol % MnOx; and 0.08 mol % to about 0.16 mol % $SnO_2$.

Other exemplary compositions of glass-based articles prior to being chemically strengthened, as described herein, are shown in Table 1.

TABLE 1

| Mol % | Ex. A | Ex. B | Ex. C | Ex. D | Ex. E | Ex. F |
|---|---|---|---|---|---|---|
| $SiO_2$ | 71.8 | 69.8 | 69.8 | 69.8 | 69.8 | 69.8 |
| $Al_2O_3$ | 13.1 | 13 | 13 | 13 | 13 | 13 |
| $B_2O_3$ | 2 | 2.5 | 4 | 2.5 | 2.5 | 4 |
| $Li_2O$ | 8 | 8.5 | 8 | 8.5 | 8.5 | 8 |
| MgO | 3 | 3.5 | 3 | 3.5 | 1.5 | 1.5 |
| ZnO | 1.8 | 2.3 | 1.8 | 2.3 | 2.3 | 1.8 |
| $Na_2O$ | 0.4 | 0.4 | 0.4 | 0.4 | 0.4 | 0.4 |
| $TiO_2$ | 0 | 0 | 0 | 1 | 1 | 1 |
| $Fe_2O_3$ | 0 | 0 | 0 | 0.8 | 0.8 | 0.8 |
| $SnO_2$ | 0.1 | 0.1 | 0.1 | 0.1 | 0.1 | 0.1 |

| Mol % | Ex. G | Ex. H | Ex. I | Ex. J | Ex. K | Ex. L | Ex. M | Ex. N |
|---|---|---|---|---|---|---|---|---|
| $SiO_2$ | 70.18 | 70.91 | 71.28 | 71.65 | 71.65 | 71.65 | 74.77 | 72.00 |
| $Al_2O_3$ | 12.50 | 12.78 | 12.93 | 13.07 | 13.07 | 13.07 | 10.00 | 12.50 |
| $B_2O_3$ | 1.91 | 1.95 | 1.98 | 2.00 | 2.00 | 2.00 | 1.99 | 2.00 |
| $Li_2O$ | 7.91 | 7.95 | 7.96 | 7.98 | 6.98 | 5.00 | 6.13 | 6.00 |
| $Na_2O$ | 4.43 | 2.43 | 1.42 | 0.41 | 1.41 | 3.40 | 3.97 | 0.50 |
| MgO | 2.97 | 2.98 | 2.99 | 3.00 | 3.00 | 3.00 | 2.94 | 2.10 |
| ZnO | 0.00 | 0.89 | 1.34 | 1.80 | 1.80 | 1.80 | 0.00 | 0.00 |
| CaO | 0.00 | 0.00 | 0.00 | 0.00 | 0.00 | 0.00 | 0.05 | 4.90 |
| $SnO_2$ | 0.10 | 0.10 | 0.10 | 0.10 | 0.10 | 0.10 | 0.10 | 0.10 |
| $Li_2O/R_2O$ | 0.64 | 0.77 | 0.85 | 0.95 | 0.83 | 0.60 | 0.61 | 0.92 |
| $R_2O-Al_2O_3$ | −0.16 | −2.41 | −3.54 | −4.68 | −4.68 | −4.67 | 0.10 | −6.00 |
| $R_xO-Al_2O_3$ | 2.81 | 1.47 | 0.79 | 0.12 | 0.12 | 0.13 | 3.09 | 1.00 |
| MgO/RO | 1.00 | 0.77 | 0.69 | 0.63 | 0.63 | 0.63 | 1.00 | 1.00 |
| $R_2O$ | 12.34 | 10.38 | 9.39 | 8.39 | 8.39 | 8.40 | 10.10 | 6.50 |
| RO | 2.97 | 3.88 | 4.34 | 4.79 | 4.79 | 4.79 | 2.99 | 7.00 |

Where the glass-based article includes a glass-ceramic, the crystal phases may include β-spodumene, rutile, gahnite or other known crystal phases and combinations thereof.

The glass-based article may be substantially planar, although other embodiments may utilize a curved or otherwise shaped or sculpted substrate. In some instances, the glass-based article may have a 3D or 2.5D shape. The glass-based article may be substantially optically clear, transparent and free from light scattering. The glass-based article may have a refractive index in the range from about 1.45 to about 1.55. As used herein, the refractive index values are with respect to a wavelength of 550 nm.

Additionally or alternatively, the thickness of the glass-based article may be constant along one or more dimension or may vary along one or more of its dimensions for aesthetic and/or functional reasons. For example, the edges of the glass-based article may be thicker as compared to more central regions of the glass-based article. The length, width and thickness dimensions of the glass-based article may also vary according to the article application or use.

The glass-based article may be characterized by the manner in which it is formed. For instance, where the glass-based article may be characterized as float-formable (i.e., formed by a float process), down-drawable and, in particular, fusion-formable or slot-drawable (i.e., formed by a down draw process such as a fusion draw process or a slot draw process).

A float-formable glass-based article may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based article that can be lifted from the tin onto rollers. Once off the bath, the glass glass-based article can be cooled further and annealed to reduce internal stress. Where the glass-based article is a glass ceramic, the glass-based article formed from the float process may be subjected to a ceramming process by which one or more crystalline phases are generated.

Down-draw processes produce glass-based articles having a uniform thickness that possess relatively pristine surfaces. Because the average flexural strength of the glass-based article is controlled by the amount and size of surface flaws, a pristine surface that has had minimal contact has a higher initial strength. When this high strength glass-based article is then further strengthened (e.g., chemically), the resultant strength can be higher than that of a glass-based article with a surface that has been lapped and polished. Down-drawn glass-based articles may be drawn to a thickness of less than about 2 mm. In addition, down drawn glass-based articles have a very flat, smooth surface that can be used in its final application without costly grinding and polishing. Where the glass-based article is a glass ceramic, the glass-based article formed from the down draw process may be subjected to a ceramming process by which one or more crystalline phases are generated.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based article. The fusion draw method offers the advantage that, because the two glass films flowing over the channel fuse together, neither of the outside surfaces of the resulting glass-based article comes in contact with any part of the apparatus. Thus, the surface properties of the fusion drawn glass-based article are not affected by such contact. Where the glass-based article is a glass ceramic, the glass-based article formed from the fusion process may be subjected to a ceramming process by which one or more crystalline phases are generated.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous glass-based article and into an annealing region. Where the glass-based article is a glass ceramic, the glass-based article formed from the slot draw process may be subjected to a ceramming process by which one or more crystalline phases are generated.

In some embodiments, the glass-based article may be formed using a thin rolling process, as described in U.S. Pat. No. 8,713,972, entitled "Precision Glass Roll Forming Process and Apparatus", U.S. Pat. No. 9,003,835, entitled "Precision Roll Forming of Textured Sheet Glass", U.S. Patent Publication No. 20150027169, entitled "Methods And Apparatus For Forming A Glass Ribbon", and U.S. Patent Publication No. 20050099618, entitled "Apparatus and Method for Forming Thin Glass Articles", the contents of which are incorporated herein by reference in their entirety. More specifically the glass-based article may be formed by supplying a vertical stream of molten glass, forming the supplied stream of molten glass or glass-ceramic with a pair of forming rolls maintained at a surface temperature of about 500° C. or higher or about 600° C. or higher to form a formed glass ribbon having a formed thickness, sizing the formed ribbon of glass with a pair of sizing rolls maintained at a surface temperature of about 400° C. or lower to produce a sized glass ribbon having a desired thickness less than the formed thickness and a desired thickness uniformity. The apparatus used to form the glass ribbon may include a glass feed device for supplying a supplied stream of molten glass; a pair of forming rolls maintained at a surface temperature of about 500° C. or higher, the forming rolls being spaced closely adjacent each other defining a glass forming gap between the forming rolls with the glass forming gap located vertically below the glass feed device for receiving the supplied stream of molten glass and thinning the supplied stream of molten glass between the forming rolls to form a formed glass ribbon having a formed thickness; and a pair of sizing rolls maintained at a surface temperature of about 400° C. or lower, the sizing rolls being spaced closely adjacent each other defining a glass sizing gap between the sizing rolls with the glass sizing gap located vertically below the forming rolls for receiving the formed glass ribbon and thinning the formed glass ribbon to produce a sized glass ribbon having a desired thickness and a desired thickness uniformity.

In some instances, the thin rolling process may be utilized where the viscosity of the glass does not permit use of fusion or slot draw methods. For example, thin rolling can be utilized to form the glass-based articles when the glass exhibits a liquidus viscosity less than 100 kP.

The glass-based article may be acid polished or otherwise treated to remove or reduce the effect of surface flaws.

Another aspect of this disclosure pertains to a method of forming a fracture-resistant glass-based article. The method includes providing a glass-based substrate having a first surface and a second surface defining a thickness of about 1 millimeter or less and generating a stress profile in the glass-based substrate, as described herein to provide the fracture-resistant glass-based article. In one or more embodiments, generating the stress profile comprises ion exchanging a plurality of alkali ions into the glass-based substrate to form a non-zero alkali metal oxide concentration that varies along a substantial portion of the thickness (as described herein) or along the entire thickness. In one example, generating the stress profile includes immersing the glass-based substrate in a molten salt bath including nitrates of Na+, K+, Rb+, Cs+ or a combination thereof, having a temperature of about 350° C. or greater (e.g., about 350° C. to about 500° C.). In one example, the molten bath may include $NaNO_3$ and may have a temperature of about 485° C. In another example, the bath may include $NaNO_3$ and have a temperature of about 430° C. The glass-based substrate may be immersed in the bath for about 2 hours or more, up to about 48 hours (e.g., from about 12 hours to about 48 hours, from about 12 hours to about 32 hours, from about 16 hours to about 32 hours, from about 16 hours to about 24 hours, or from about 24 hours to about 32 hours).

In some embodiments, the method may include chemically strengthening or ion exchanging the glass-based substrate in more than one step using successive immersion steps in more than one bath. For example, two or more baths may be used successively. The composition of the one or more baths may include a single metal (e.g., Ag+, Na+, K+, Rb+, or Cs+) or a combination of metals in the same bath. When more than one bath is utilized, the baths may have the same or different composition and/or temperature as one another. The immersion times in each such bath may be the same or may vary to provide the desired stress profile.

In one or more embodiments, a second bath or subsequent baths may be utilized to generate a greater surface CS. In some instances, the method includes immersing the glass-based substrate in the second or subsequent baths to generate a greater surface CS, without significantly influencing the chemical depth of layer and/or the DOC. In such embodiments, the second or subsequent bath may include a single metal (e.g., $KNO_3$ or $NaNO_3$) or a mixture of metals ($KNO_3$ and $NaNO_3$). The temperature of the second or subsequent bath may be tailored to generate the greater surface CS. In some embodiments, the immersion time of the glass-based substrate in the second or subsequent bath may also be tailored to generate a greater surface CS without influencing the chemical depth of layer and/or the DOC. For example, the immersion time in the second or subsequent baths may be less than 10 hours (e.g., about 8 hours or less, about 5 hours or less, about 4 hours or less, about 2 hours or less, about 1 hour or less, about 30 minutes or less, about 15 minutes or less, or about 10 minutes or less).

In one or more alternative embodiments, the method may include one or more heat treatment steps which may be used in combination with the ion-exchanging processes described herein. The heat treatment includes heat treating the glass-based article to obtain a desired stress profile. In some embodiments, heat treating includes annealing, tempering or heating the glass-based substrate to a temperature in the range from about 300° C. to about 600° C. The heat treatment may last for 1 minute up to about 18 hours. In some embodiments, the heat treatment may be used after one or more ion-exchanging processes, or between ion-exchanging processes.

EXAMPLES

Various embodiments will be further clarified by the following examples. In the Examples, prior to being strengthened, the Examples are referred to as "substrates".

After being subjected to strengthening, the Examples are referred to as "articles" or "glass-based articles".

Example 1

Glass-ceramic substrates having a nominal composition as shown below in Table 2 was provided. The glass-ceramic substrates had a thickness of 0.8 millimeters and included a crystal phase assemblage comprising a β-spodumene solid solution as a predominant crystalline phase and one or more minor phases including rutile. The glass-ceramic substrates were immersed in a molten salt bath including $NaNO_3$ having a temperature of 485° C. for 10 hours (Condition A), 13 hours (Condition B) or 24 hours (Condition C), or a molten salt bath including $NaNO_3$ having a temperature of 430° C. for the 2 hours (Comparative Condition D) to form glass-ceramic articles.

TABLE 2

Composition of the glass-ceramic substrate of Example 1, prior to chemical strengthening.

| Example=▶ Oxide [mole %] | 1 |
|---|---|
| $SiO_2$ | 69.2 |
| $Al_2O_3$ | 12.6 |
| $B_2O_3$ | 1.8 |
| $Li_2O$ | 7.7 |
| $Na_2O$ | 0.4 |
| MgO | 2.9 |
| ZnO | 1.7 |
| $TiO_2$ | 3.5 |
| $SnO_2$ | 0.1 |
| $\frac{[Li_2O + Na_2O + MgO + ZnO + K_2O]}{[Al_2O_3 + B_2O_3]}$ | $\frac{12.7}{14.4}$ |
| $\frac{[TiO_2 + SnO_2]}{[SiO_2 + B_2O_3]}$ | $\frac{3.6}{.71}$ |

Figure 5:
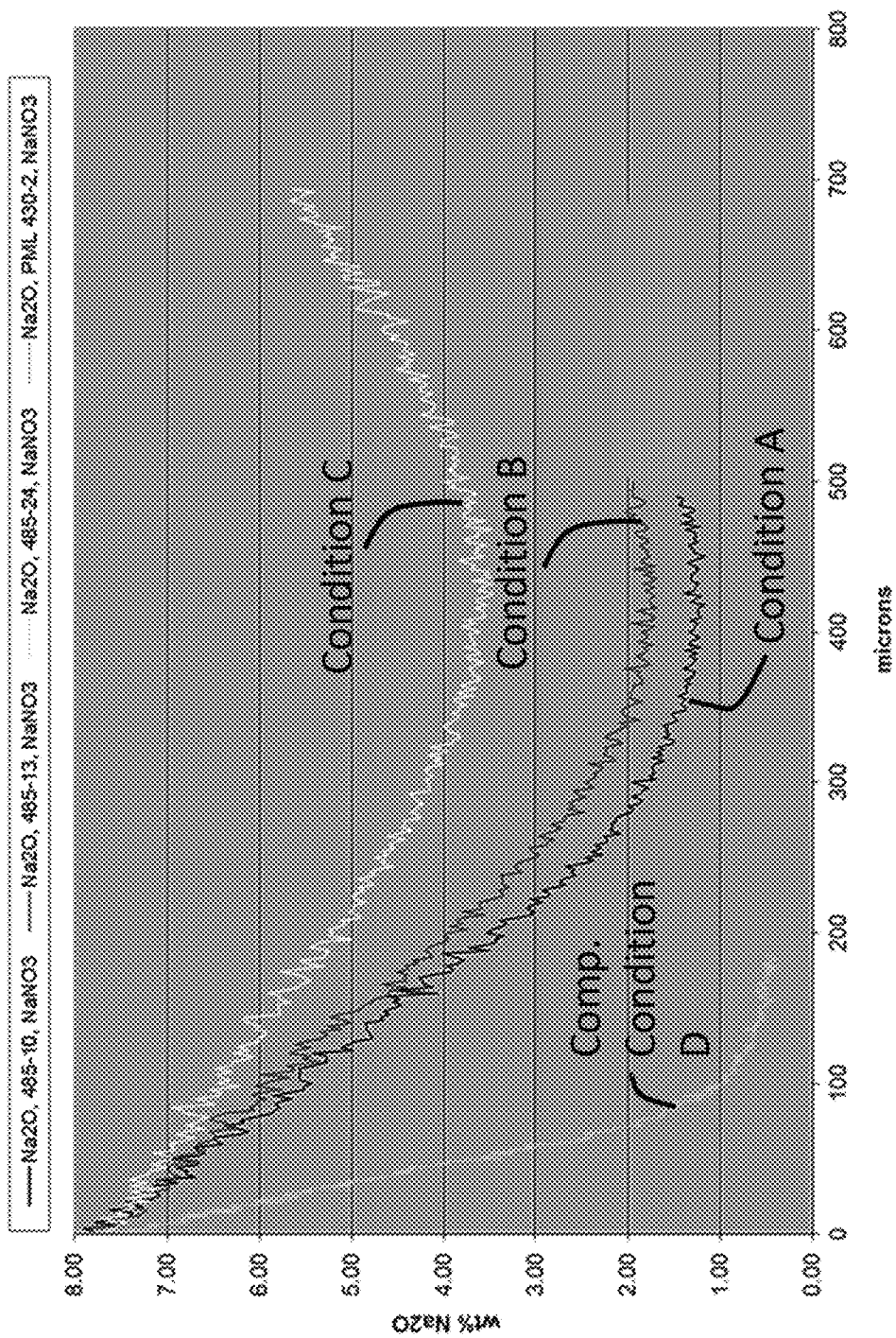
FIG. 5 is a graph showing the concentration of $Na_2O$ in known chemically strengthened glass-based articles and glass-based articles according to one or more embodiments of this disclosure.

The stress profiles of the glass-ceramic articles were measured by microprobe and are shown in FIG. 5. As shown in FIG. 5, the Na+ ions are ion exchanged through almost the entire thickness of the articles when a higher temperature bath is utilized (i.e., Conditions A-C). In such glass-ceramics, $Na_2O$ is present in the CT region in an amount of about 1.2 mol % or greater. The glass-ceramic article ion exchanged in a lower temperature bath (Comparative Condition D) exhibited a stress profile that resembles known stress profiles.

Example 2

Figure 6:
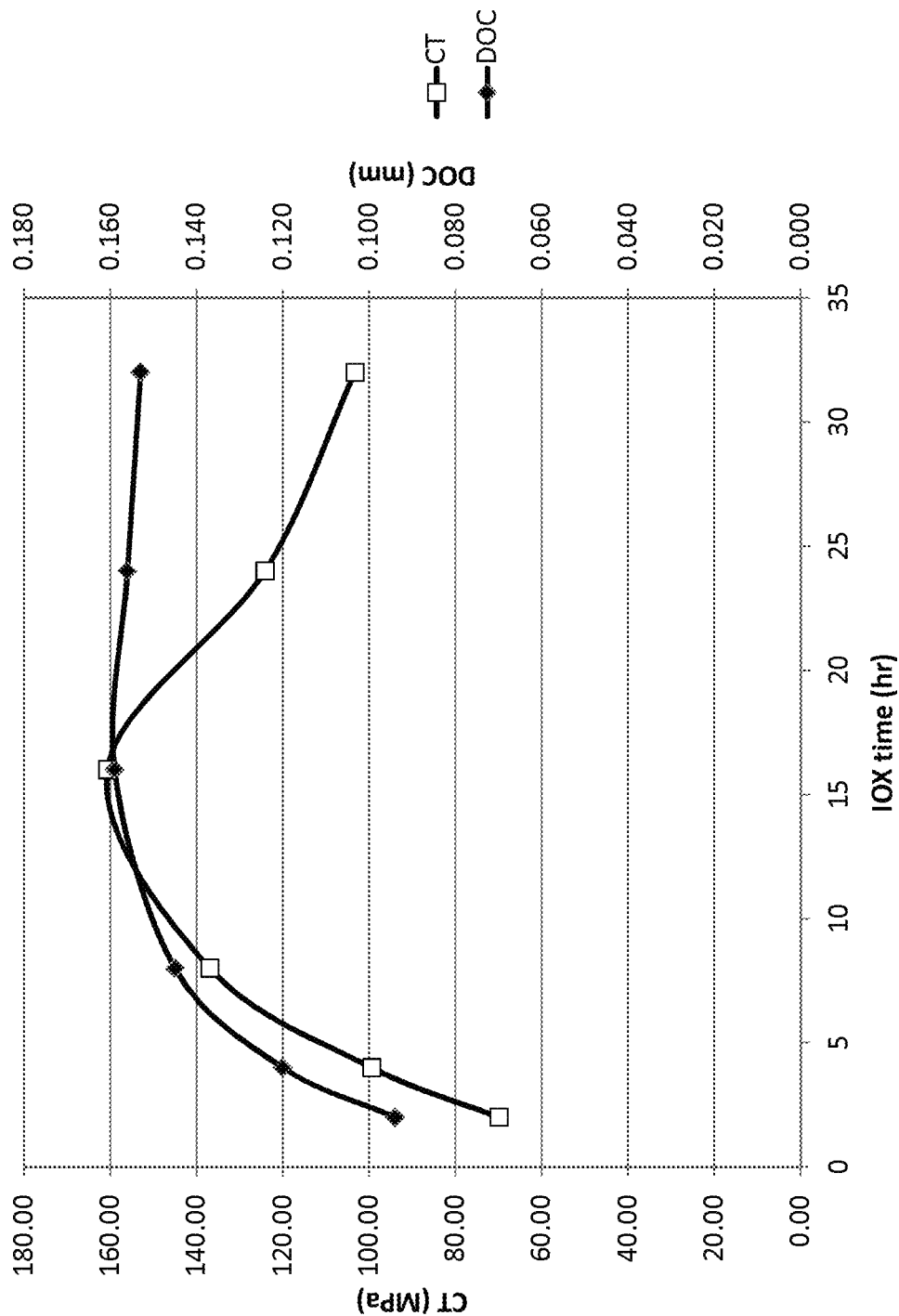
FIG. 6 is a graph showing CT values and DOC values as a function of ion exchange time, according to one or more embodiments of this disclosure.

Glass substrates having the same composition as shown in Table 2 and a thickness of 0.8 mm, but having an amorphous structure (and no crystal phases) were chemically strengthened by immersing in a molten salt bath including 100% $NaNO_3$ having a temperature of about 430° C. for various durations to provide glass articles. The DO) and the maximum CT value of the glass articles were measured using a scattered light polariscope (SCALP). As shown in FIG. 6, the DOC and the maximum CT increases with increased length of immersion or ion exchange. The greatest CT values were observed after immersing the glasses for about 16 hours.

Figure 7:
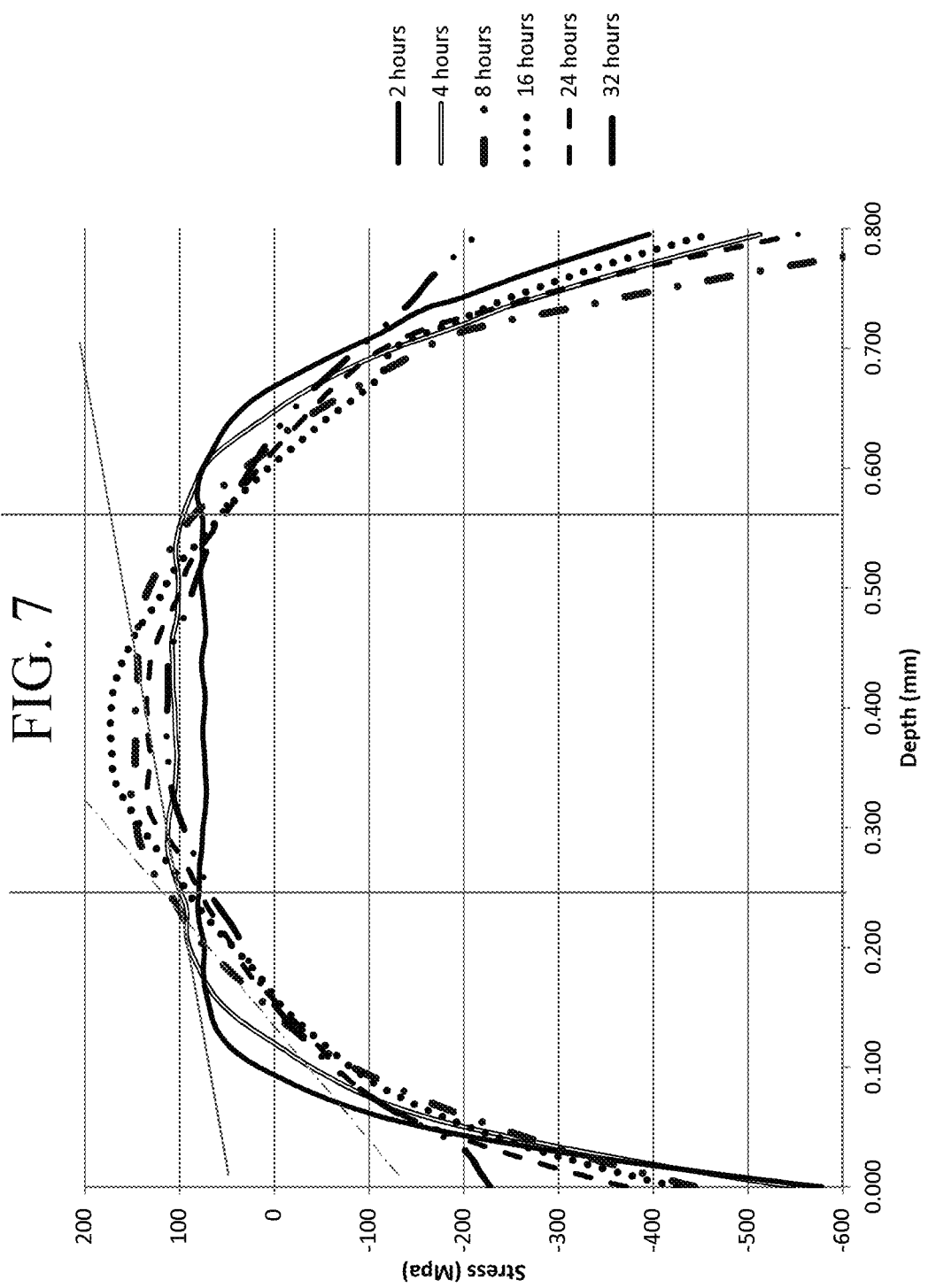
FIG. 7 is a graph comparing the stress profiles as a function of depth of known chemically strengthened glass-based articles and glass-based articles, according to one or more embodiments of this disclosure

The stress profiles of the glass articles of Example 2 were measured using SCALP and are shown in FIG. 7. The upper portion of the x-axis indicating a positive stress value is the CT layer and the lower portion of the x-axis indicating a negative stress value is the CS values. The stress profile of the glass article that was chemically strengthened for 16 hours exhibited the greatest CT value (i.e., 175 MPa) and a shape that was parabolic-like, which included substantially no linear portions, in a depth direction, of 100 micrometers. The surface CS measured by SCALP was about 410 MPa. Accordingly, the ratio of maximum CT to surface CS of Example 2 is about 0.4375.

Example 3

Figure 8:
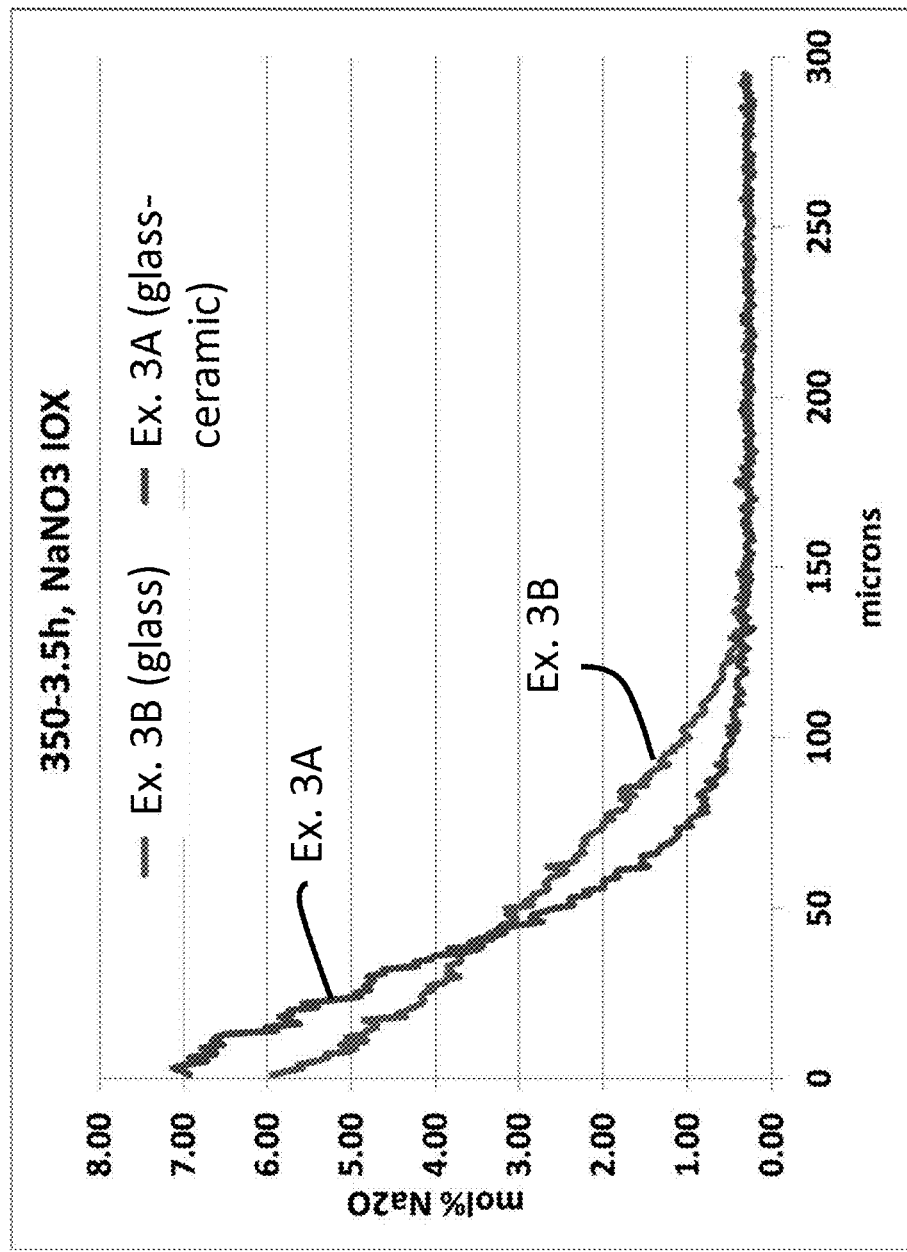
FIG. 8 shows a graph of the stress profiles of a known chemically strengthened glass and glass-ceramic.

For comparison, the glass-ceramic substrate of Example 1 and the glass substrate of Example 2, each having a thickness of about 0.8 mm, were subjected to chemical strengthening by immersing in a molten salt bath of $NaNO_3$ having a temperature of 350° C. for 3.5 hours (Example 3A and 3B, respectively). The resulting stress profiles of the glass-ceramic article and glass article shown in FIG. 8 resemble an error function (erfc) or quasi-linear shape. Moreover, the CS depth of layer is less than the depth of the alkali ion exchanged into the glass or glass-ceramic (or the chemical ion exchange depth).

Figure 9:
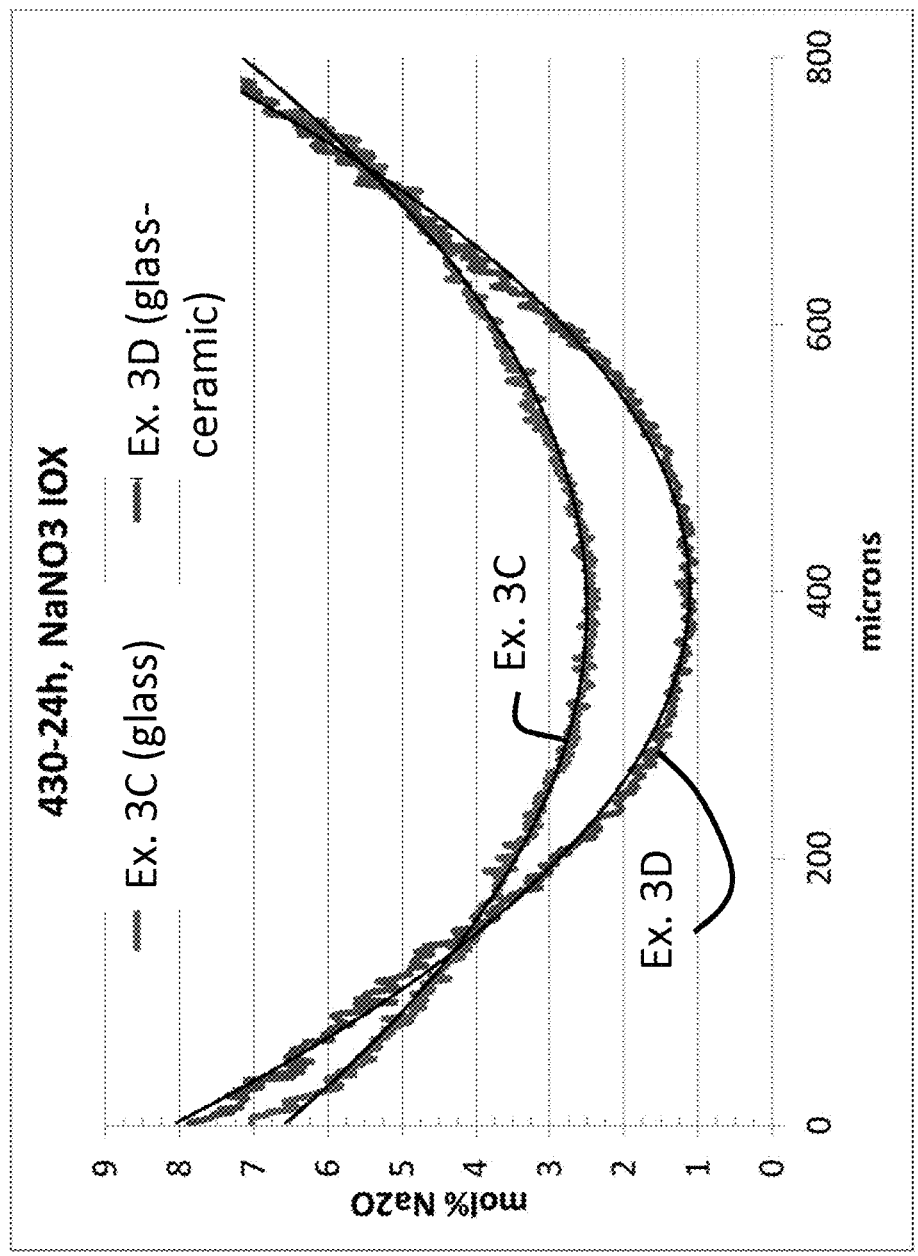
FIG. 9 shows a graph of the stress profiles of a glass and glass-ceramic according to one or more embodiments of this disclosure.
Figure 9A:
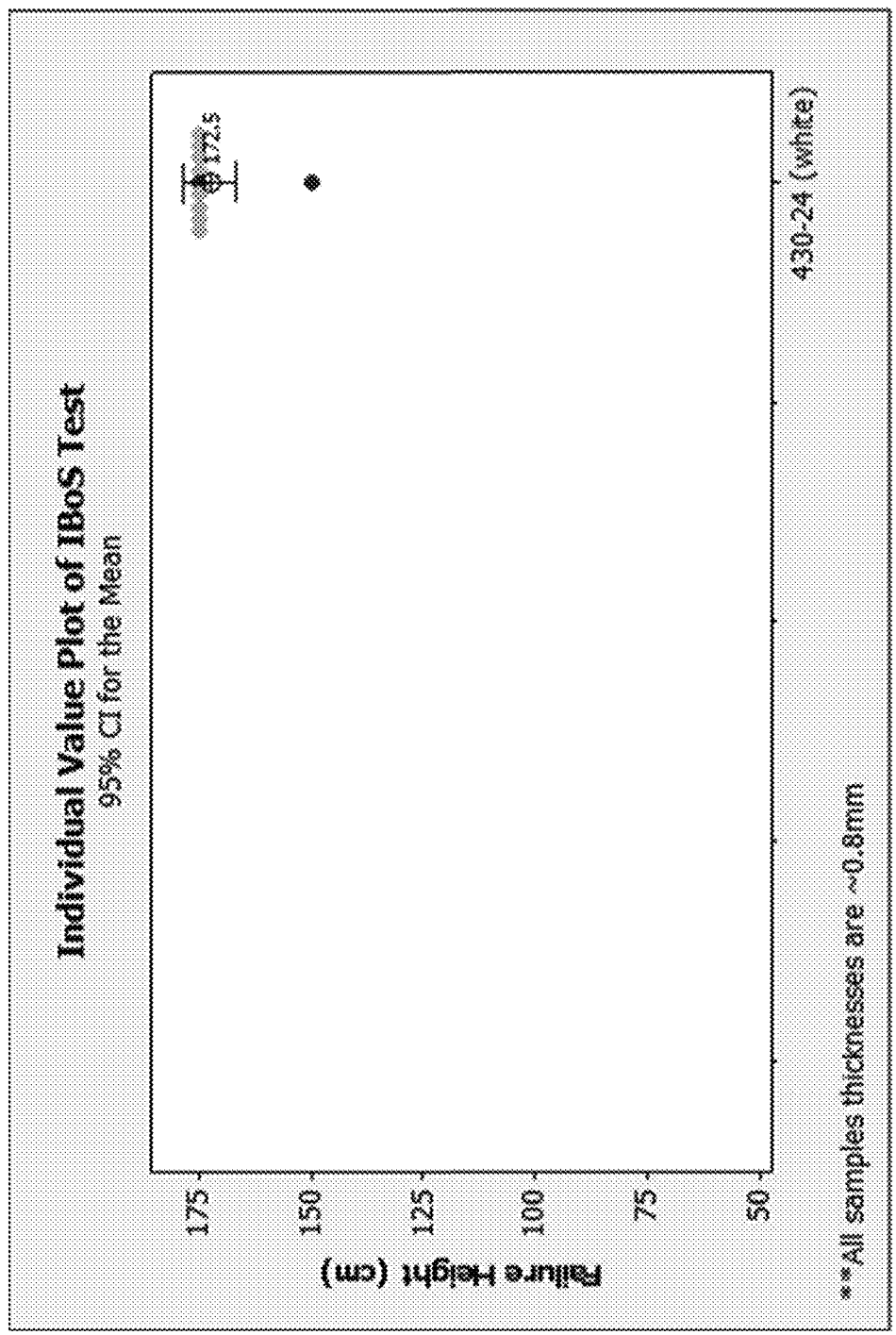
FIG. 9A shows a graph of the failure height in drop testing of Example 3D.

When the glass-ceramic substrate of Example 1 and the glass substrate of Example 2, each having a thickness of about 0.8 mm were subjected to the chemical strengthening described herein by immersing in a molten salt bath of $NaNO_3$ having a temperature of 430° C. for 24 hours (Examples 3C and 3D, respectively), the resulting glass-based articles exhibited metal oxide concentration profiles (obtained by EPMA) as shown in FIG. 9. The metal oxide concentration profiles are parabolic-like and show a ion exchange of Na+ ions throughout the entire thickness. The chemical profiles were measured using EMPA and the chemical depth of $Na_2O$ diffusion is shown as equal to or larger than 400 micrometers. Moreover, $Na_2O$ is present in a concentration of about 1 mol % or greater throughout the thickness, including in the CT layer. The resulting glass-ceramic articles of Example 3D exhibited superior fracture resistance in a drop test in which the glass-ceramic substrates were retrofitted into an identical mobile phone housing. Specifically, Five samples of Example 3D were assembled in a mobile phone device and dropped onto sandpaper for successive drops starting at a height of 50 cm. As each sample survived the drop from a height, it was dropped again from an increase height until it fractured, at which point the failure height of that sample was recorded in FIG. 9A. Example 3D exhibited an average failure height of 172.5 cm.

Figure 10:
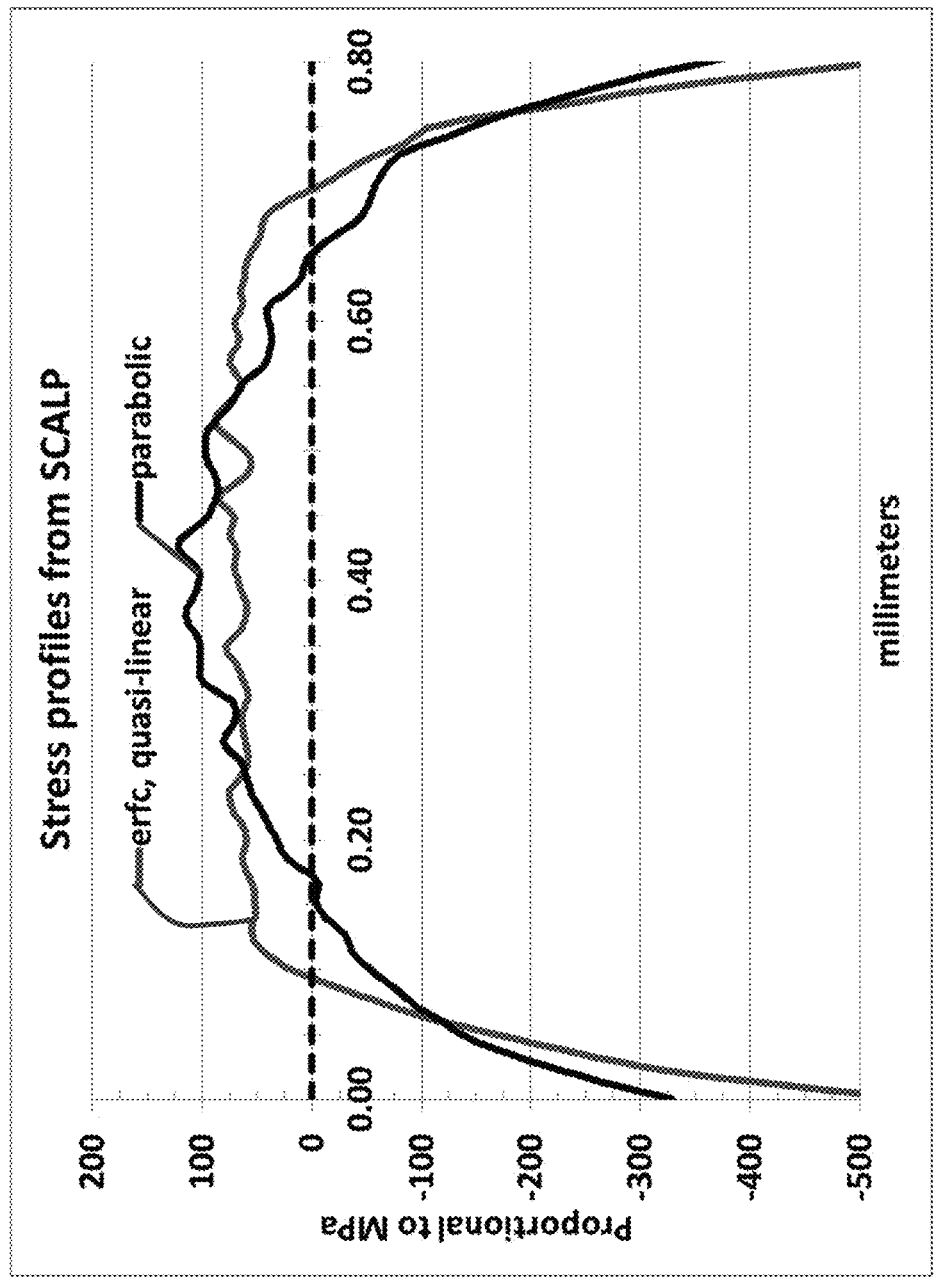
FIG. 10 is a graph comparing a known stress profile of a chemically strengthened glass-based article and a glass-based article according to one or more embodiments of this disclosure.

FIG. 10 shows stress profiles of a glass-based substrate chemically strengthened according to known processes and a glass-based substrate chemically strengthened according to the methods described herein. As shown in FIG. 10, the stress profile of the glass-based articles of the embodiments described herein have a shape that is substantially free of linear segments (having a length or absolute depth greater than about 50 micrometers) and exhibits a DOC of about 0.2·t, while the known stress profile exhibits a substantially linear portion from a depth of about 0.1 millimeters to about 0.7 millimeters (for a total length of about 0.6 millimeters or 600 micrometers). The known stress profile also exhibits a lower CT value and a lower DOC.

Example 4

Figure 11:
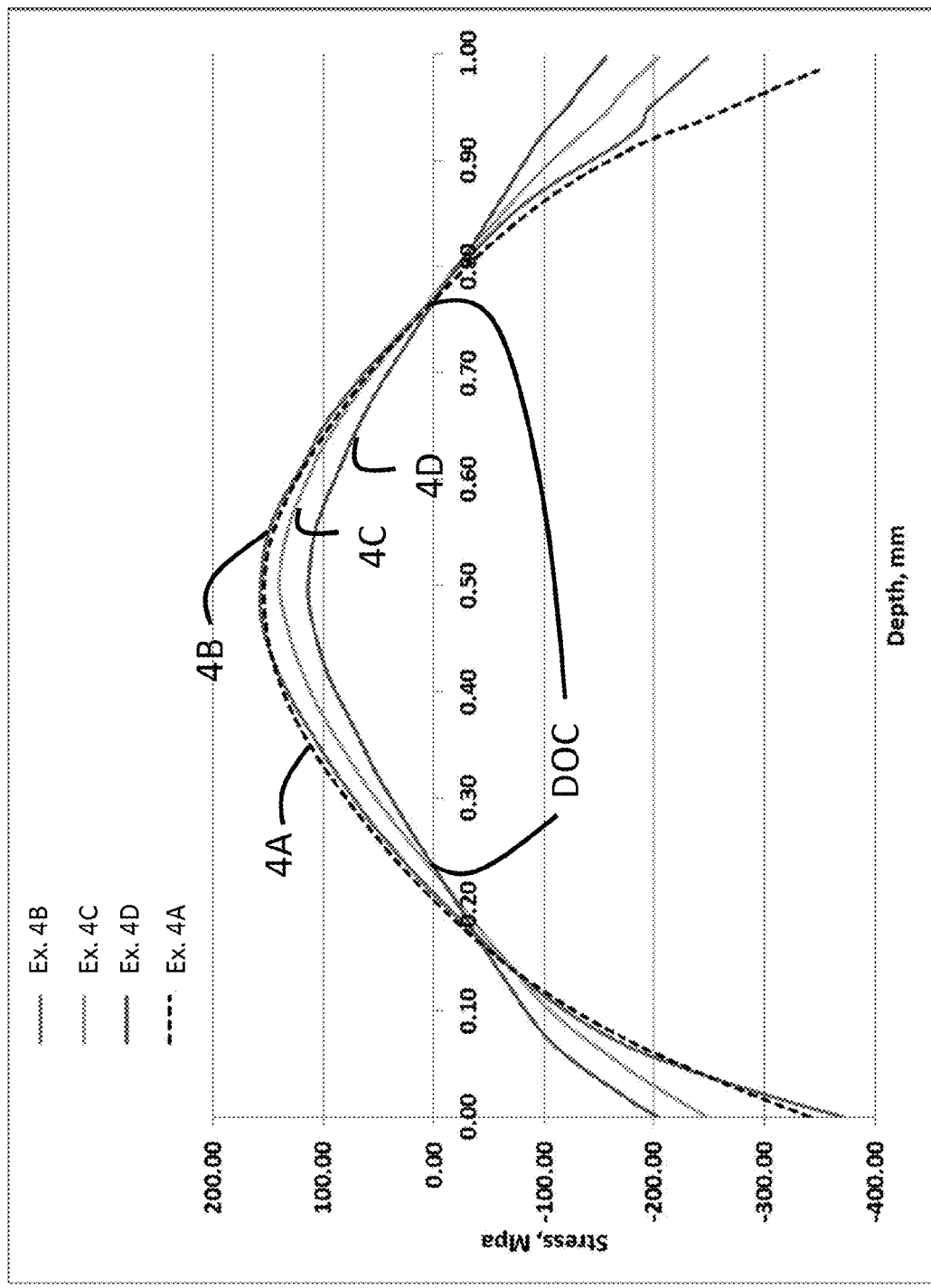
FIG. 11 is a graph showing the stress profiles of Examples 4A-4D as function of thickness.

Glass substrates (each having a thickness of about 1 mm) having the composition of Table 2 were subjected to chemical strengthening by immersing in a first molten salt bath of NaNO₃ having a temperature of 430° C. for 24 hours. One glass-based article was not subjected to any additional strengthening steps (Example 4A). Three glass-based articles were subjected to a second strengthening step by immersion in a second molten salt bath of KNO₃ having a temperature of about 430° C. for either 0.75 hours, 4 hours, or 8 hours (Examples 4B, 4C and 4D, respectively). The stress profiles as measured by SCALP of the resulting glass-based articles are shown in FIG. 11, with depth or thickness of the glass-based articles plotted on the x-axis and stress plotted on the y-axis. The positive stress values are CT values and the negative stress values are the CS values. Spatial resolution of the instrument prohibits measurement of the CS associated with the second KNO₃ ion exchange step. The glass-based articles of Examples 4A and 4B exhibited similar profiles. The glass-based articles of Examples 4C and 4D exhibited decreasing CT (as compared to Examples 4A and 4B) and decreasing CS (as compared to Examples 4A and 4B), with time and after the immersion at second strengthening step. The glass-based articles of Examples 4C and 4D also exhibited increased DOC, as compared to Examples 4A and 4B, and such DOC values were greater than 0.2·t.

Figure 12:
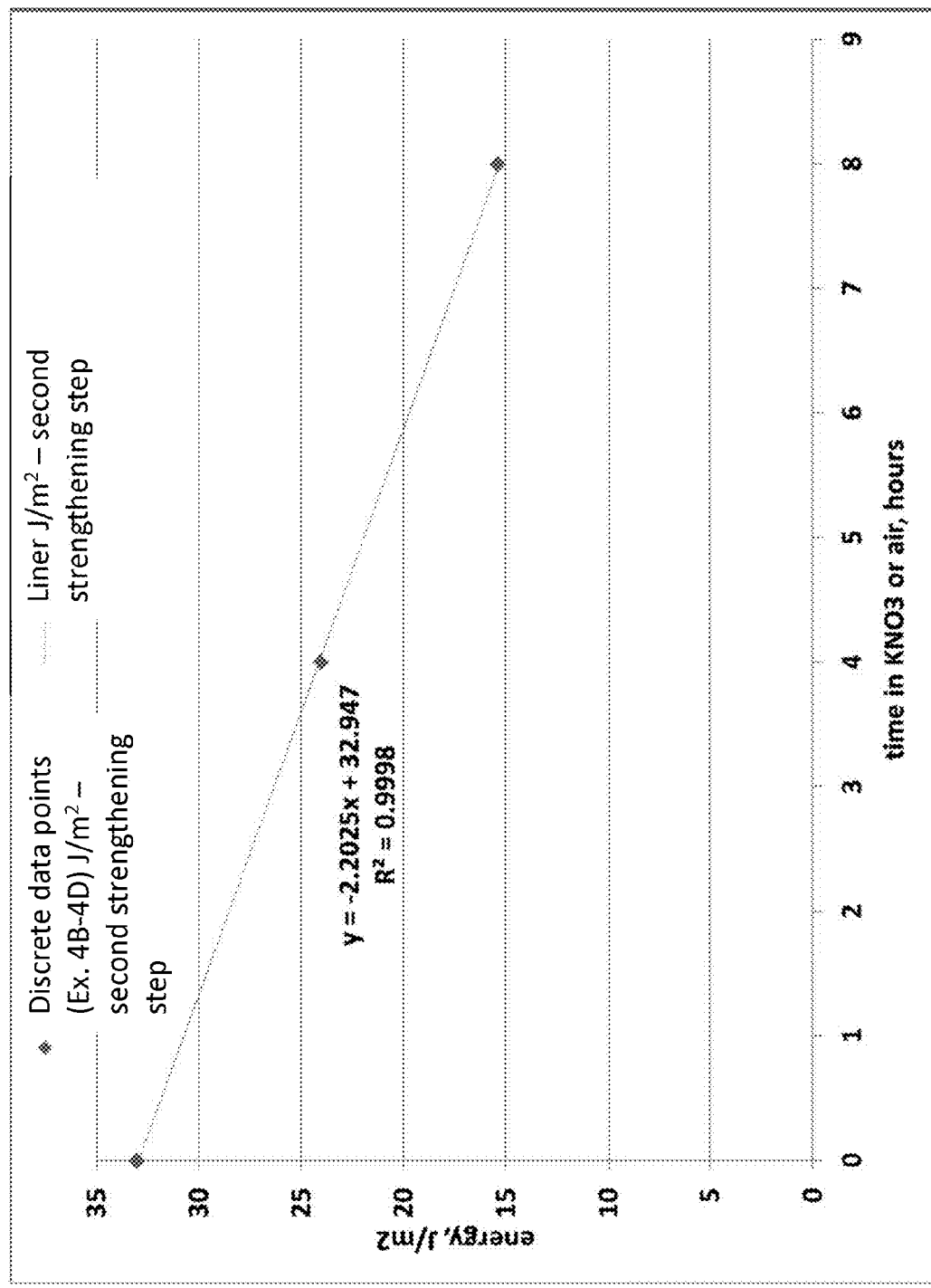
FIG. 12 is a graph showing discrete stored tensile energy data points for Examples 4B-4D.

FIG. 12 shows the stored tensile energy in J/m² for each of Examples 4B-4D, which are greater than 15 J/m² depending on time immersed in the second molten salt bath of KNO₃. The stored tensile energy can be calculated from the measured SCALP stress profile data and using equation (3) above.

Figure 13:
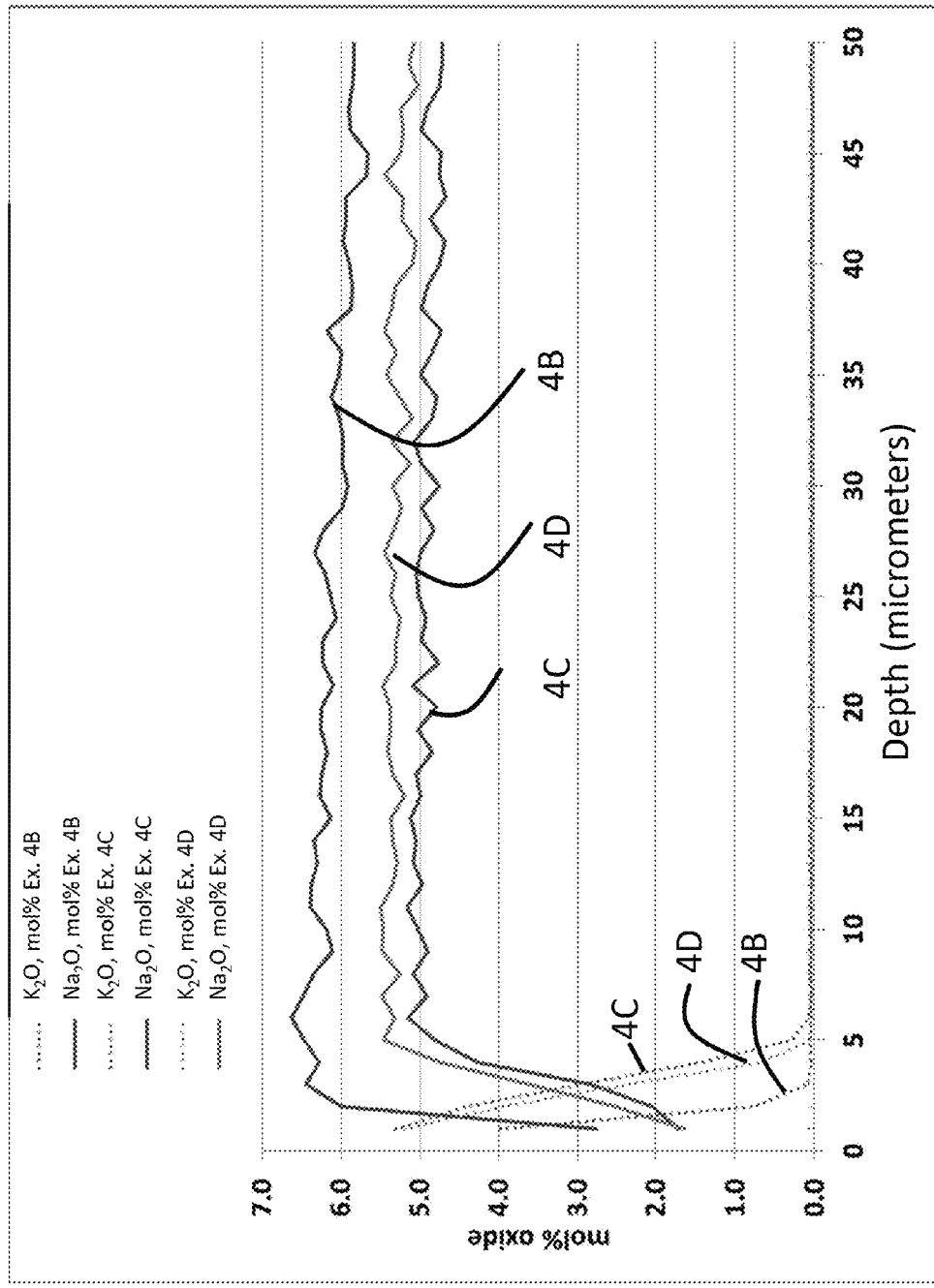
FIG. 13 is a graph showing the concentration of $K_2O$ and $Na_2O$ as a function of depth in Examples 4A-4D.
Figure 14:
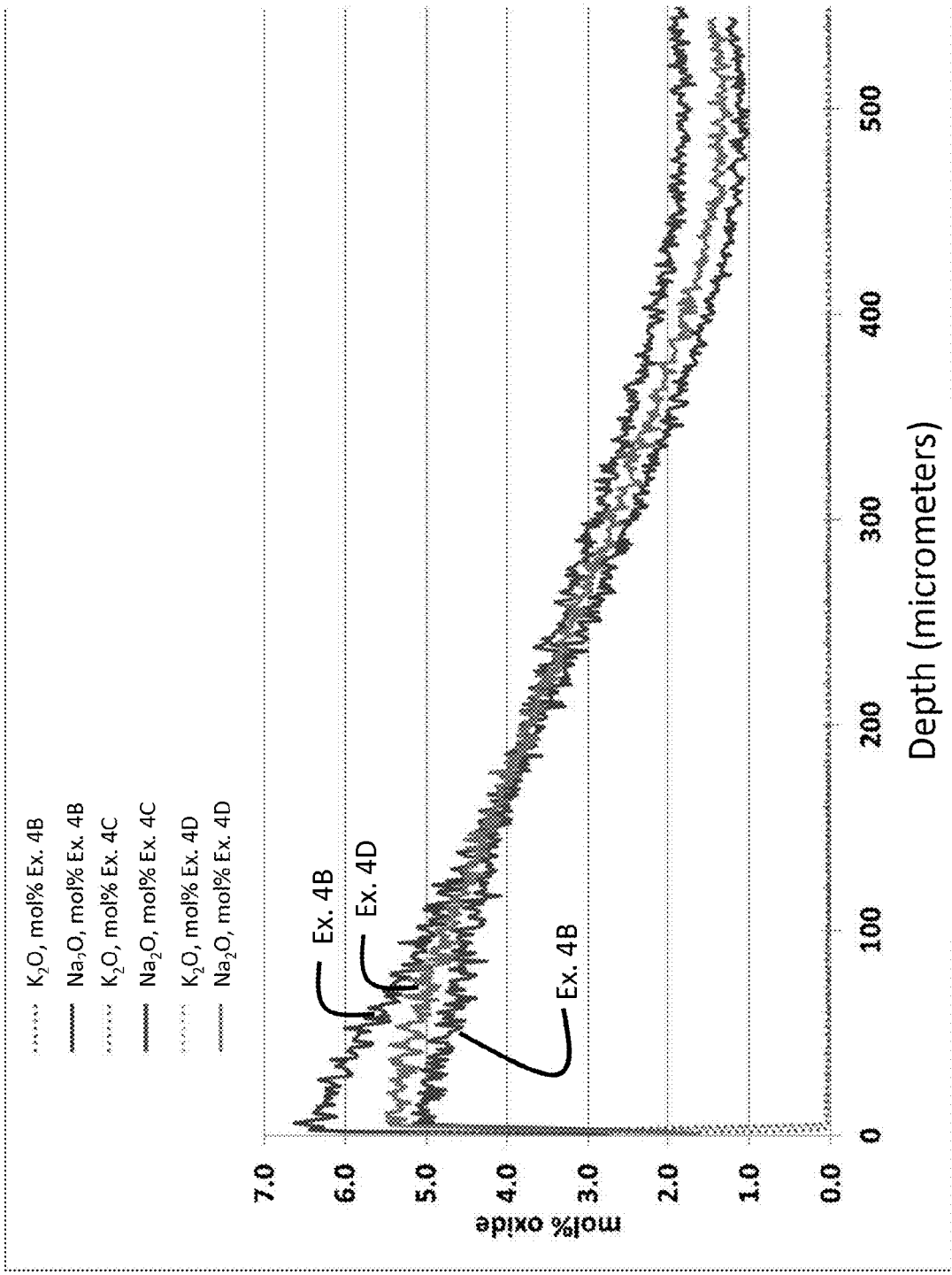
FIG. 14 is a graph showing the same data as FIG. 12, but with a different scale to more clearly illustrate the concentration of $Na_2O$ as a function of depth.

FIGS. 13 and 14 show the concentration profiles of each of K₂O and Na₂O as a function of depth (in micrometers) each of Examples 4B-4D. As shown in FIG. 13, the chemical depth of K₂O is 3 micrometers (Ex. 4B, immersion for 0.75 hours in a KNO₃ bath), 6 micrometers (Ex. 4C, immersion for 4 hours in a KNO₃ bath) and 5 micrometers (Ex. 4D, immersion for 8 hours in a KNO₃ bath). As shown in FIG. 14, Na₂O penetrates the entire depth and has a concentration of about 1 mol % or greater for each of Examples 4B-4D along the entire depth of the glass-based article.

Figure 15:
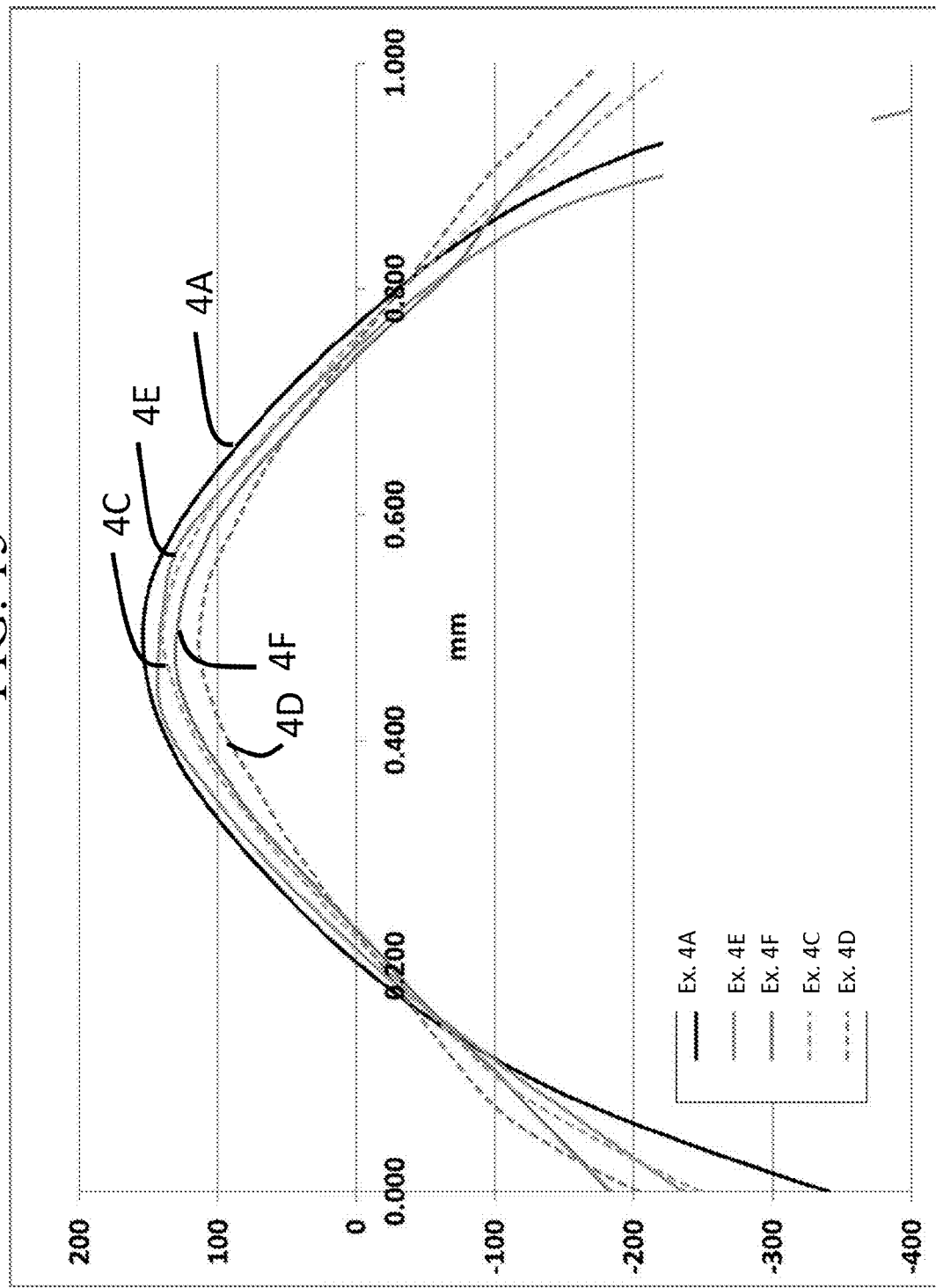
FIG. 15 is a graph showing the stress profiles of Examples 4A and 4C-4F as a function of depth.
Figure 16:
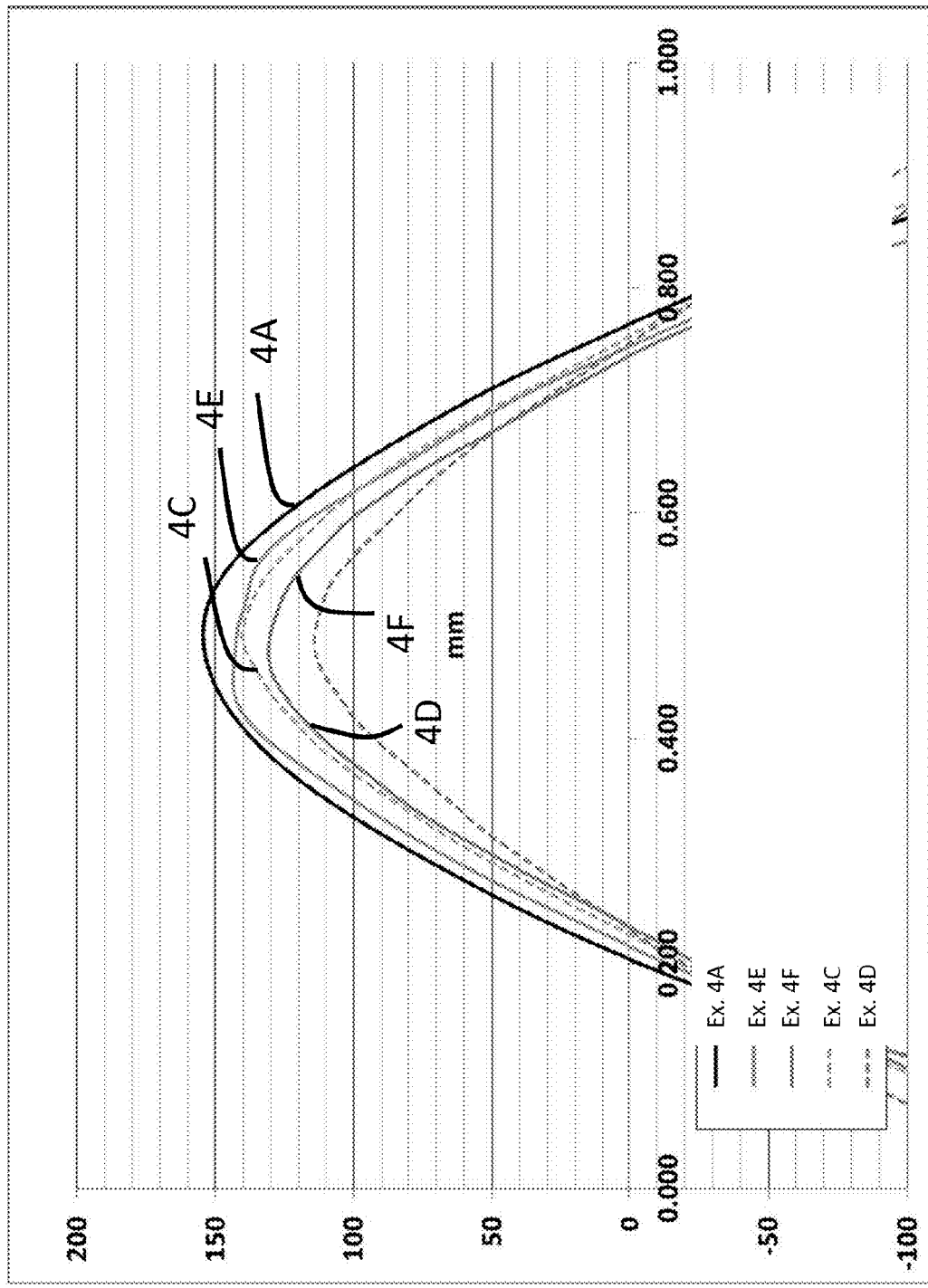
FIG. 16 is a graph showing different scale of FIG. 15.

Examples 4E and 4F included glass substrates (each having a thickness of about 1 mm) having the composition of Table 2, which were subjected to chemical strengthening by immersing in a first molten salt bath of NaNO₃ having a temperature of 430° C. for 24 hours, followed by heat treatment to a temperature of 430° C. in air for 4 hours or 8.25 hours, respectively. The stress profiles of the glass-based articles of Examples 4E, 4F are shown in FIG. 15, with the stress profiles for Examples 4A, 4C and 4D shown for comparison. FIG. 16 shows the same graph as FIG. 15, at a smaller scale to illustrate the differences in the stress profiles at or near a depth of 0.5·t.

Example 5

Glass substrates (each having a thickness of about 1 mm) having the composition of Table 2 were subjected to chemical strengthening by immersing in a first molten salt bath of NaNO₃ having a temperature of 430° C. for 24 hours. One glass-based article was not subjected to any additional strengthening steps (Example 5A). Two glass-based articles were subjected to a second strengthening step by placing the glass-based articles in a furnace at 390° C. and maintaining the glass-based articles in the furnace for about 8 hours or 28 hours (Examples 5B-5C, respectively). Four glass-based articles were subjected to a third strengthening step (after the first strengthening step and either of the different second strengthening steps) by immersing in a second molten salt bath of KNO3 having a temperature of 430° C. for 4 hours or 8 hours (Examples 5D-5G). The strengthening steps for each of Examples 5A-5G is shown in Table 3. The measured CT values are also shown in Table 3.

TABLE 3

Strengthening steps for Examples 5A-5G.

| Step | Ex. 5A | Ex. 5B | Ex. 5C | Ex. 5D | Ex. 5E | Ex. 5F | Ex. 5G |
|---|---|---|---|---|---|---|---|
| 1st Step | NaNO₃, 430° C., 24 hours | NaNO₃, 430° C., 24 hours | NaNO₃, 430° C., 24 hours | NaNO₃, 430° C., 24 hours | NaNO₃, 430° C., 24 hours | NaNO₃, 430° C., 24 hours | NaNO₃, 430° C., 24 hours |
| 2nd Step | | Air, 390° C., 8 hours | Air, 390° C., 28 hours | Air, 390° C., 8 hours | Air, 390° C., 28 hours | Air, 390° C., 8 hours | Air, 390° C., 28 hours |
| 3rd Step | | | | KNO₃, 430° C., 4 hours | KNO₃, 430° C., 4 hours | KNO₃, 430° C., 8 hours | KNO₃, 430° C., 8 hours |
| CT | 174 MPa | 148 MPa | 96 MPa | 129 MPa | 82 MPa | 103 MPa | 72 MPa |

Figure 17:
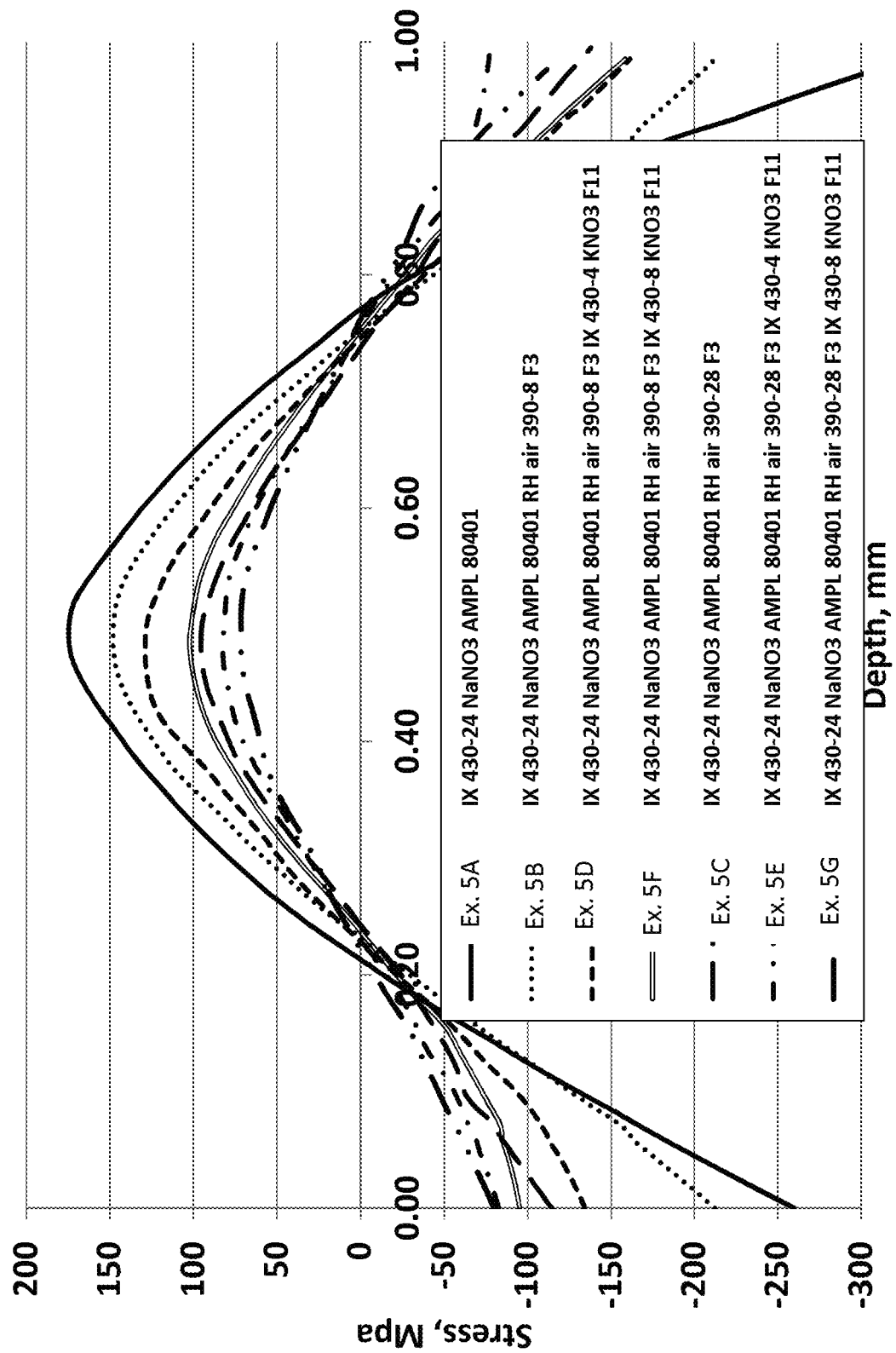
FIG. 17 is a graph showing the stress profiles of Examples 5A-5G as a function of depth.
Figure 18:
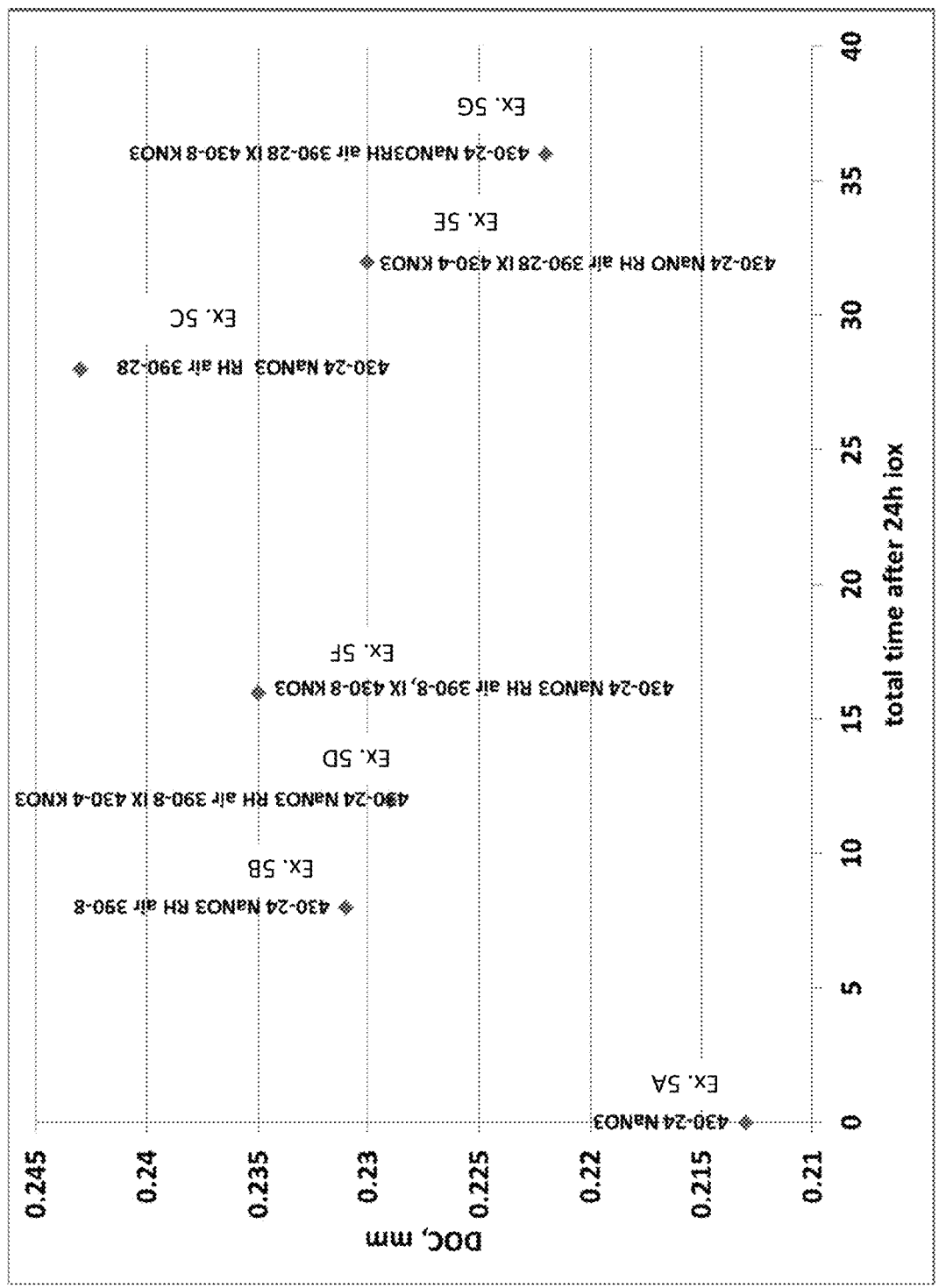
FIG. 18 is a graph showing the DOC values for Examples 5A-5G as a function of duration of the second and/or third ion exchange steps.
Figure 19:
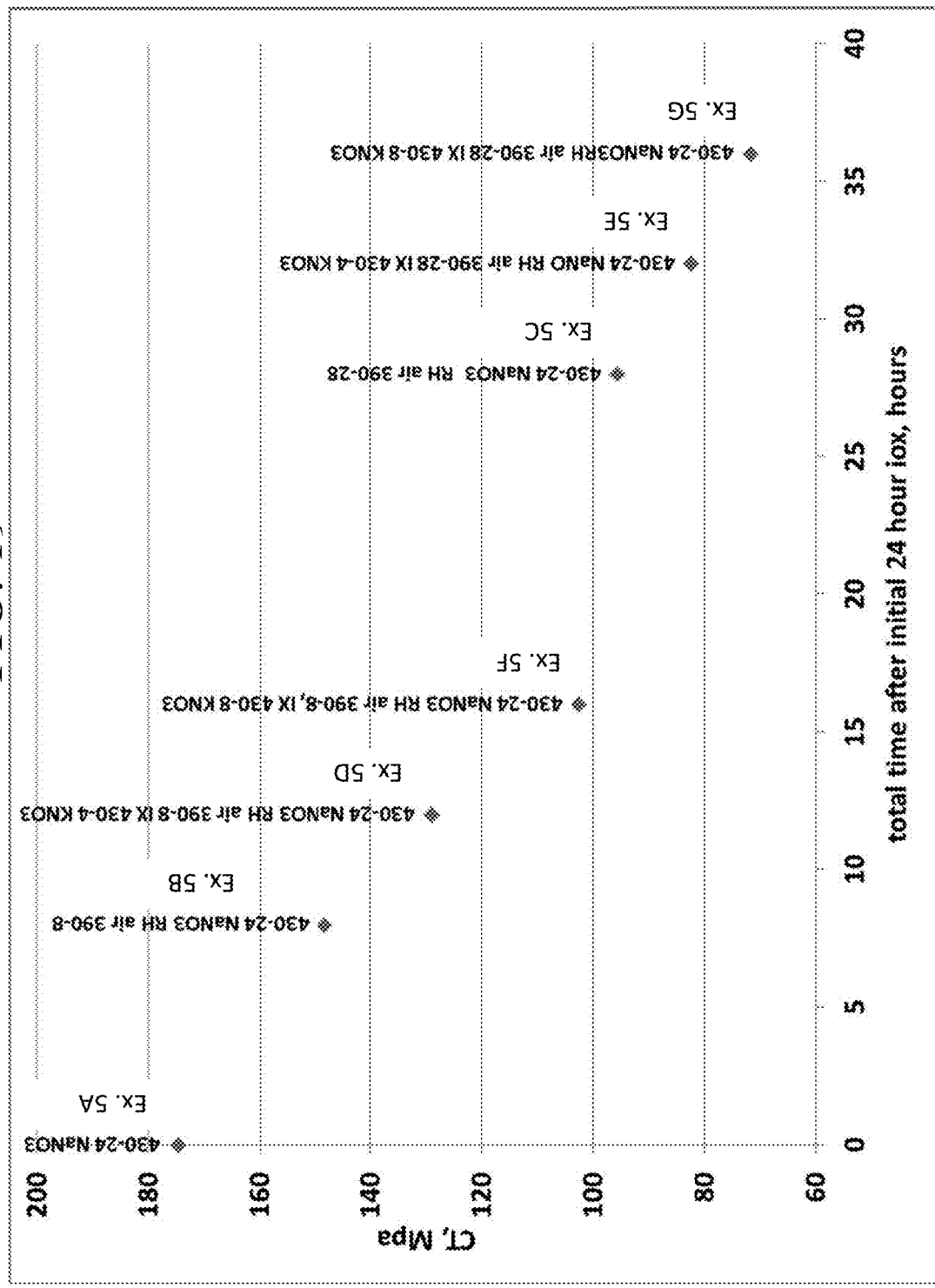
FIG. 19 is a graph showing the CT values Examples 5A-5G as a function of duration of the second and/or third ion exchange steps.
Figure 20:
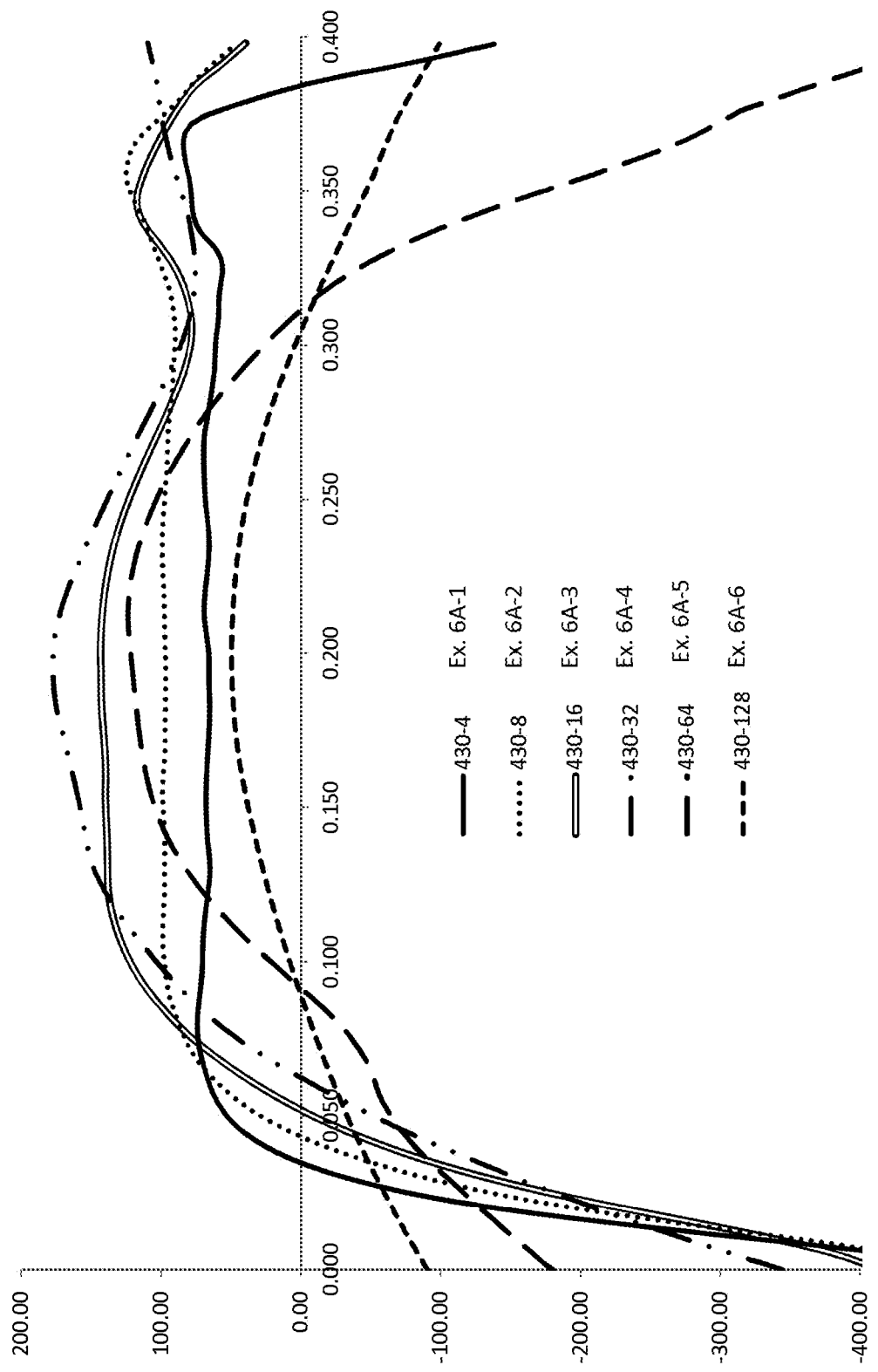
FIG. 20 is a graph showing the stress profiles of Examples 6A-1 through 6A-6 as a function of depth.
Figure 21:
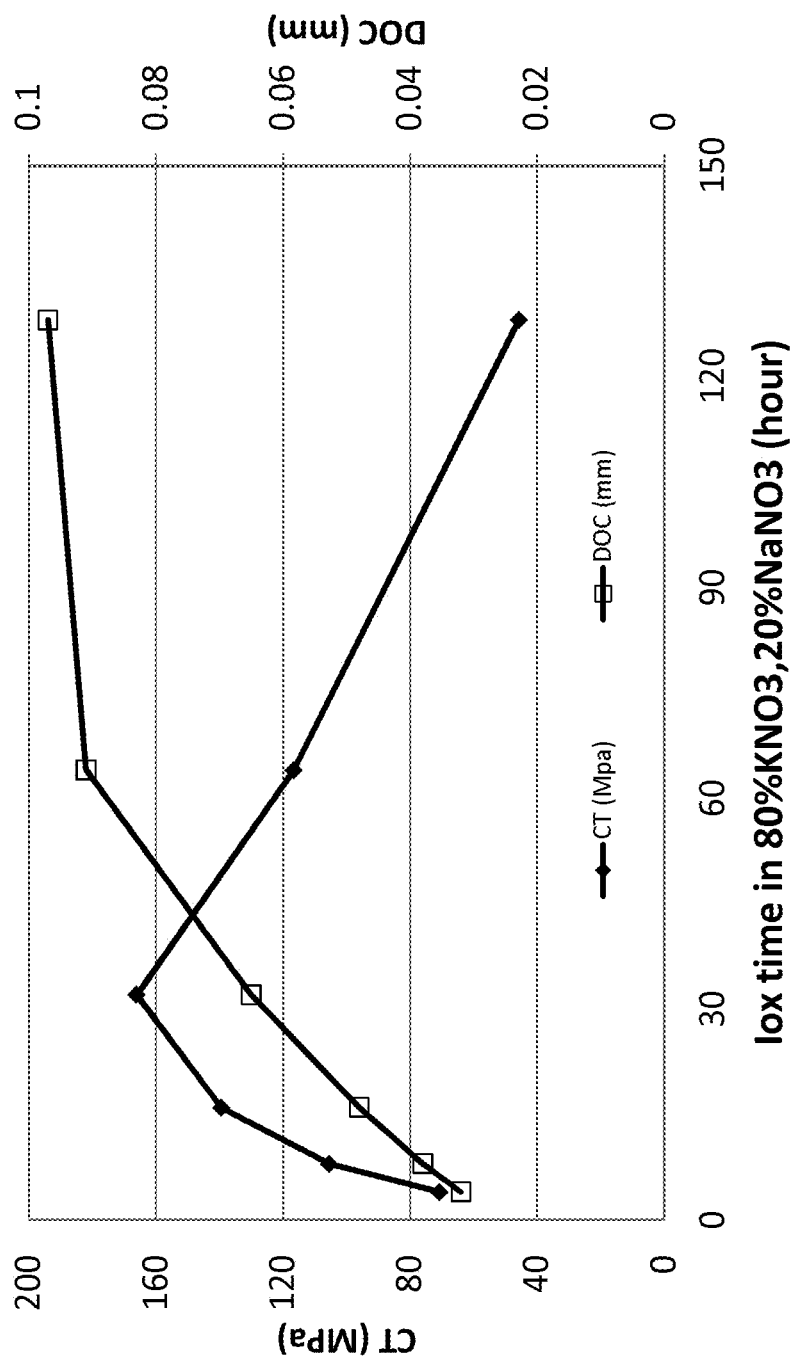
FIG. 21 is a graph showing the CT and DOC values of Examples 6A-1 through 6A-6 as a function of ion exchange time.
Figure 22:
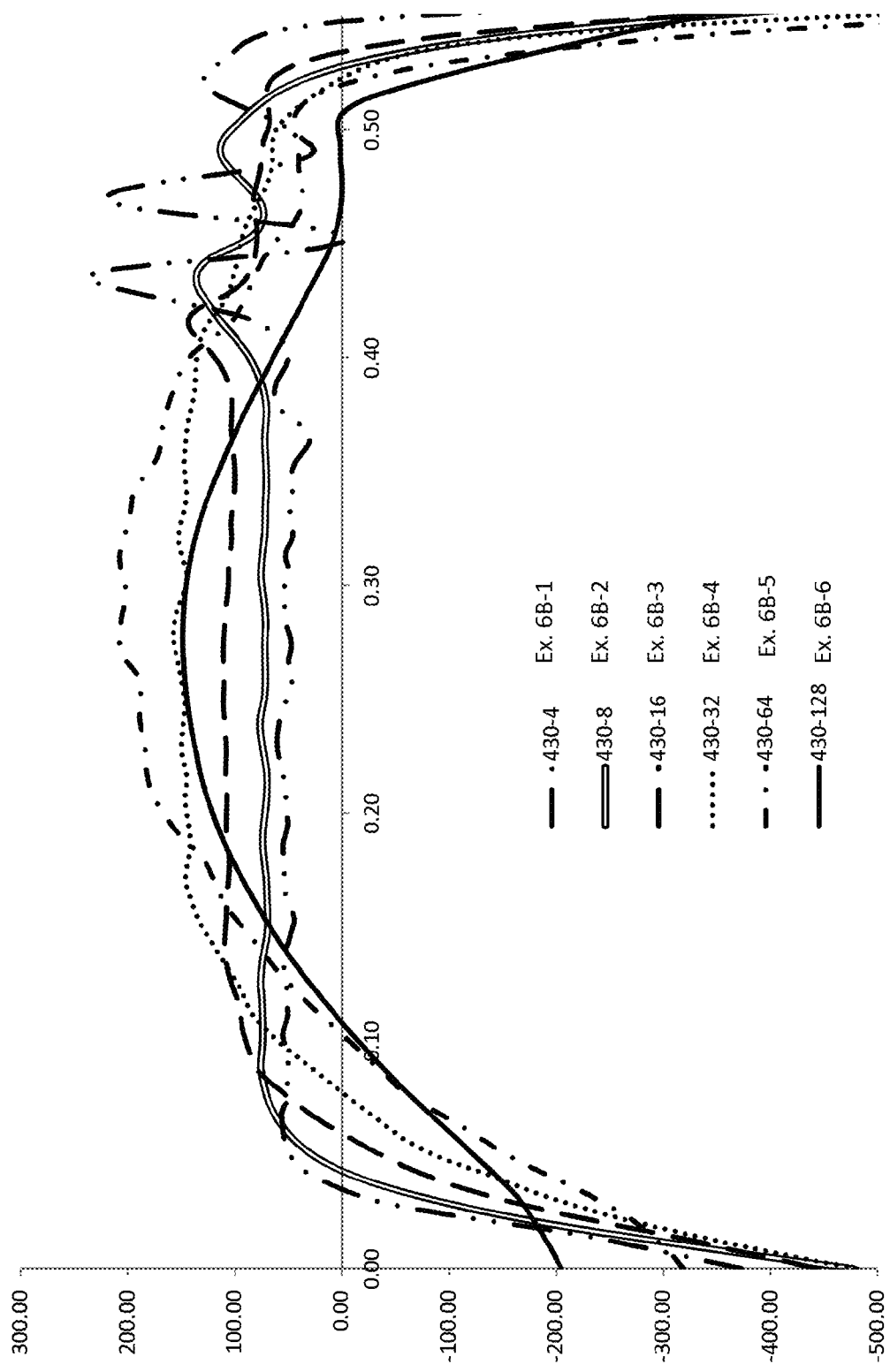
FIG. 22 is a graph showing the stress profiles of Examples 6B-1 through 6B-6 as a function of depth.
Figure 23:
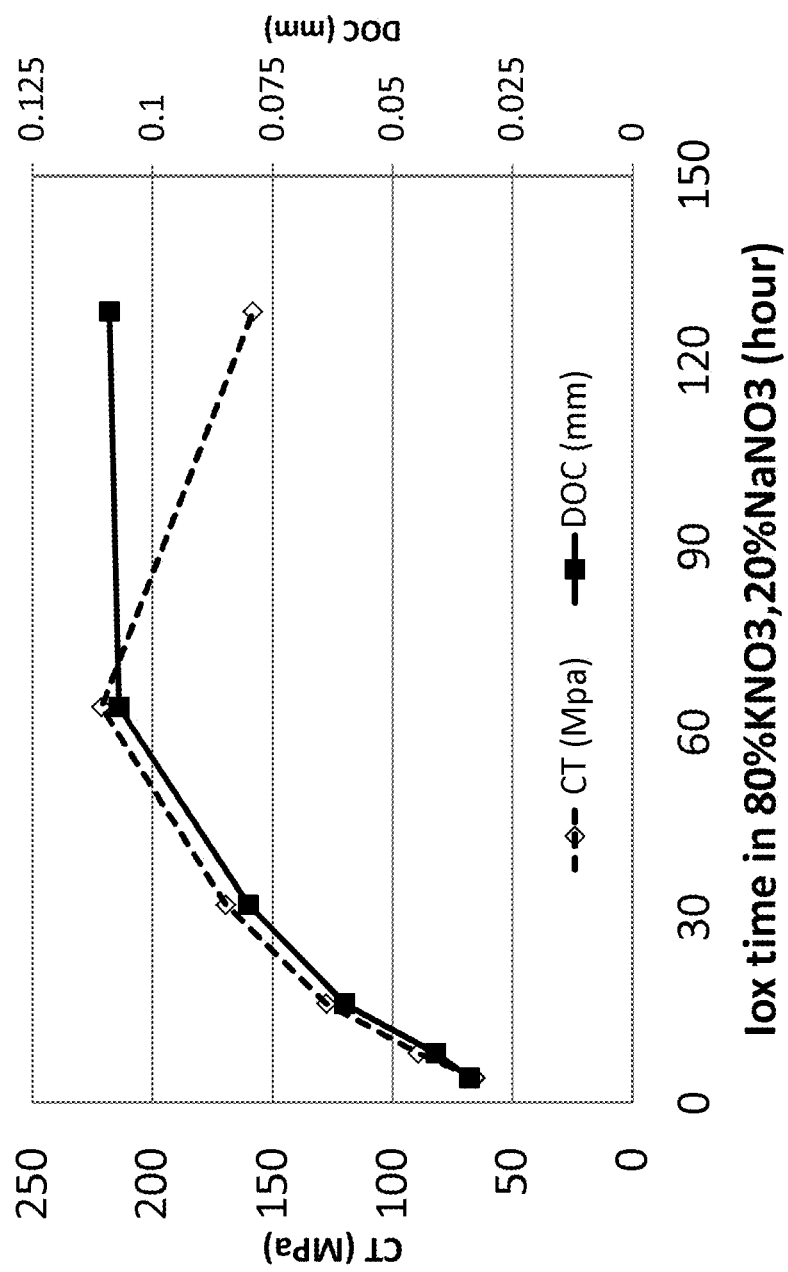
FIG. 23 is a graph showing the CT and DOC values of Examples 6B-1 through 6B-6 as a function of ion exchange time.
Figure 24:
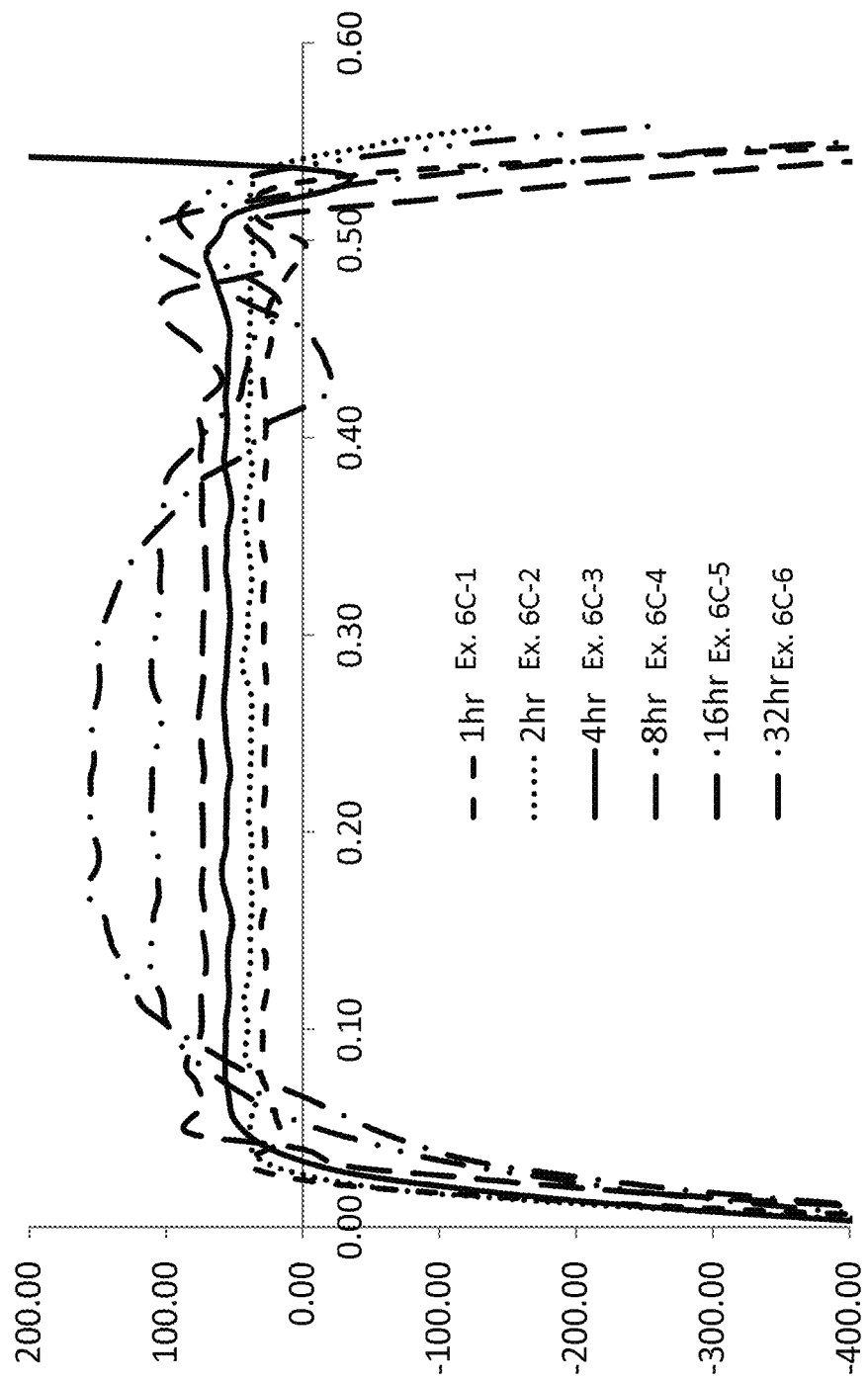
FIG. 24 is a graph showing the stress profiles of Examples 6C-1 through 6C-6 as a function of depth.
Figure 25:
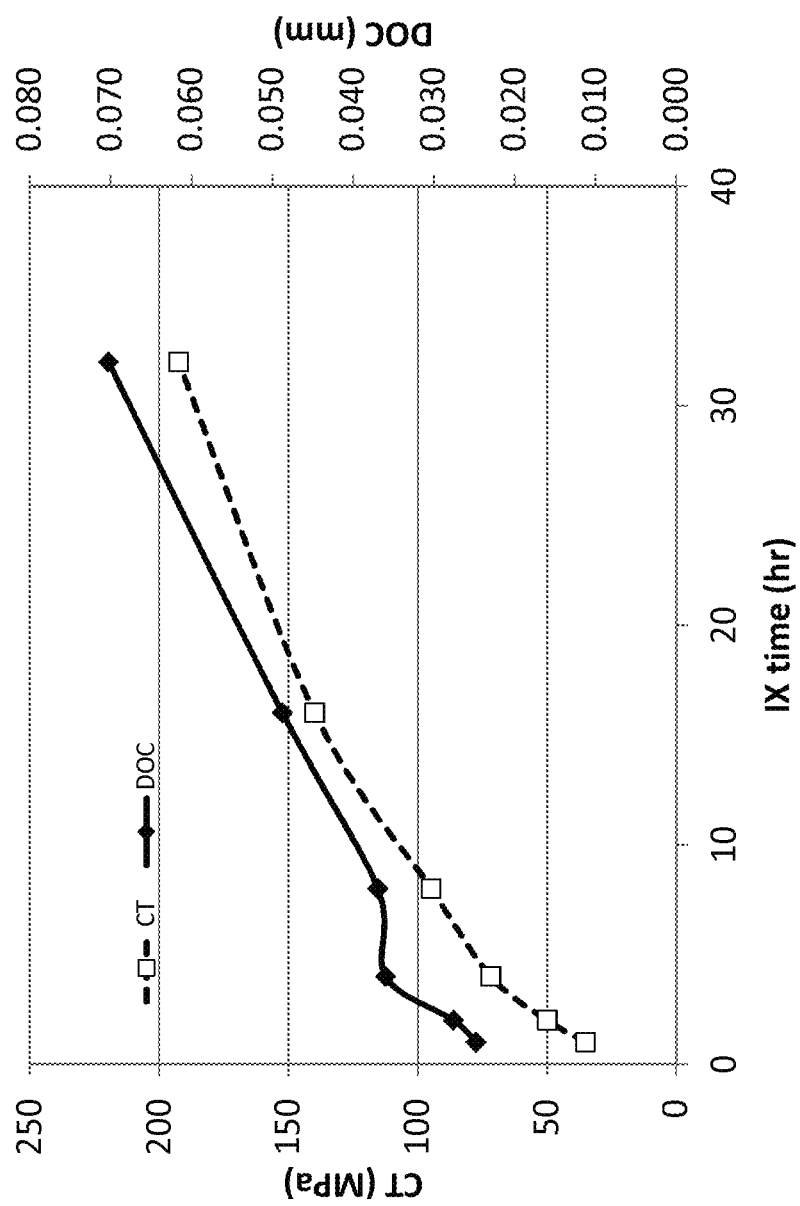
FIG. 25 is a graph showing the CT and DOC values of Examples 6C-1 through 6C-6 as a function of ion exchange time.
Figure 26:
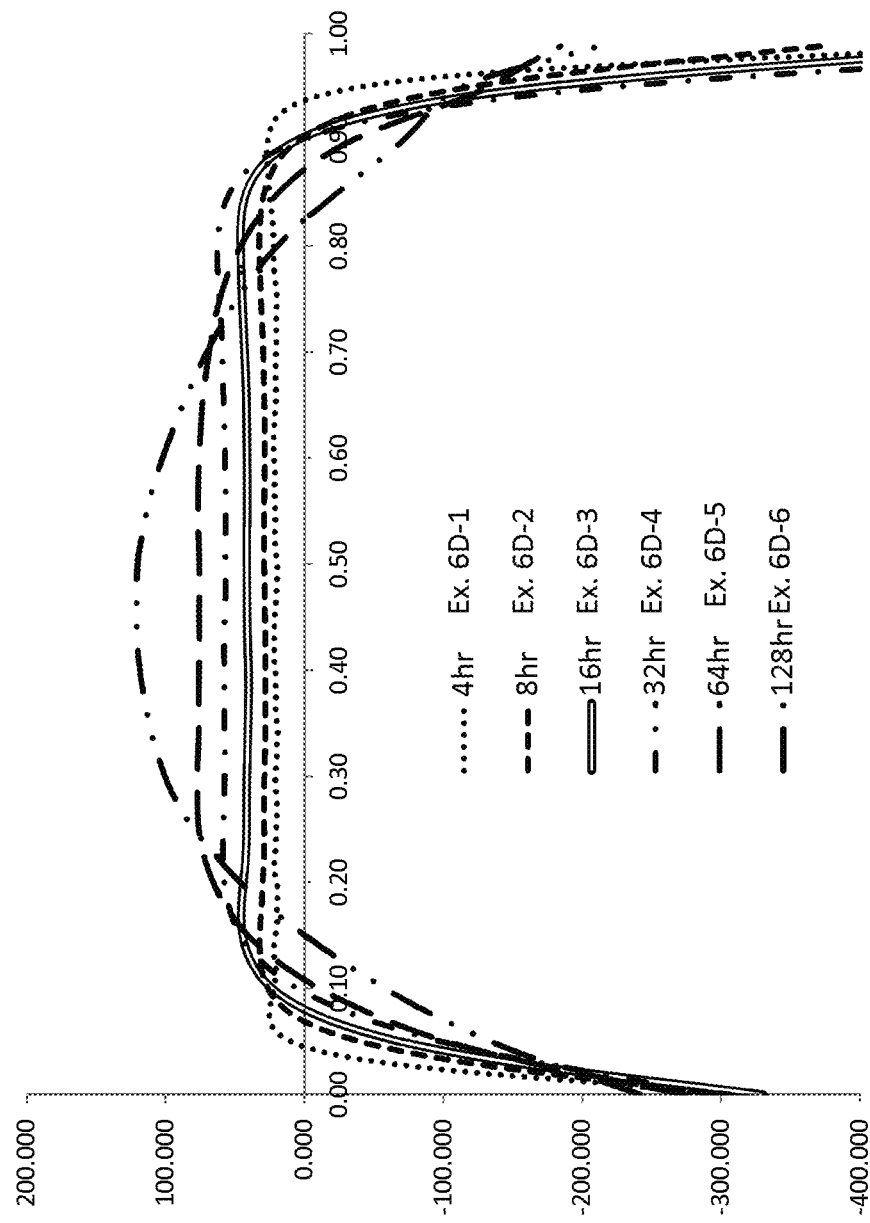
FIG. 26 is a graph showing the stress profiles of Examples 6D-1 through 6D-6 as a function of depth.
Figure 27:
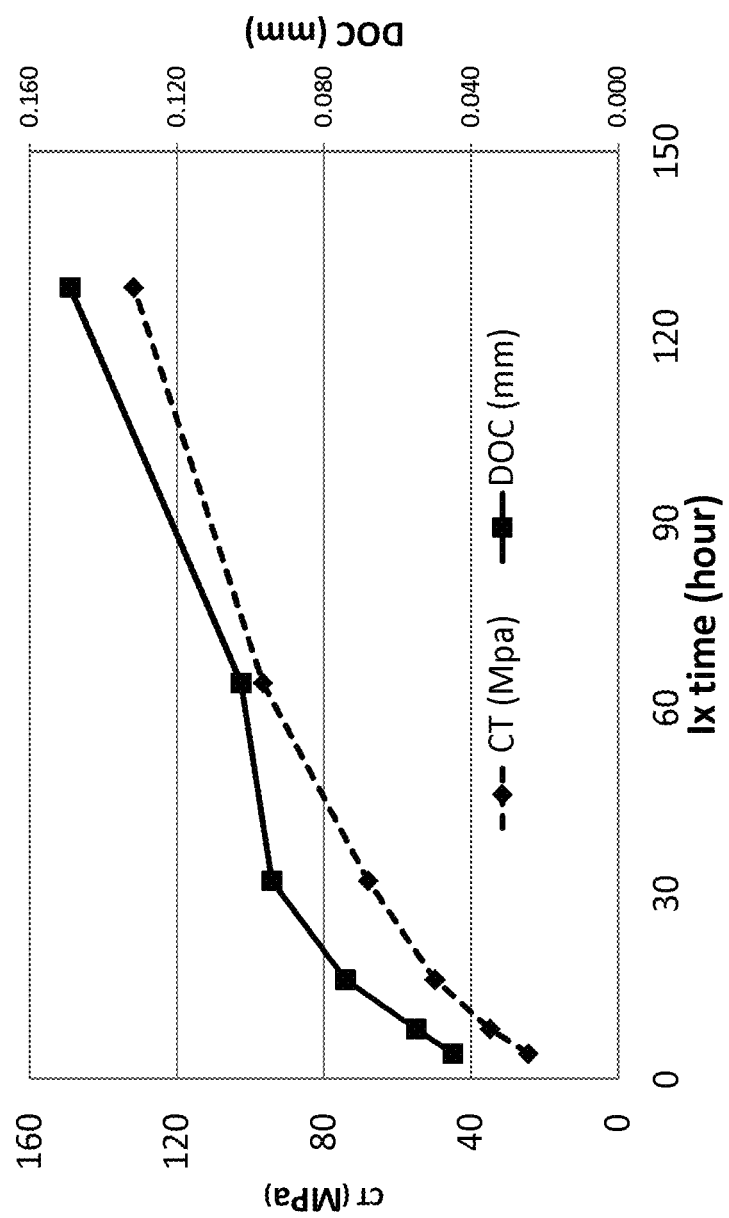
FIG. 27 is a graph showing the CT and DOC values of Examples 6D-1 through 6D-6 as a function of ion exchange time.

The stress profiles of the resulting glass-based articles are shown in FIG. 17, with depth or thickness of the glass-based articles plotted on the x-axis and stress plotted on the y-axis. The positive stress values are CT values and the negative stress values are the CS values. As shown in FIG. 17, as the duration of the second and/or third heat treatments is increased, the DOC increased and the CT decreased. The decrease in DOC and CT in shown more clearly in FIGS. 18 and 19, respectively.

The glass-based articles of Examples 5A-5G were then subjected to a poke test in which one side of the glass-based article is adhered to tape and the opposite bare side is impacted with sharp implement and fractured. The resulting number of fragments can be correlated to the stored tensile energy of the glass-based article. Examples 5A, 5B and 5D exhibited numerous fragments (i.e, in excess of 50 and even 100), while Example 5F exhibited 10 fragments, Example 5C exhibited 3 fragments, and Example 5E and 5G exhibited 4 fragments. Examples 5A, 5B and 5D, which fractured into numerous fragments exhibited higher CT (greater than about 100 MPa) than Examples 5C, 5E, 5F and 5G which all had CT values of about 100 MPa or less.

Example 6

Glass substrates having a nominal composition of 57.5 mol % SiO₂, 16.5 mol % Al₂O₃, 16.7 mol % Na₂O, 2.5 mol % MgO, and 6.5 mol % P₂O₅, and having a thicknesses of about 0.4 mm, 0.55 mm, or 1 mm were subjected to chemical strengthening. The thicknesses and conditions of chemical strengthening are shown in Table 4.

TABLE 4

Thickness and chemical strengthening conditions for Examples 6A-6D.

| Ex. | Thickness | Bath Composition | Bath Temperature |
|---|---|---|---|
| 6A | 0.4 mm | 80% KNO3, 20% NaNO3 | 430° C. |
| 6B | 0.55 mm | 80% KNO₃, 20% NaNO₃ | 430° C. |

TABLE 4-continued

Thickness and chemical strengthening
conditions for Examples 6A-6D.

| Ex. | Thickness | Bath Composition | Bath Temperature |
|---|---|---|---|
| 6C | 0.55 mm | 90% KNO$_3$, 10% NaNO$_3$ | 430° C. |
| 6D | 1.0 mm | 70% KNO$_3$, 30% NaNO$_3$ | 430° C. |

Example 6A was immersed in a molten salt bath, as indicted in Table 4, for 4 hours, 8 hours, 16 hours, 32 hours, 64 hours and 128 hours (Examples 6A-1 through 6A-6). Example 6B was immersed in a molten salt bath, as indicated in Table 4, for 4 hours, 8 hours, 16 hours, 32 hours, 64 hours and 128 hours (Examples 6B-1 through 6B-6). Example 6C was immersed in a molten salt bath, as indicated in Table 4, for 1 hour, 2 hours, 4 hours, 8 hours, 16 hours and 32 hours (Examples 6C-1 through 6C-6). Example 6D was immersed in a molten salt bath, as indicated in Table 4, for 4 hours, 8 hours, 16 hours, 32 hours, 64 hours and 128 hours (Examples 6D-1 through 6D-6). The stress profiles of Examples 6A-1 through 6A-6, 6B-1 through 6B-6, 6C-1 through 6C-6, and 6D-1 through 6D-6 are shown in FIGS. 20, 22, 24 and 26, respectively. In FIGS. 20, 22, 24 and 26, the depth or thickness of the glass articles is plotted on the x-axis and stress is plotted on the y-axis. The positive stress values are CT values and the negative stress values are the CS values.

The CT and DOC values as a function of time immersed in the molten salt bath for Examples 6A-1 through 6A-6, Examples 6B-1 through 6B-6, Examples 6C-1 through 6C-6 and 6D-1 through 6D-6, are shown in FIGS. 21, 23, 25, and 27, respectively.

Example 7

Glass substrates having a nominal composition as shown in Table 2 and having a thicknesses of about 1 mm were subjected to chemical strengthening in a molten salt bath including 100% NaNO$_3$ and a temperature of 430° C. The duration for which the glass substrates were immersed in the molten salt bath are shown in Table 5.

TABLE 4

Chemical strengthening duration (or ion
exchange times) for Examples 7A-7G.

| Ex. | IOX Time (hours) |
|---|---|
| 7A | 2 |
| 7B | 4 |
| 7C | 8 |
| 7D | 16 |
| 7E | 24 |
| 7F | 32.5 |
| 7G | 48 |

Figure 28:
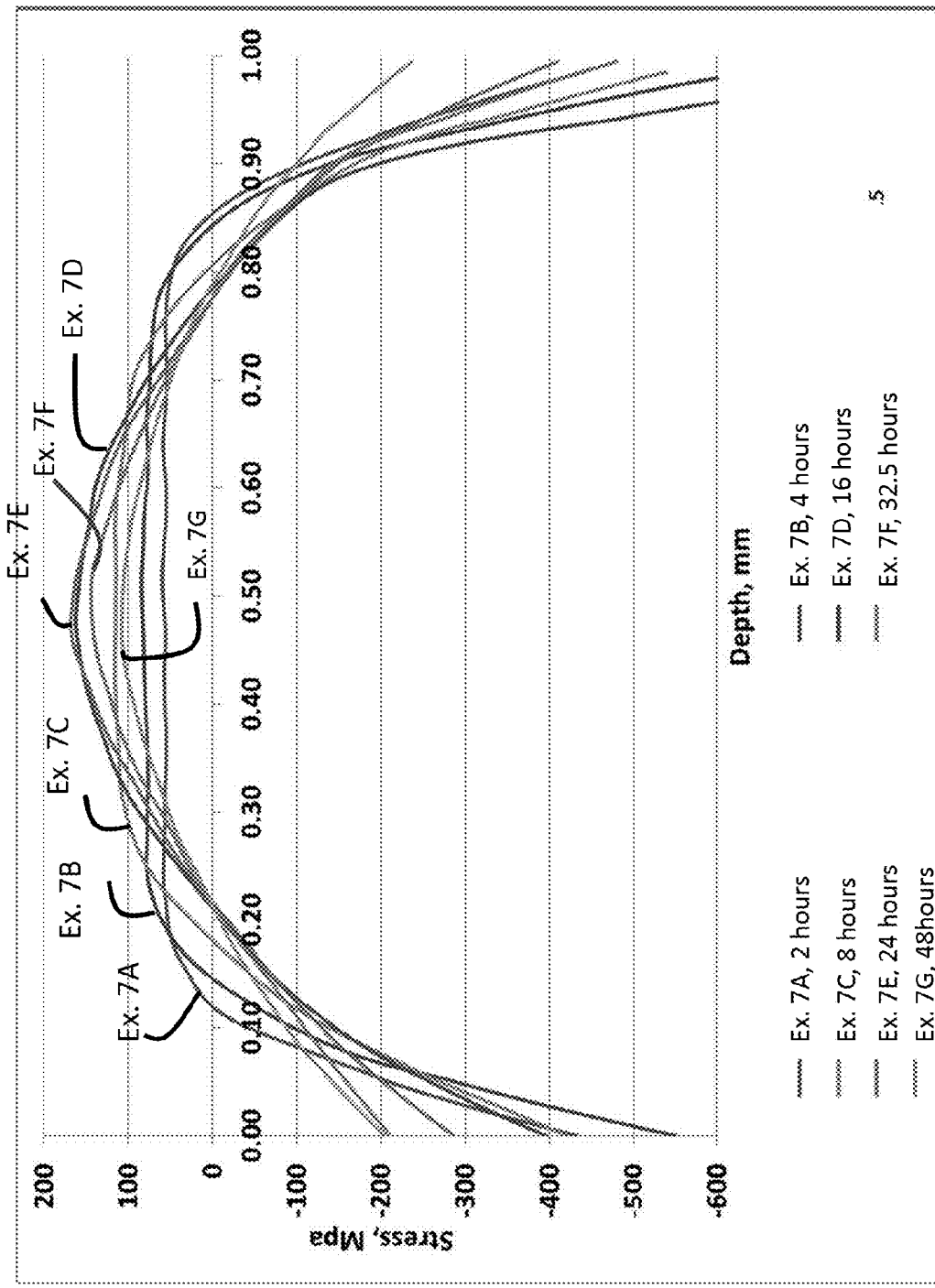
FIG. 28 is a graph showing CT as a function of ion exchange time for Examples 7A-7G.
Figure 29:
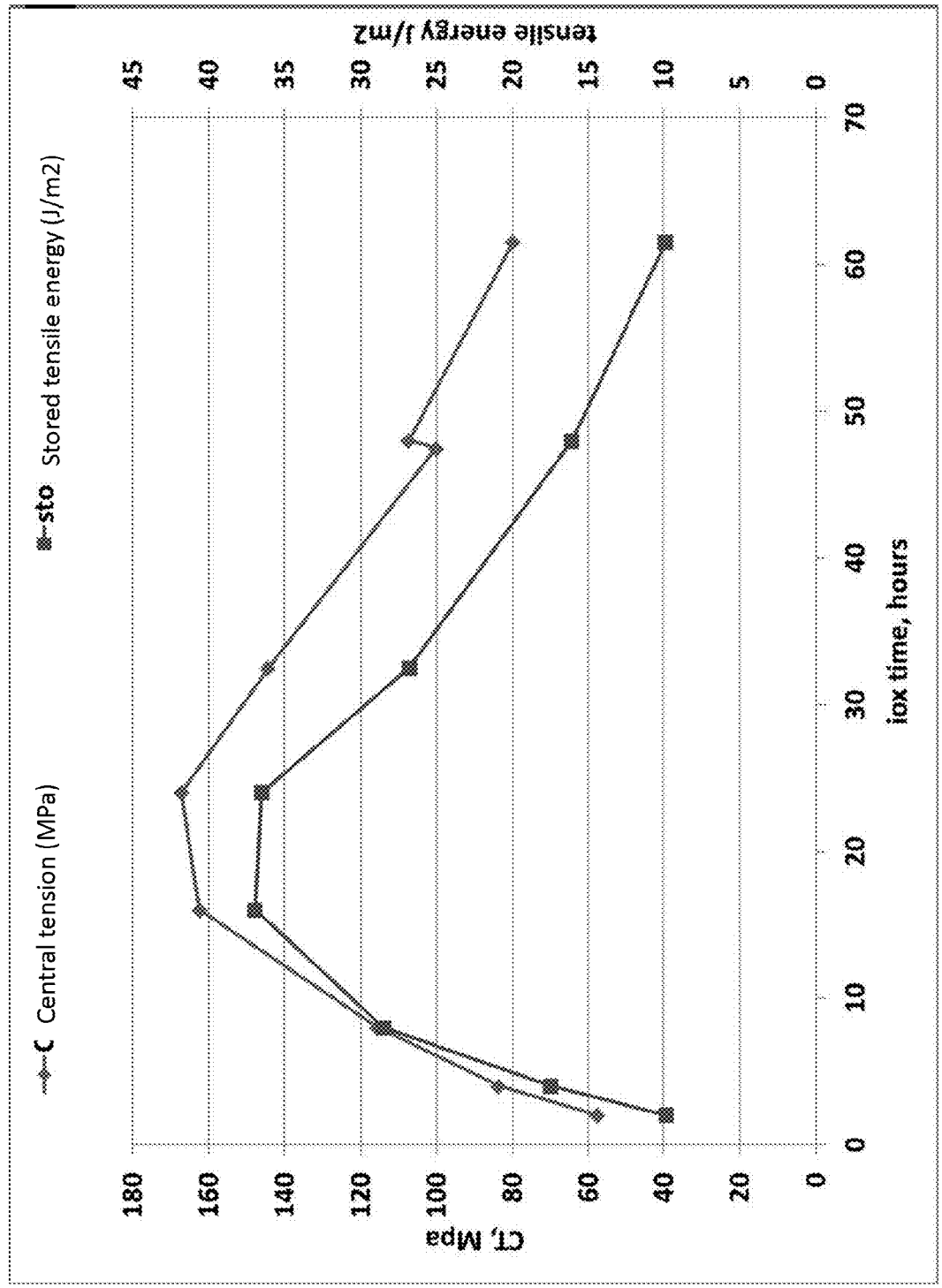
FIG. 29 is a graph showing the change in central tension values and stored tensile energy, both as a function of ion exchange time for Examples 7A-7G.

The stress profiles of the glass-based articles of Examples 7A-7G are shown in FIG. 28. The stress profiles were measured using SCALP. As shown in FIG. 28, immersion of the glass substrates in the molten salt bath for 16 hours and 24 hours results in glass-based articles exhibiting the greatest surface CS values and the greatest CT values, in absolute terms. A graph showing the change in CT values and stored tensile energy, both as a function of ion exchange time is shown in FIG. 29.

Example 8

Figure 30:
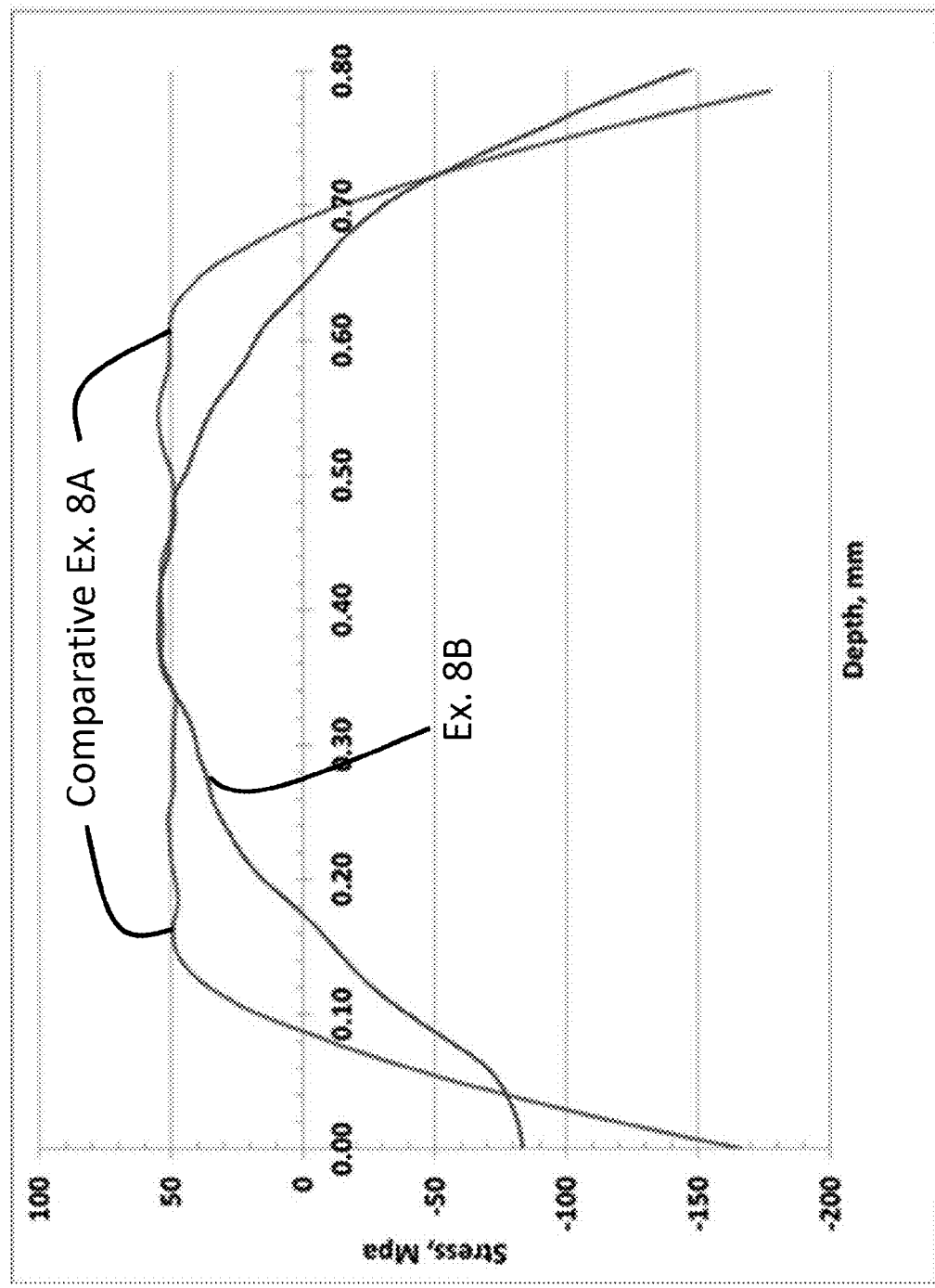
FIG. 30 is a graph showing the stress profiles of Comparative Example 8A and Example 8B as a function of depth.

Glass substrates having a nominal composition as shown in Table 2 and having a thicknesses of about 0.8 mm each were subjected to chemical strengthening in a molten salt bath including a mixture of NaNO$_3$ and NaSO$_4$ and a temperature of 500° C. for 15 minutes (Comparative Example 8A) and for 16 hours (Example 8B). The stress profile of the glass-based articles of Examples 8A and 8B are shown in FIG. 30. A shown in FIG. 30, Comparative Example 8A exhibited a known stress profile, whereas, Example 8B showed a stress profile according to one or more embodiments of this disclosure. The stored tensile energy of the glass-based articles of Examples 8A and 8B was calculated in the same manner as Examples 4B-4D. The calculated stored tensile energy is plotted as a function of measured CT (MPa), as shown in FIG. 31.

Figure 31:
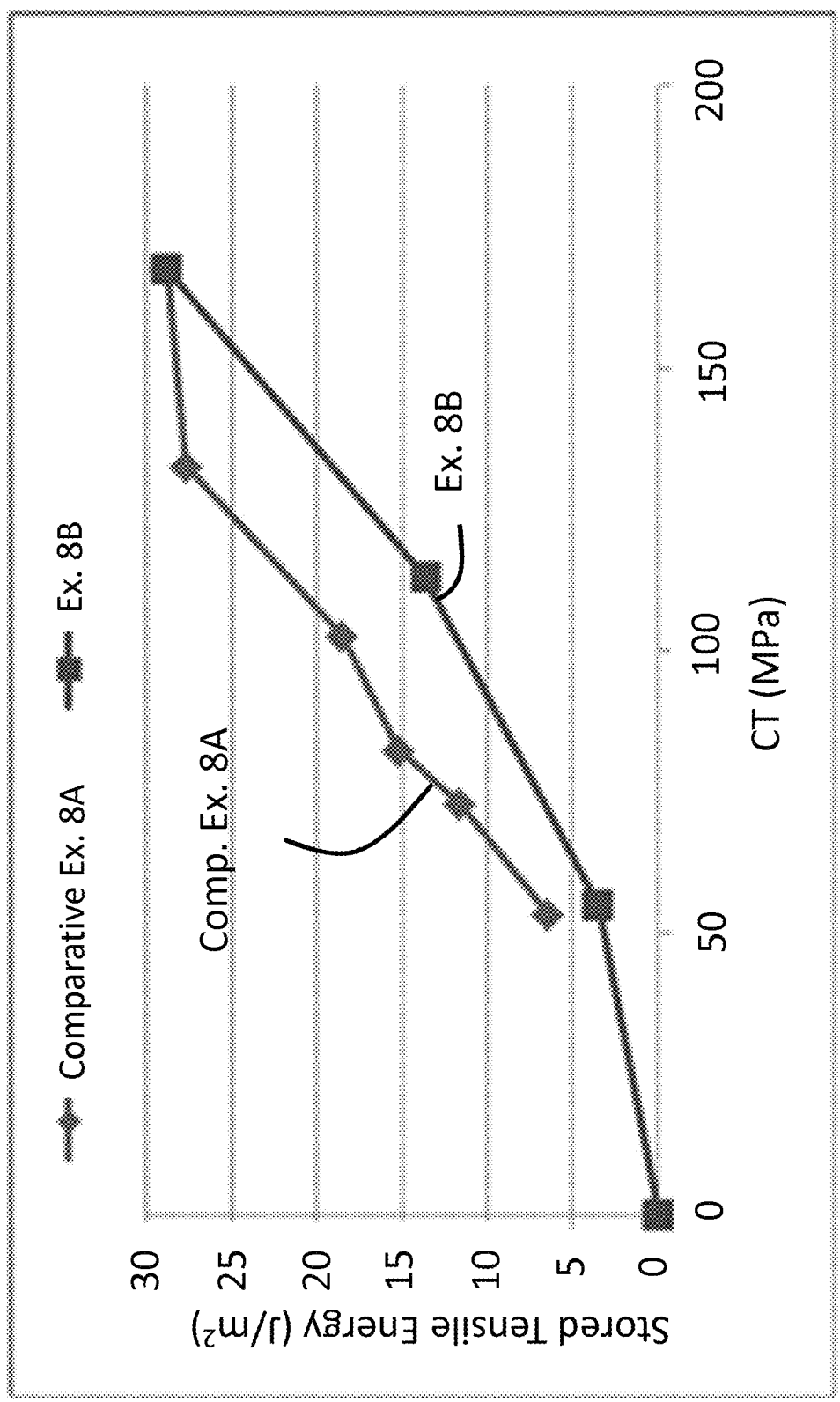
FIG. 31 is a graph showing the stored tensile energy of Comparative Example 8A and Example 8B as a function of CT.

As shown in FIG. 31, Comparative 8A exhibited much greater stored tensile energy values for a given CT value than Example 8B (for the same CT value). Specifically, at a CT of about 55 MPa, Comparative Example 8A exhibited a stored tensile energy of about 8 J/m$^2$, whereas Example 8B exhibited a stored tensile energy of about 3.5 J/m$^2$. Comparative Example 8A and Example 8B were fractured and Example 8B fractured into fewer pieces than Comparative Example 8A, which fractured into a significantly greater number of pieces. Accordingly, without being bound by theory, it is believed that controlling the stored tensile energy may provide a way to control or predict fragmentation patterns or the number of fragments that result from fracture.

Glass substrates having a nominal composition as shown in Table 2 and having a thicknesses of about 1 mm each were subjected to chemical strengthening in a molten salt bath including NaNO$_3$ and a temperature of 430° C. for 4 hours (Comparative Example 8C) and for 61.5 hours (Example 8D). Comparative Example 8C exhibited a known stress profile, whereas, Example 8D showed a stress profile according to one or more embodiments of this disclosure. The stored tensile energy of Examples 8C and 8D was calculated using the same method used with Examples 4B-4D and plotted as a function of measured CT (MPa), as shown in FIG. 32.

Figure 32:
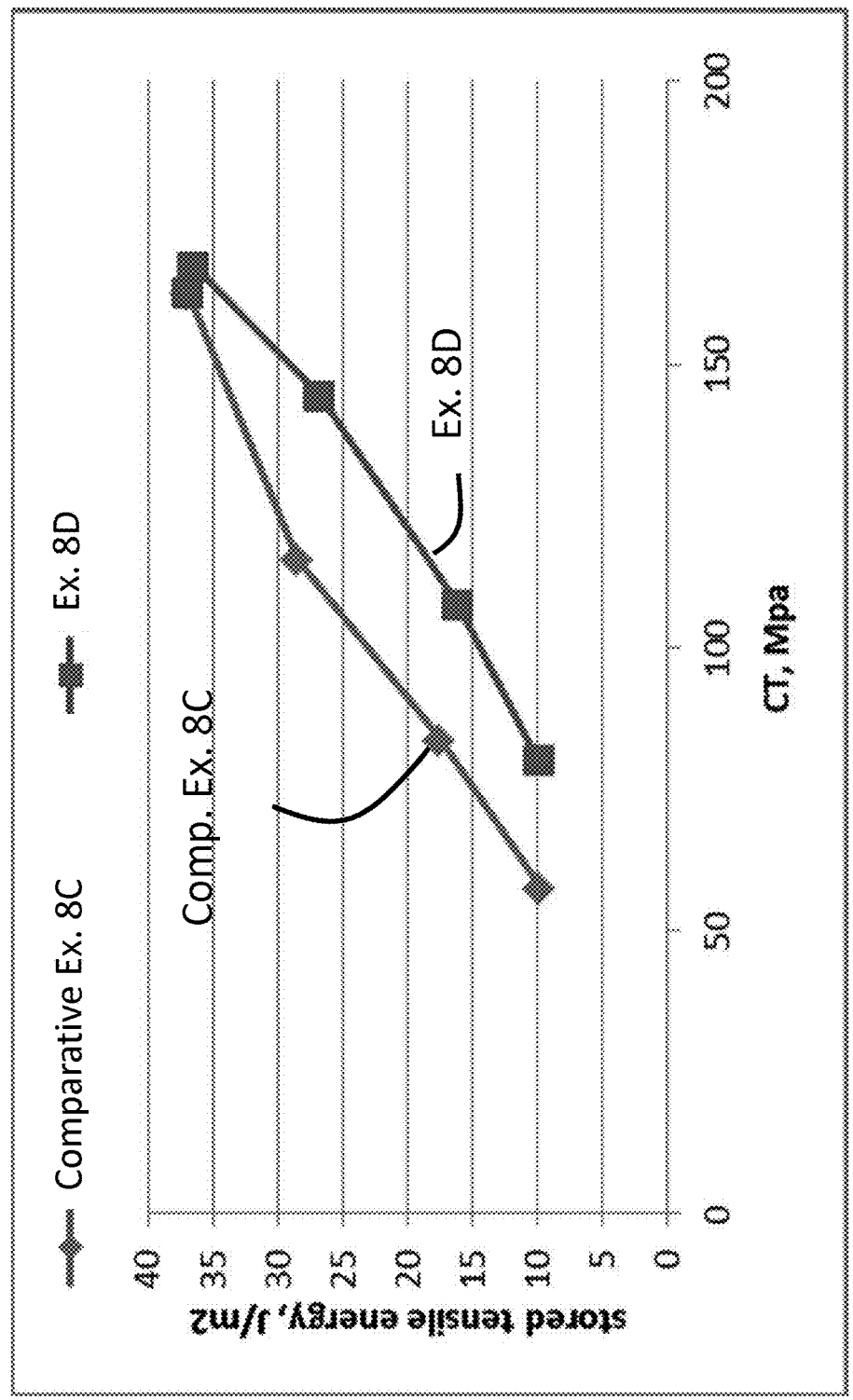
FIG. 32 is a graph showing stored tensile energy of Comparative Example 8C and Example 8D as a function of CT.

As shown in FIG. 32, Comparative 8C exhibited much greater stored tensile energy values for a given CT value than Example 8D (for the same CT value). Comparative Example 8C and Example 8D were fractured and Example 8D fractured into fewer pieces than Comparative Example 8C, which fractured into a significantly greater number of pieces.

Example 9

Glass substrates having a nominal composition of 70.9 mol % SiO$_2$, 12.8 mol % Al$_2$O$_3$, 1.95 mol % B$_2$O$_3$, 7.95 mol % Li$_2$O, 2.43 mol % Na$_2$O, 2.98 mol % MgO, 0.89 mol % ZnO, and 0.1 mol % SnO$_2$ and having a thicknesses of about 0.8 mm were subjected the ion exchange conditions of Table 5. Various properties of Example 9 are compared to Example 2 in Table 6.

TABLE 5

Ion exchange conditions for Example 9.

| Condition | Bath Composition | Bath Temperature (° C.) | Immersion time |
|---|---|---|---|
| 1 | 100% NaNO₃ | 430° C. | 16 hours |
| 2 | 20% NaNO₃, 80% KNO₃ | 430° C. | 11 hours |
| 3 | 100% NaNO₃ | 430° C. | 24 hours |
| 4 | 20% NaNO₃, 80% KNO₃ | 430° C. | 12.5 hours |

TABLE 6

Comparison of properties for Example 9B and Example 2.

| Property | Units | Ex. 9B | Ex. 2 |
|---|---|---|---|
| Strain point | ° C. | 592 | 615 |
| Anneal point | ° C. | 642 | 663 |
| Elastic Modulus | GPa | 81.4 | 83.8 |
| Shear Modulus | GPa | 33.8 | 34.3 |
| Poisson's ratio |  | 0.211 | 0.222 |
| CTE (RT-300° C.) | ppm/° C. | 4.58 | 3.84 |
| Thermal Conductivity | W/cm*K |  |  |
| SOC | nm/cm/MPa | 30.94 | 32.65 |
| Refractive Index (at 550 nm) |  | 1.5087 | 1.532 |

The stress profiles of the glass-based articles of Example 9 were measured and exhibited the shapes described herein.

Glass substrates according to Example 2, Example 6, and Comparative Example 9A were provided having the same thickness as Example 9. The glass substrates according to Example 2 were ion exchanged in a molten bath of 100% NaNO₃, having a temperature of 430° C. for 33 hours. The glass substrates according to Example 6 were ion exchanged to exhibit a known error function stress profile. Comparative Example 9A was ion exchanged in a molten bath of 100% NaNO₃, having a temperature of 390° C. for 16 hours and also exhibited a known error function stress profile. As used herein, the term "error function stress profile" refers to a stress profile resembling FIG. 1.

Figure 33:
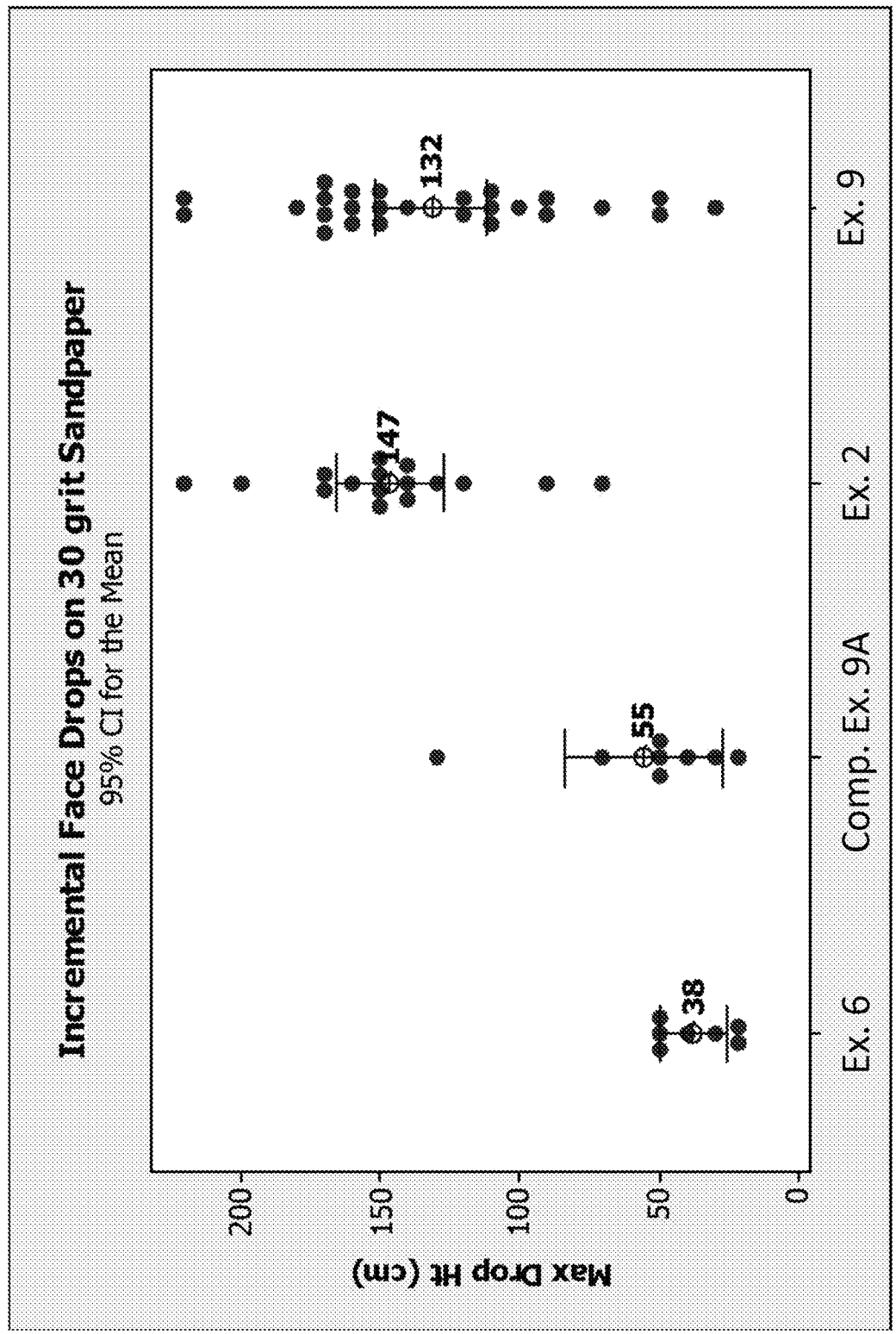
FIG. 33 is a graph showing the drop height failure for Examples 2, 6 and 9 and Comparative Example 9A.

The glass-based articles from Example 2, Comparative Example 6, Example 9 and Comparative Example 9A were then retrofitted onto identical mobile phone devices. The phone devices were dropped from incremental heights starting at 20 centimeters onto 30 grit sandpaper. If a glass-based article survived the drop from one height (e.g., 20 cm), the mobile phone was dropped again from a greater height (e.g., 30 cm, 40 cm, 50 cm, etc.). The height at which the glass-based article failed is plotted in Example 32, which also shows the average failure height for the samples of Examples 2, 6, and 9 and Comparative Example 9A. As shown in FIG. 33, Examples 2 and 9 exhibited failures at significantly greater drop height than Example 6 and Comparative Example 9A. Specifically, Examples 6 and Comparative Examples 9A exhibited failures at drop heights of about 38 cm and 55 cm, respectively, while Example 2 and 9 exhibited failures at drop heights of about 147 cm and 132 cm, respectively.

The same test was repeated with new samples using the same mobile phone device onto 180 grit sandpaper. The average failure heights for Example 6 was 190 cm, for Comparative Example 9A was 204 cm, for Example 2 was 214 cm and for Example 9 was 214 cm.

Glass substrates according to Comparative Example 9B, having a nominal composition of 65 mol % SiO₂, 5 mol % B₂O₃, 14 mol % Al₂O₃, 14 mol % Na₂O, 2 mol % MgO, and 0.1 mol % SnO₂ and a thickness of 0.8 mm, were ion exchanged to exhibit a known error function stress profile The glass-based article samples of Example 2 and Comparative Example 6 (exhibiting the stress profile described above in this Example), Comparative Example 9B and the glass-based articles of Example 9 ion exchanged according to Condition 4, as shown in Table 5, were subjected to A-ROR testing as described herein.

Figure 34:
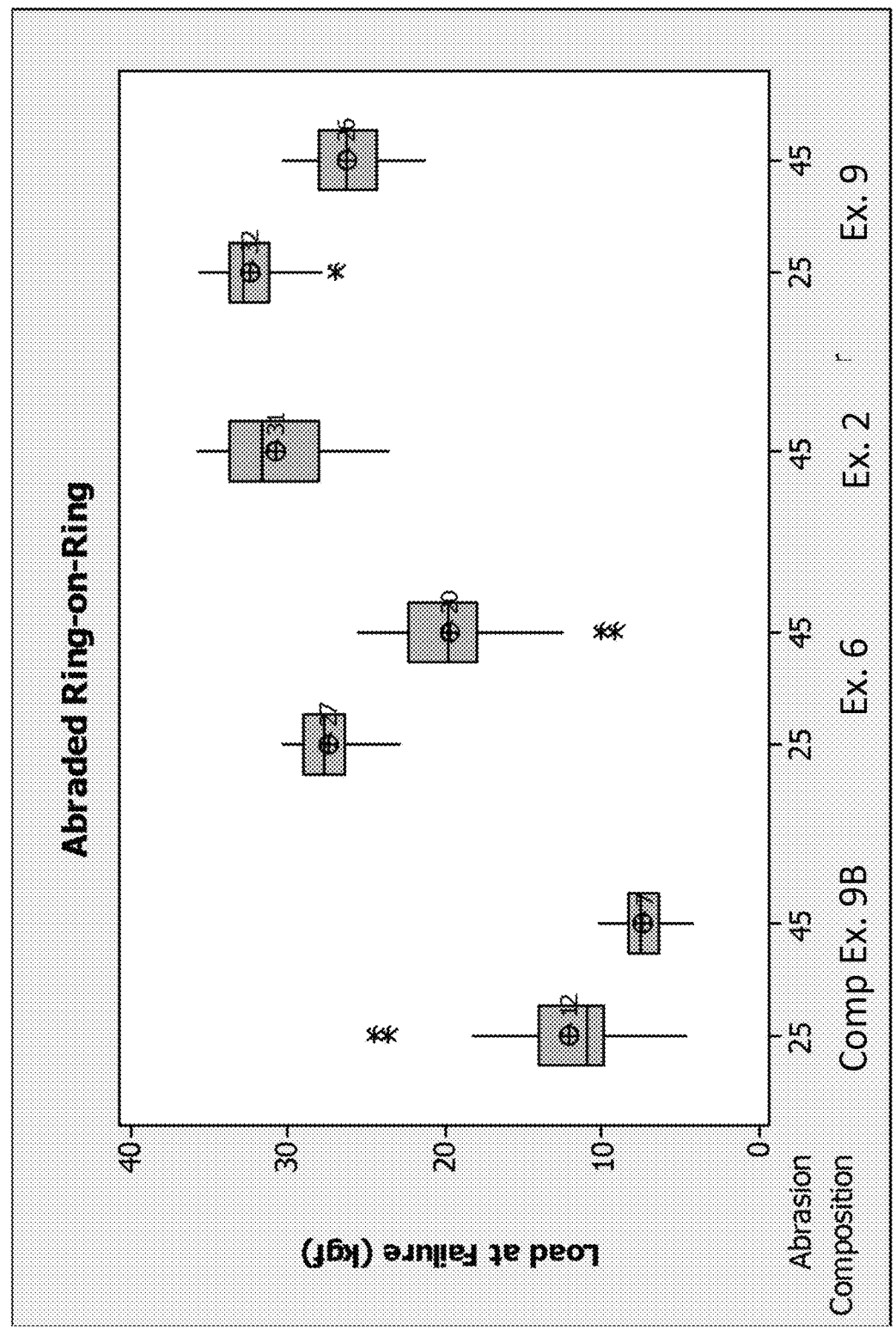
FIG. 34 is a graph showing the abraded ring-on-ring results for Examples 2, 6, 9B and Comparative Example 9J.

Examples 6 and 9 and Comparative Example 9B were abraded using a load or pressure of 25 psi and 45 psi, and Example 2 was abraded using a load of 25 psi, only. The AROR data is shown in FIG. 34. As shown in FIG. 34, Examples 2 and 9 exhibited higher load to failure than Example 6, and Comparative Example 9B.

Figure 35:
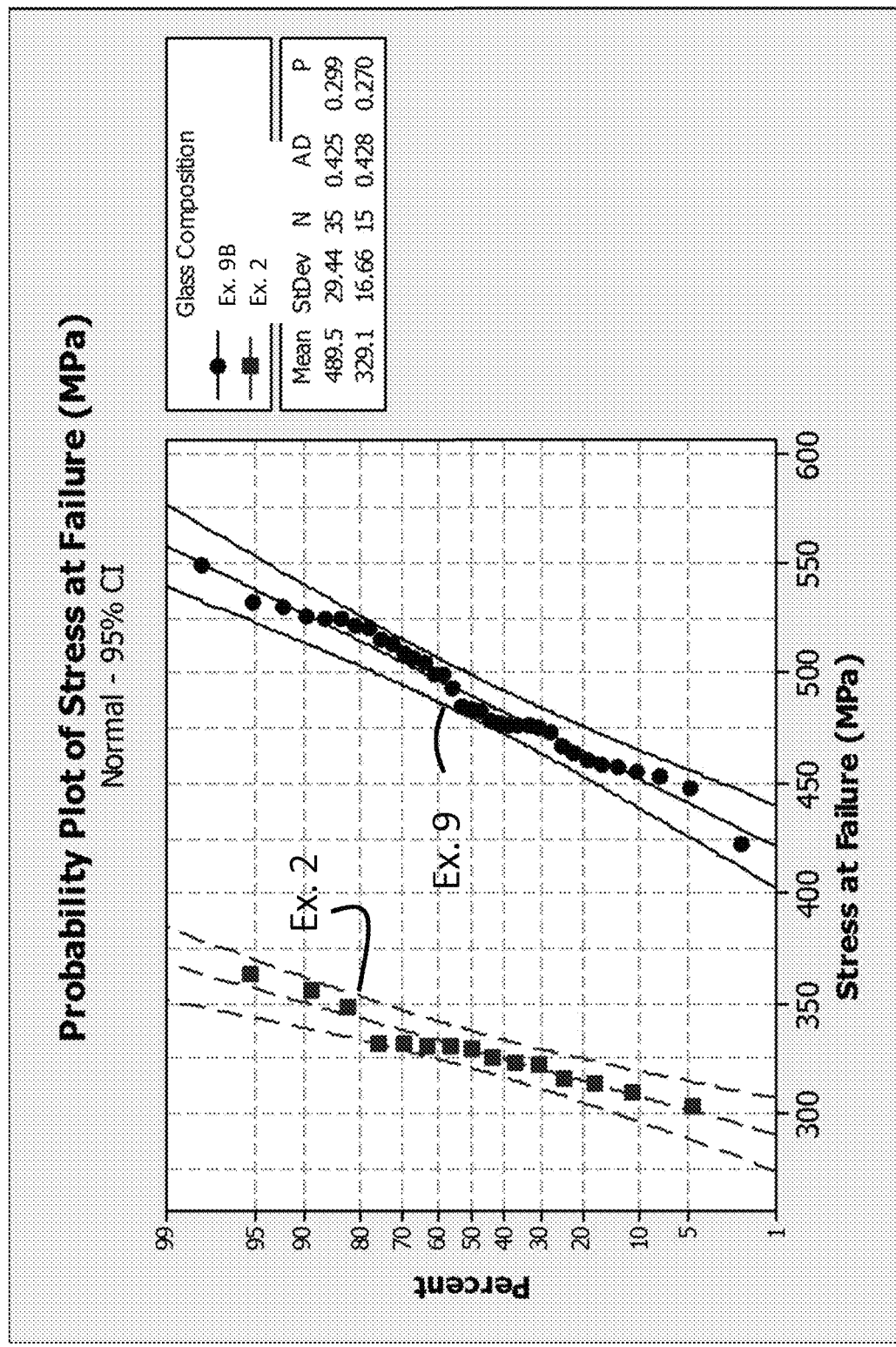
FIG. 35 is a Weibull distribution plot showing the 4-point bend results for Examples 2 and 9B.

Glass-based article samples of Examples 2 (ion exchanged as described above in this Example) and 9 (ion exchanged according to Condition 4) were subjected a 4-point bend test. The results are shown in the Weibull distribution plot of FIG. 35. As shown in FIG. 35, Example 9 exhibited higher stress or load to failure (e.g., greater than about 400 MPa).

As shown above, glass-based articles made from compositions having a strain point greater than 525° C. enable ion exchange temperatures (or ion exchange bath temperatures) in the range from about 350° C. to about 480° C. In some embodiments, glass compositions exhibiting a diffusivity greater than about 800 square micrometers/hour enable the metal oxides diffusing into the glass based article to penetrate the entire depth or thickness of the article quickly such that stress relaxation is minimized, Excessive stress relaxation can reduce the surface compressive stress of the glass-based article.

It will be apparent to those skilled in the art that various modifications and variations can be made without departing from the spirit or scope of the invention.

What is claimed is:

1. A glass-based article comprising:
   a first surface and a second surface opposing the first surface defining a thickness (t); and
   a concentration of a metal oxide that is both non-zero and varies along a thickness range from about 0·t to about 0.3·t, as measured by microprobe;
   a stress profile, as measured by a combination of scattered light polariscope and surface stress meter, that decreases from the first surface to a value between the first surface and the second surface and increases from the value to the second surface; and
   a CT region of the stress profile, wherein the CT region is defined by the equation Stress(x)=MaxCT−(((MaxCT·(n+1))/0.5")·|(x/t)−0.5|ⁿ),
   wherein MaxCT is a maximum CT value and is provided as a positive value in units of MPa, x is position along the thickenss (t) in micrometers, and n is between 1.5 and 5.

2. The glass-based article of claim 1, wherein the concentration of the metal oxide is non-zero and varies along the entire thickness.

3. The glass-based article of claim 1, wherein the metal oxide generates a stress along the thickness range.

4. The glass-based article of claim 1, wherein the concentration of the metal oxide is about 0.05 mol % or greater throughout the thickness.

5. The glass-based article of claim 1, wherein the concentration of the metal oxide at the first surface is about 1.5 times greater than the concentration of the metal oxides at a depth equal to about 0.5·t, as measured by microprobe.

6. A glass-based article comprising:
a first surface and a second surface opposing the first surface defining a thickness (t) of about less than about 3 millimeters;
a concentration of a metal oxide that is both non-zero and varies along a thickness range from about 0·t to about 0.3·t as measured by microprobe;
a stress profile, as measured by a combination of scattered light polariscope and surface stress meter, that decreases from the first surface to a value between the first surface and the second surface and increases from the value to the second surface;
a CT region of the stress profile, wherein the CT region is defined by the equation $Stress(x)=MaxCT-(((MaxCT\cdot(n+1))/0.5^n)\cdot|(x/t)-0.5|^n)$,
wherein MaxCT is a maximum CT value and is provided as a positive value in units of MPa, x is position along the thickness (t) in micrometers, and n is between 1.5 and 5; and
wherein all points of the stress profile between a thickness range from about 0·t up to 0.3·t and from greater than 0.7·t, comprise a tangent that is less than about −0.1 MPa/micrometers or greater than about 0.1 MPa/micrometers, and
wherein the stress profile comprises a maximum CS, a DOC and a maximum CT, wherein the ratio of maximum CT to maximum CS is in the range from about 0.01 to about 0.5 and wherein the DOC is about 0.1·t or greater.

7. The glass-based article of claim 6, further comprising an absolute value of surface CS of about 300 MPa or greater, as measured by surface stress meter.

8. The glass-based article of claim 6, further comprising an absolute value of surface CS of about 200 MPa or greater, as measured by surface stress meter, and a chemical depth of layer (DOL) of about 0.4·t or greater.

9. The glass-based article of claim 6, further comprising a CS layer extending from the first surface to a DOC, wherein the DOC is about 0.1·t or greater.

10. The glass-based article of claim 6, further comprising a CT region, wherein the CT region comprises a metal oxide concentration gradient.

11. The glass-based article of claim 7, wherein the ratio of maximum CT to surface CS is in the range from about 0.01 to about 0.5.

12. The glass-based article of claim 6, wherein t comprises about 1 millimeter or less.

13. A glass-based article comprising:
a first surface and a second surface opposing the first surface defining a thickness (t); and
a concentration of a metal oxide that is both non-zero and varies along a thickness range from about 0·t to about 0.3·t, as measured by microprobe;
a stress profile, as measured by a combination of scattered light polariscope and surface stress meter, that decreases from the first surface to a value between the first surface and the second surface and increases from the value to the second surface;
a CT region of the stress profile, wherein the CT region is defined by the equation $Stress(x)=MaxCT-(((MaxCT\cdot(n+1))/0.5^n)\cdot|(x/t)-0.5|^n)$,
wherein MaxCT is a maximum CT value and is provided as a positive value in units of MPa, x is position along the thickness (t) in micrometers, and n is between 1.5 and 5; and
an absolute value of surface CS of about 200 MPa or greater, as measured by surface stress meter.

14. The glass-based article of claim 13, wherein, when the glass-based article is fractured, the glass-based article fractures into at least 1 fragment/inch$^2$ up to 40 fragments/inch$^2$.

15. The glass-based article of claim 13, wherein the glass-based article comprises a diffusivity of about 450 μm$^2$/hour or greater at about 460° C., a maximum CT, and a DOC greater than about 0.15·t, and wherein the surface CS is 1.5 times the maximum CT or greater.

16. The glass-based article of claim 13, wherein the glass-based article comprises a fracture toughness ($K_{1C}$) of about 0.7 MPa·m$^{1/2}$ or greater.

17. The glass-based article of claim 15, wherein the surface CS is greater than the maximum CT, and wherein the surface CS is about 600 MPa or greater, as measured by surface stress meter.

18. The glass-based article of claim 13, wherein the concentration of the metal oxide is about 0.05 mol % or greater throughout the thickness.

19. The glass-based article of claim 13, wherein the concentration of the metal oxide at the first surface is about 1.5 times greater than the concentration of the metal oxide at a depth equal to about 0.5·t, as measured by microprobe.

20. The glass-based article of claim 13, further comprising an absolute value of surface compressive stress (CS) of about 300 MPa or greater, as measured by surface stress meter.

21. The glass-based article of claim 13, further comprising a CS layer extending from the first surface to a DOC, wherein the DOC is about 0.1·t or greater.

22. The glass-based article of claim 13, wherein the CT region comprises a maximum CT and the ratio of maximum CT to surface CS is in the range from about 0.01 to about 0.5.

23. The glass-based article of claim 13, further exhibiting a transmittance of about 88% or greater over a wavelength in the range from about 380 nm to about 780 nm.

24. The glass-based article of claim 13, wherein t comprises about 1 millimeter or less.

25. The glass-based article of claim 13, further comprising a DOC greater than about 0.15·t, and wherein the surface CS is about 300 MPa or greater, as measured by surface stress meter.

26. The glass-based article of claim 13, wherein the glass-based article comprises a stored tensile energy of about greater than 0 J/m$^2$ to less than 20 J/m$^2$.

27. The glass-based article of claim 13, further comprising a DOC, wherein 0.25t≥DOC≥0.15 t.

28. A glass-based article comprising:
a first surface and a second surface opposing the first surface defining a thickness (t) of about less than about 3 millimeters;
a concentration of a metal oxide that is both non-zero and varies along a thickness range from about 0·t to about 0.3·t, as measured by microprobe;
a stress profile, as measured by a combination of scattered light polariscope and surface stress meter, that decreases from the first surface to a value between the first surface and the second surface and increases from the value to the second surface;
a CT region of the stress profile, wherein the CT region is defined by the equation $Stress(x)=MaxCT-(((MaxCT\cdot(n+1))/0.5^n)\cdot|(x/t)-0.5|^n)$, wherein MaxCT is a maximum CT value and is provided as a positive value in units of MPa, x is position along the thickness (t) in micrometers, and n is between 1.5 and 5; and wherein all points of the stress profile between a thickness range from about 0t up to 0.3t and from greater than 0.7t, comprise a tangent that is less than about −0.1 MPa/micrometers or greater than about 0.1 MPa/micrometers, wherein the stress profile comprises a maximum CS, a DOC and a maximum CT, wherein the ratio of maximum CT to maximum CS is in the range from about 0.01 to about 0.5 and wherein the DOC is about 0.1·t or greater, and wherein the glass-based article comprises a stored tensile energy of about greater than 0 J/m$^2$ to less than 20 J/m$^2$.

29. The glass-based article of claim 28, further comprising an absolute value of surface CS of about 200 MPa or greater, as measured by surface stress meter, and a chemical depth of layer of about 0.4·t or greater.

30. The glass-based article of claim 28, wherein t comprises about 1 millimeter or less.

31. An electronic device comprising the glass-based article of claim 1.

32. An electronic device comprising the glass-based article of claim 6.

33. An electronic device comprising the glass-based article of claim 13.

34. An electronic device comprising the glass-based article of claim 28.

* * * * *